(12) United States Patent
Otwell et al.

(10) Patent No.: US 11,890,573 B2
(45) Date of Patent: Feb. 6, 2024

(54) METHODS AND SYSTEMS FOR CONTROLLING EMISSIONS FROM WOOD DRYING PROCESSES

(71) Applicant: BAKELITE CHEMICALS LLC, Penarth (GB)

(72) Inventors: Lawrence P Otwell, Fayetteville, GA (US); Kim Kristine Tutin, East Point, GA (US); Stephen Douglas Prout, Murfreesboro, NC (US); Harold R. Cowles, Scottsdale, AZ (US); Adam Krzysztof Sniady, Lilburn, GA (US); Jim P Arduino, Smyrna, GA (US)

(73) Assignee: BAKELITE CHEMICALS LLC, Atlanta, GA (US)

( * ) Notice: Subject to any disclaimer, the term of this patent is extended or adjusted under 35 U.S.C. 154(b) by 695 days.

(21) Appl. No.: 16/965,551

(22) PCT Filed: Jan. 29, 2019

(86) PCT No.: PCT/US2019/015727
§ 371 (c)(1),
(2) Date: Jul. 28, 2020

(87) PCT Pub. No.: WO2019/148207
PCT Pub. Date: Aug. 1, 2019

(65) Prior Publication Data
US 2021/0046420 A1     Feb. 18, 2021

Related U.S. Application Data

(60) Provisional application No. 62/623,192, filed on Jan. 29, 2018, provisional application No. 62/623,211, (Continued)

(51) Int. Cl.
*B01D 53/72* (2006.01)
*B01D 53/047* (2006.01)
(Continued)

(52) U.S. Cl.
CPC .......... *B01D 53/72* (2013.01); *B01D 53/047* (2013.01); *B01D 53/08* (2013.01); *B27K 5/009* (2013.01);
(Continued)

(58) Field of Classification Search
CPC ...... B01D 53/047; B01D 53/72; B01D 53/81; B01D 2259/40088; B01D 2257/80;
(Continued)

(56) References Cited

U.S. PATENT DOCUMENTS 2,684,731 A    7/1954  Starr, Jr. et al.
8,999,202 B2   4/2015  Mulik et al.
(Continued)

FOREIGN PATENT DOCUMENTS

WO     2017139767 A1    8/2017

OTHER PUBLICATIONS

Declaration 1 of Harold R. Cowles, U.S. Appl. No. 16/965,538, dated Oct. 25, 2022.
(Continued)

*Primary Examiner* — Sharon Pregler
(74) *Attorney, Agent, or Firm* — Edmonds & Cmaidlka, P.C.

(57) ABSTRACT

Methods and systems for obtaining exhaust streams from wood drying processes and controlling emissions in exhaust streams from wood drying processes are provided. Methods and systems can include pre-treatment steps, such as removing particulate matter and/or heating a process exhaust stream from a wood dryer, in order to obtain an exhaust stream that is suitable for downstream recovery of terpenes from said exhaust stream. Exhaust streams can be contacted with a sorbent to remove volatile organic compounds, and
(Continued)

other emissions, generating a purified air stream that is able to be released into the environment without further purification or oxidation.

26 Claims, 30 Drawing Sheets

Related U.S. Application Data filed on Jan. 29, 2018, provisional application No. 62/623,204, filed on Jan. 29, 2018.

(51) Int. Cl.
*B01D 53/08* (2006.01)
*B27K 5/00* (2006.01)

(52) U.S. Cl.
CPC .. *B01D 2253/102* (2013.01); *B01D 2257/504* (2013.01); *B01D 2257/702* (2013.01); *B01D 2257/708* (2013.01); *B01D 2257/80* (2013.01); *B01D 2259/402* (2013.01); *B01D 2259/40088* (2013.01); *B27K 2240/10* (2013.01)

(58) Field of Classification Search
CPC ........ B01D 2253/102; B01D 2259/402; B01D 2257/702; B01D 2257/708; B01D 2257/504; Y02A 50/20; B27K 2240/10; Y02C 20/40
See application file for complete search history.

(56) References Cited

U.S. PATENT DOCUMENTS

| | | | |
|---|---|---|---|
| 9,133,295 | B2 | 9/2015 | Qureshi et al. |
| 9,133,337 | B2 | 9/2015 | Ludvik et al. |
| 9,464,162 | B2 | 10/2016 | Kron et al. |
| 9,598,525 | B2 | 3/2017 | Dong et al. |
| 9,714,172 | B2 | 7/2017 | Geramita et al. |
| 2002/0169068 | A1* | 11/2002 | Dai .................. B01D 53/04 502/38 |
| 2013/0209348 | A1 | 8/2013 | Ludvik et al. |
| 2015/0329364 | A1 | 11/2015 | Dong et al. |
| 2021/0069929 | A1 | 3/2021 | Sniady et al. |

OTHER PUBLICATIONS

Bycer & Marion, Letter to Dean Shahriari, dated Nov. 3, 2022, re: U.S. Appl. No. 16/965,551 and U.S. Appl. No. 16/965,551, from the Attorney for Mr. Harold R. Cowles.
Exhibit A, Sales presentation offering for sale VOC abatement systems to Norbord, May 13, 2004, for a system and method for control and capture of terpenes as VOCs collected from a wood drying process.
Exhibit B, is an offer for sale of such systems for control and capture of terpenes from a wood drying process dated Aug. 30, 2004.
Exhibit C, Press Vent VOC Adsorption Unit, Summary sheet offered for sale to Georgia-Pacific circa 2002. Engaged in sales discussion with Georgia Pacific as well as industry consultants, suppliers, circa 2004 to provide design efforts, engineering support and components for collecting terpenes as VOCs from wood processing.
Exhibit D, Ford Oakville Plant, Excerpt from Ford fabrication drawings, Apr. 10, 2007, prepared for FORD installation using a set of views of various components for a system to employ a method to capture or control emissions and/or a composition of VOCs that may be removed or collected from a drying process.
Exhibit E, Mar. 25, 2013, Akzo Nobel, Proposal for Fluidized Bed Concentrator Abatement System Components for Application in Chanzhou, Jiangsu Province, People's Republic of China, pp. 1-10.
Exhibit F, Process Instrumentation Diagram Drawing, 100,000 CFM System PID, Mar. 27, 2007.
Exhibit H, Desorber Assembly Layout, Ford Oakville Plant, dated Mar. 21, 2007.
Exhibit I, Flow Defector, Ford Oakville Plant, excerpts from PID demonstrating cooling system dated Mar. 5, 2007.
Exhibit J, Kureha Brochure, Bead-shaped Activated Carbon (BAC), Rev. 2006.1.
Exhibit G, Side Stream Reactivator P&ID Model, dated Nov. 22, 1997, for Intel Fab 12 in Chandler, Arizona demonstrating the use of SSR treated mass of carbon (BAC) to the actual working volume of BAC.
Exhibit K, Master Training Document—Intel, pp. 1-20, circa 1998, see p. 3, provides information about carbon apparent density (AD) or bulk density. p. 16, item 1 for inlet differential pressure.
Exhibit L, Intel FAB 12 Facility, Operation and Maintenance Manual, Chandler AZ, Apr. 1997, pp. 1-23. See p. 18, and p. 20.
Exhibit M, Gastak, Technical Improvement, 018, Oct. 1976, Taiyo Kaken Co., Ltd., GUT Project, pp. 1-50.
International Search Report and Written opinion for PCT Application No. PCT/US2019/015727, dated Apr. 25, 2019, pp. 9.
Declaration 2 of Harold R. Cowles, U.S. Appl. No. 16/965,551, dated Oct. 25, 2022.
Exhibit E, Process Instrumentation Diagram (PID), Mar. 27, 2007, demonstrating the process flow schematic for a system and method of controlling emissions and/or a composition of VOCs that may be removed and/or collected from a drying process.
Exhibit H, VOC abatement System for Denso, 2' Airlift Nozzle, dated Sep. 24, 2015, an excerpt from design schematics demonstrating an eductor diagram.
Exhibit I, Kureha Corp. Japan, Kureha Brochure, Bead-shaped Activated Carbon (BAC), Rev. 2006.1 advertising bead-shaped activated carbon with sorbent beads used in adsorber/desorber VOC abatement.
Exhibit F, Environmental C&B Inc., Side Stream Reactivator P&ID Model, Nov. 22, 1997. Design model for Intel Fab 12 in Chandler, Arizona, demonstrating the use of SSR treated mass carbon (BAC) to the actual working volume of BAC.
Exhibit J, Master Training Document—Intel, pp. 1-20, circa 1998, described as Best Known Methodology for use of fluidized bed adsorbers and SSRs.
Exhibit K, VOC Abatement System, Intel FAB 12 Facility, Operation and Maintenance Manual, Apr. 1997, pp. 1-23. See p. 18, daily check list, item 1 refers to the inlet diffuser pressure. p. 20 discusses the "specific gravity" procedure, a.k.a. the adsorber/desorber procedure.
Exhibit L, Gastak, Technical Improvement, 018, Oct. 1976, Taiyo Kaken Co., Ltd., GUT Project, pp. 1-50.

\* cited by examiner

METHODS AND SYSTEMS FOR CONTROLLING EMISSIONS FROM WOOD DRYING PROCESSES

CROSS-REFERENCE TO RELATED APPLICATIONS

The present application is a national phase application based on PCT/US2019/015727, filed Jan. 29, 2019, which claims priority to U.S. Provisional Application No. 62/623,192, filed on Jan. 29, 2018; U.S. Provisional Application No. 62/623,204, filed on Jan. 29, 2018; and U.S. Provisional Application No. 62/623,211, filed on Jan. 29, 2018, the contents of which are hereby incorporated by reference herein in their entireties.

1. FIELD OF THE INVENTION

Methods and systems for obtaining exhaust streams from wood drying processes and controlling emissions from said exhaust streams are provided herein. The present disclosure provides various treatments that can be applied to process exhaust streams from wood dryers to obtain an exhaust stream suitable for downstream recovery of terpenes from the exhaust stream. Additionally, the disclosed methods and systems use a fluidized bed containing a sorbent to reduce and/or remove volatile components from wood drying processes.

2. BACKGROUND OF THE INVENTION

Emissions from industrial processes are heavily regulated by various governmental agencies at the state and federal level. The goals of these regulations include the reduction of greenhouse gas emissions, including $CO_2$ emissions; decreasing the consumption of fossil fuels; and reducing ground level ozone and secondary particulate matter, both of which can be driven by $NO_x$ emissions.

Wood drying operations generate exhaust streams containing a number of regulated pollutants. Per regulations applicable to new "major" sources of air pollutants or "major modifications" at existing major sources, such pollutants must be controlled using the Best Available Control Technology (BACT). Current industry standards require exhaust from wood drying processes to meet applicable emissions standards and/or to be treated with a control device to reduce emissions of hazardous air pollutants (HAPs)—including certain volatile organic compounds (VOCs). The control device most commonly used to reduce HAPs and VOCs from wood drying processes is a Regenerative Thermal Oxidizer (RTO), which combusts volatile components from the exhaust stream prior to emission into the atmosphere. However, combustion in RTOs is energy intensive, consuming large amounts of fuel and electricity. Combustion also results in large amounts of $NO_x$ emissions and greenhouse gases, such as $CO_2$.

RTOs typically operate in a dual chamber configuration, wherein the incoming high temperature exhaust stream is further heated to cause combustion, and the resulting exhaust stream is alternated between combustion chambers to enhance heat recovery. Such RTOs can include multiple moving parts, requiring periodic maintenance and replacement at high cost. Additionally, exhaust from wood drying operations contains many components not found in other industrial processes, which can clog the RTO over time. As such, RTOs require extensive downtime for maintenance and cleaning, during which wood drying operations must be halted.

Thus, there remains a need in the art for alternative methods and systems for processing exhaust from wood drying operations, for generating exhaust streams that can be processed by systems other than RTOs, and for effectively controlling emissions, particularly from wood drying operations. The disclosed subject matter addresses these and other needs.

3. SUMMARY

The presently disclosed subject matter provides techniques for controlling emissions in exhaust streams from wood drying processes. As embodied herein, the amount of undesirable emissions in such exhaust streams can be reduced by contacting the exhaust stream with a sorbent to adsorb at least a portion of the emissions from the exhaust stream.

Thus, in certain aspects, the present disclosure provides systems for controlling emissions from a wood drying process. As embodied herein, such a system can include an exhaust stream from a wood drying process and an adsorber, coupled to the exhaust stream, and including a sorbent for removing volatile organic compounds from the exhaust stream to generate a purified air stream.

In certain embodiments, the system can further include a vent for releasing the purified air stream into the atmosphere. As embodied herein, the adsorber can include one or more fluidized beds. Where multiple fluidized beds are present, the beds can be arranged in series or in parallel. As embodied herein, the sorbent can additionally remove one or more of particulate matter, methanol, and/or formaldehyde from the exhaust stream. For example, and not limitation, the sorbent can comprise activated carbon. In certain embodiments, the apparent density of the sorbent can be between about 0.6 g/mL to about 0.86 g/mL or between about 0.78 g/mL to about 0.80 g/mL. In certain embodiments, spent activated carbon can be reactivated by a side stream reactivator. For example, and not limitation, the side stream reactivator can reactivate between about 0.1% and about 10% of spent activated carbon per day. The system can include a hopper, coupled to the adsorber, for providing the sorbent to the adsorber. In certain embodiments, the hopper can be coupled to an air inlet stream for drying sorbent within the hopper.

Additionally or alternatively, in certain embodiments, the system can include features for recycling all or a portion of the purified airstream to the adsorber to maintain a flow rate through the adsorber. For example, the flow rate through the adsorber can be maintained within a variation of about 20% or less, preferably a variation of about 10% or less. As embodied herein, the system can further include a desorber, coupled to the adsorber, for desorbing terpenes, formaldehyde, methanol, acetic acid, acetone, and fatty acids from the sorbent. In certain embodiments, the adsorber has an operating temperature of between about 130° F. to about 220° F.

As embodied herein, systems of the present disclosure can reduce an amount of volatile organic compounds in the exhaust stream by at least about 90%. Additionally or alternatively, the systems disclosed herein can reduce an amount of particulate matter in the exhaust stream by at least about 50% on a grains per dry standard cubic foot basis and/or reduce an amount of methanol and/or formaldehyde in the exhaust stream by at least about 10% as compared to the untreated exhaust stream. As a result, the purified air stream can contain less than about 200 ppm, or less than about 25 ppm of volatile organic compounds as measured as total hydrocarbons on a propane calibration basis, and/or less than about 10 ppm of formaldehyde, methanol, phenol, acrolein, acetaldehyde, and propionaldehyde as measured as total hydrocarbons on a propane calibration basis and/or less than about 150 mg/dscm of total particulate matter. As embodied herein, the purified air stream can meet regulatory requirements for release directly into the environment. In certain embodiments, the systems disclosed herein do not require a regenerative thermal oxidizer.

The present disclosure further provides a system for controlling emissions from a wood drying process. As embodied herein, such a system can include an exhaust stream from a wood drying process and an adsorber, coupled to the exhaust stream, and including a sorbent for removing volatile organic compounds from the exhaust stream to generate a purified air stream. The adsorber can include a fluidized bed. The system can reduce an amount of volatile organic compounds in the exhaust stream by at least about 90%. In certain embodiments, the system does not require a regenerative thermal oxidizer.

In certain other aspects, the present disclosure provides methods of controlling emissions from a wood drying process, which can include providing an exhaust stream to an adsorber, wherein the adsorber comprises a sorbent, and contacting the exhaust stream with the sorbent to remove volatile organic compounds from the exhaust stream and generate a purified air stream.

As embodied herein, the methods can reduce an amount of volatile organic compounds in the exhaust stream by at least about 90%. Additionally or alternatively, the methods disclosed herein can reduce an amount of particulate matter in the exhaust stream by at least about 50% on a grains per dry standard cubic foot basis and/or reduce an amount of methanol and/or formaldehyde in the exhaust stream by at least about 10% as compared to the untreated exhaust stream. As a result, the purified air stream can contain less than about 200 ppm, or less than about 25 ppm of volatile organic compounds as measured as total hydrocarbons on a propane calibration basis, and/or less than about 10 ppm of formaldehyde, methanol, phenol, acrolein, acetaldehyde, and propionaldehyde as measured as total hydrocarbons on a propane calibration basis and/or less than about 150 mg/dscm of total particulate matter. As embodied herein, the purified air stream can meet regulatory requirements for release directly into the environment. The presently disclosed methods can further include desorbing terpenes, formaldehyde, methanol, acetic acid, acetone, and fatty acids from the sorbent following adsorption. In certain embodiments, the methods can maintain a sorbent apparent density of between about 0.6 g/mL to about 0.86 g/mL or about 0.78 g/mL to about 0.80 g/mL. As embodied herein, the methods can include maintaining an operating temperature of the adsorber at between about 130° F. to about 220° F. In certain embodiments, the methods disclosed herein do not require thermal oxidation.

As embodied herein, methods of the present disclosure can further comprise releasing the purified air steam into the atmosphere through a vent. As embodied herein, the adsorber can include one or more fluidized beds. Where multiple fluidized beds are present, the beds can be arranged in series or in parallel. As embodied herein, the sorbent can additionally remove one or more of particulate matter, methanol, and/or formaldehyde from the exhaust stream. For example, and not limitation, the sorbent can comprise activated carbon. In certain embodiments, the method can further include reactivating spent activated carbon by a side stream reactivator. For example, and not limitation, the side stream reactivator can reactivate between about 0.1% and about 10% of spent activated carbon per day. The method can further include providing sorbent to the adsorber through a hopper, coupled to the adsorber. In certain embodiments, the method can further include drying sorbent within the hopper through an air inlet stream, coupled to the adsorber. Additionally or alternatively, in certain embodiments, the method can further include recycling through a system all or a portion of the purified airstream to the adsorber to maintain a flow rate through the adsorber. For example, the flow rate through the adsorber can be maintained within a variation of about 20% or less, preferably a variation of about 10% or less.

The present disclosure further provides a method of controlling emissions from a wood drying process, which can include providing an exhaust stream to an adsorber, wherein the adsorber comprises a sorbent, and contacting the exhaust stream with the sorbent to remove volatile organic compounds from the exhaust stream and generate a purified air stream. The adsorber can include a fluidized bed. The method can reduce an amount of volatile organic compounds in the exhaust stream by at least about 90%. In certain embodiments, the method does not require thermal oxidation.

Additional aspects of the present disclosure provide the following embodiments.

Embodiment I: A system for controlling emissions from a wood drying process, comprising: an exhaust stream from a wood drying process; and an adsorber, coupled to the exhaust stream, and comprising: a sorbent for removing volatile organic compounds from the exhaust stream to generate a purified air stream.

Embodiment II: The system of Embodiment I, further comprising a vent for releasing the purified air stream into the atmosphere.

Embodiment III: The system of Embodiments I or II, wherein the adsorber comprises a fluidized bed.

Embodiment IV: The system of any of Embodiments I through III, wherein the adsorber comprises two or more fluidized beds arranged in series or in parallel.

Embodiment V: The system of any of Embodiments I through IV, wherein the sorbent further removes one or more of particulate matter, methanol, and/or formaldehyde from the exhaust stream.

Embodiment VI: The system of any of Embodiments I through V, wherein the sorbent comprises activated carbon.

Embodiment VII: The system of any of Embodiments I through VI, wherein spent activated carbon can be reactivated by a side stream reactivator.

Embodiment VIII: The system of any of Embodiments I through VII, wherein the side stream reactivator reactivates between about 0.1% to about 10% of spent activated carbon per day.

Embodiment IX: The system of any of Embodiments I through VIII, wherein the sorbent apparent density is between about 0.6 g/mL to about 0.86 g/mL.

Embodiment X: The system of any of Embodiments I through IX, wherein the sorbent apparent density is between about 0.78 g/mL to about 0.80 g/mL.

Embodiment XI: The system of any of Embodiments I through X, further comprising a hopper, coupled to the adsorber, for providing the sorbent to the adsorber.

Embodiment XII: The system of any of Embodiments I through XI, further comprising an air inlet stream, coupled to the hopper, for drying sorbent within the hopper.

Embodiment XIII: The system of any of Embodiments I through XII, further comprising a system for recycling all or a portion of the purified airstream to the adsorber to maintain a flow rate through the adsorber.

Embodiment XIV: The system of any of Embodiments I through XIII, wherein the flow rate through the adsorber is maintained within a variation of about 20% or less.

Embodiment XV: The system of any of Embodiments I through XIV, wherein the flow rate through the adsorber is maintained within a variation of about 10% or less.

Embodiment XVI: The system of any of Embodiments I through XV, further comprising a desorber, coupled to the adsorber, for desorbing terpenes, formaldehyde, methanol, acetic acid, acetone, and fatty acids from the sorbent.

Embodiment XVII: The system of any of Embodiments I through XVI, wherein the adsorber has an operating temperature of between about 130° F. to about 220° F.

Embodiment XVIII: The system of any of Embodiments I through XVII, wherein an amount of volatile organic compounds in the exhaust stream is reduced by at least about 90%.

Embodiment XIX: The system of any of Embodiments I through XVIII, wherein an amount of particulate matter in the exhaust stream is reduced by at least about 50% on a grains per dry standard cubic foot basis.

Embodiment XX: The system of any of Embodiments I through XIX, wherein an amount of methanol and/or formaldehyde in the exhaust stream is reduced by at least about 10%.

Embodiment XXI: The system of any of Embodiments I through XX, wherein the purified air stream comprises less than about 200 ppm volatile organic compounds as measured as total hydrocarbons on a propane calibration basis.

Embodiment XXII: The system of any of Embodiments I through XXI, wherein the purified air stream comprises less than about 25 ppm volatile organic compounds as measured as total hydrocarbons on a propane calibration basis.

Embodiment XXIII: The system of any of Embodiments I through XXII, wherein the purified air stream comprises less than about 10 ppm formaldehyde, methanol, phenol, acrolein, acetaldehyde, and propionaldehyde as measured as total hydrocarbons on a propane calibration basis.

Embodiment XXIV: The system of any of Embodiments I through XXIII, wherein the system does not require a regenerative thermal oxidizer.

Embodiment XXV: The system of any of Embodiments I through XXIV, wherein the purified air stream comprises less than about 150 mg/dscm of total particulate matter.

Embodiment XXVI: The system of any of Embodiments I through XXV, wherein the purified air stream meets regulatory requirements for release directly into the environment.

Embodiment XXVII: A method of controlling emissions from a wood drying process, comprising: providing an exhaust stream to an adsorber, wherein the adsorber comprises a sorbent; and contacting the exhaust stream with the sorbent to remove volatile organic compounds from the exhaust stream and generate a purified air stream.

Embodiment XXVIII: The method of Embodiment XXVII, wherein the method reduces an amount of volatile organic compounds in the exhaust stream by at least about 90%.

Embodiment XXIX: The method of any of Embodiments XXVII or XXVIII, wherein the method reduces an amount of particulate matter in the exhaust stream by at least about 50% on a grains per dry standard cubic foot basis.

Embodiment XXX: The method of any of Embodiments XXVII through XXIX, wherein the method reduces an amount of methanol and/or formaldehyde in the exhaust stream by at least about 10%.

Embodiment XXXI: The method of any of Embodiments XXVII through XXX, wherein the purified air stream comprises less than about 200 ppm volatile organic compounds as measured as total hydrocarbons on a propane calibration basis.

Embodiment XXXII: The method of any of Embodiments XXVII through XXXI, wherein the purified air stream comprises less than about 25 ppm volatile organic compounds as measured as total hydrocarbons on a propane calibration basis.

Embodiment XXXIII: The method of any of Embodiments XXVII through XXXII, wherein the purified air stream comprises less than about 10 ppm formaldehyde, methanol, phenol, acrolein, acetaldehyde, and propionaldehyde as measured as total hydrocarbons on a propane calibration basis.

Embodiment XXXIV: The method of any of Embodiments XXVII through XXXIII, wherein the method does not require thermal oxidation.

Embodiment XXXV: The method of any of Embodiments XXVII through XXXIV, wherein the purified air stream comprises less than about 150 mg/dscm of total particulate matter.

Embodiment XXXVI: The method of any of Embodiments XXVII through XXXV, wherein the purified air stream meets regulatory requirements for release directly into the environment.

Embodiment XXXVII: The method of any of Embodiments XXVI through XXXVI, further comprising desorbing terpenes, formaldehyde, methanol, acetic acid, acetone, and fatty acids from the sorbent.

Embodiment XXXIX: The method of any of Embodiments XXVI through XXXVII, further comprising maintaining a sorbent apparent density of between about 0.6 g/mL to about 0.86 g/mL.

Embodiment XL: The method of any of Embodiments XXVI through XXXIX, further comprising maintaining a sorbent apparent density of between about 0.78 g/mL to about 0.80 g/mL.

Embodiment XLI: The method of any of Embodiments XXVI through XL, further comprising maintaining an operating temperature of the adsorber at between about 130° F. to about 220° F.

Embodiment XLII: The method of any of Embodiments XXVI through XLI, further comprising releasing the purified air stream into the atmosphere through a vent.

Embodiment XLIII: The method of any Embodiments XXVI through XLII, wherein the adsorber comprises a fluidized bed.

Embodiment XLIV: The method of any of Embodiments XXVI through XLIII, wherein the adsorber comprises two or more fluidized beds arranged in series or in parallel.

Embodiment XLVI: The method of any of Embodiments XXVI through XLIV, wherein the sorbent further removes one or more of particulate matter, methanol, and/or formaldehyde from the exhaust stream.

Embodiment XLVII: The method of any of Embodiments XXVI through XLVI, wherein the sorbent comprises activated carbon.

Embodiment XLVIII: The method of any of Embodiments XXVI through XLVII, further comprising reactivating spent activated carbon by a side stream reactivator.

Embodiment XLIX: The method of any of Embodiments XXVI through XLIVIII, wherein the side stream reactivator reactivates between about 0.1% to about 10% of spent activated carbon per day.

Embodiment L: The method of any of Embodiments XXVI through XLIX, further comprising providing sorbent to the adsorber through a hopper, coupled to the adsorber.

Embodiment LI: The method of any of Embodiments XXVI through L, further comprising drying sorbent within the hopper through an air inlet stream, coupled to the hopper.

Embodiment LII: The method of any of Embodiments XXVI through LI, further comprising recycling through a system all or a portion of the purified airstream to the adsorber to maintain a flow rate through the adsorber.

Embodiment LIII: The method of any of Embodiments XXVI through LII, wherein the flow rate through the adsorber is maintained within a variation of about 20% or less.

Embodiment LV: The method of any of Embodiments XXVI through LIII, wherein the flow rate through the adsorber is maintained within a variation of about 10% or less.

Embodiment LVI: A system for controlling emissions from a wood drying process, comprising: an exhaust stream from a wood drying process; and an adsorber, coupled to the exhaust stream, and comprising: a sorbent for removing volatile organic compounds from the exhaust stream to generate a purified air stream, wherein the adsorber comprises a fluidized bed, wherein an amount of volatile organic compounds in the exhaust stream is reduced by at least about 90%, and wherein the system does not require a regenerative thermal oxidizer.

Embodiment LVII: A method of controlling emissions from a wood drying process, comprising: providing an exhaust stream to an adsorber, wherein the adsorber comprises a sorbent; and contacting the exhaust stream with the sorbent to remove volatile organic compounds from the exhaust stream and generate a purified air stream, wherein the adsorber comprises a fluidized bed, and wherein an amount of volatile organic compounds in the exhaust stream is reduced by at least about 90%, and wherein the method does not require thermal oxidation.

The foregoing has outlined broadly the features and technical advantages of the present application in order that the detailed description that follows can be better understood. Additional features and advantages of the application will be described hereinafter which form the subject of the claims of the application. It should be appreciated by those skilled in the art that the conception and specific embodiment disclosed can be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

4. BRIEF DESCRIPTION OF THE DRAWINGS

FIG. 1 provides an illustration of a non-limiting example of an overall process flow schematic in accordance with certain embodiments of the presently disclosed methods and systems.

FIG. 2 provides a schematic illustration of a non-limiting example of an adsorber in accordance with certain embodiments of the presently disclosed methods and systems.

FIG. 3A provides a schematic illustration of a non-limiting example of a hopper for supplying fresh sorbent to an adsorber in accordance with certain embodiments of the presently disclosed methods and systems.

FIG. 3B provides a schematic illustration of the top view of the hopper of FIG. 3A.

FIG. 4 provides a schematic illustration of a non-limiting example of a desorber in accordance with certain embodiments of the presently disclosed methods and systems.

FIG. 5 provides a schematic illustration of a non-limiting example of a cooling system, including a condenser, in accordance with certain embodiments of the presently disclosed methods and systems.

FIG. 6 provides a schematic illustration showing the relative height of an eductor used in accordance with certain embodiments of the presently disclosed subject matter, as described in Example 2 of the present disclosure.

FIGS. 7A and 7B provide images of sorbent beads used in Example 4 of the present disclosure at 50× magnification. FIG. 7A shows an image of new (i.e., virgin) beads, whereas FIG. 7B shows an image of spent beads.

Figure 9A:
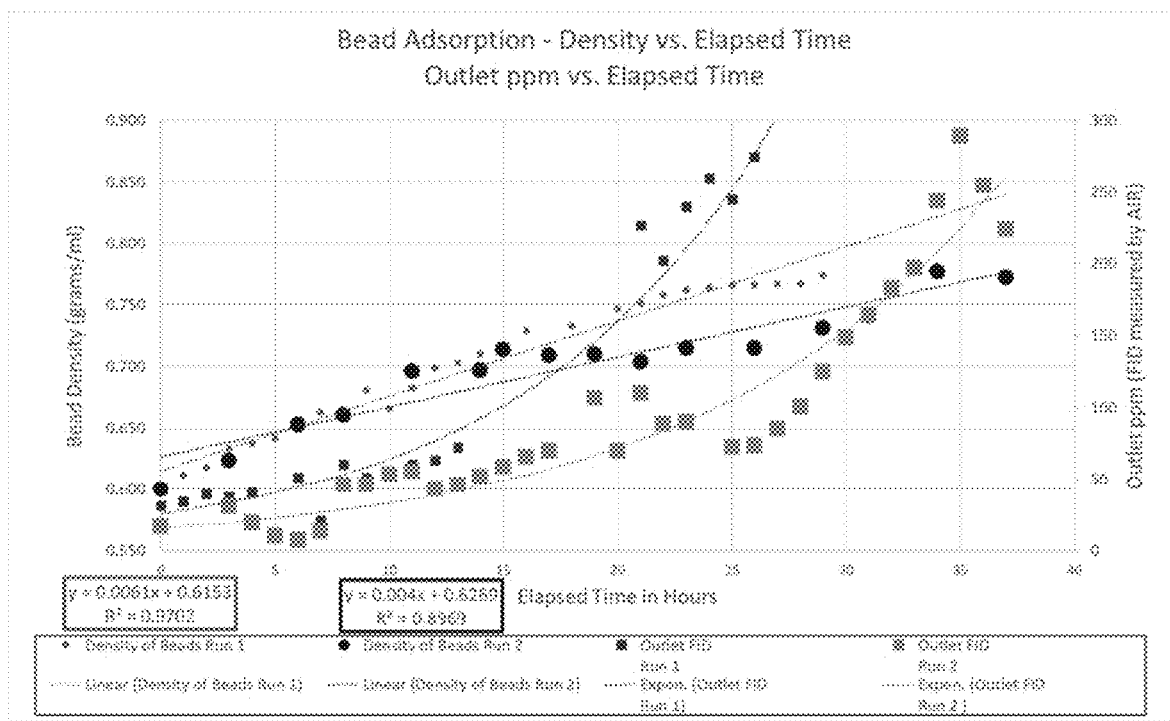
FIG. 9A shows sorbent bead density and hydrocarbon concentration at the outlet of a fluidized bed over time, as measured during the pilot trials of Example 5 of the present disclosure.
Figure 9B:
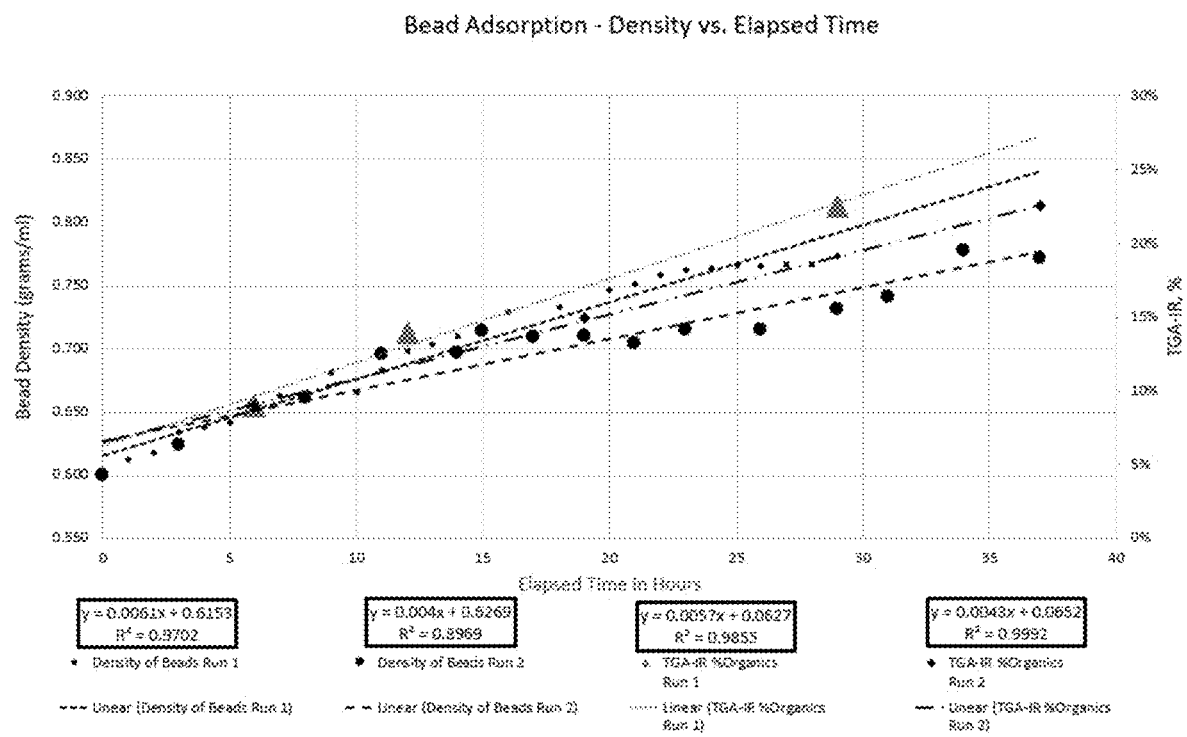
Figure 9B:
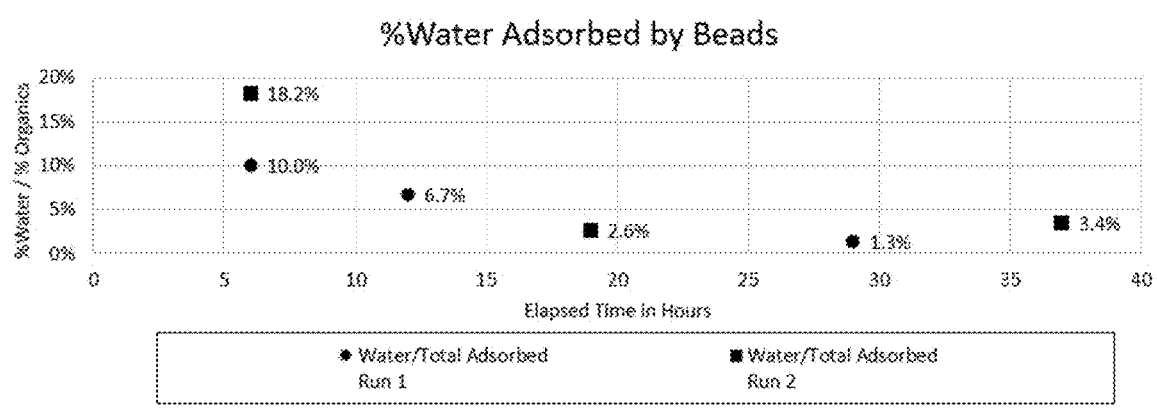

FIG. 9B shows the results of thermal gravimetric analysis on adsorbed sorbent, as described in Example 5 of the present disclosure. In the top panel of FIG. 9B, the percentage organics as measured by thermal gravimetric analysis is overlaid with bead density. The bottom panel of FIG. 9B shows the percentage of water adsorbed by the beads over time as measured by thermal gravimetric analysis.

Figure 9C:
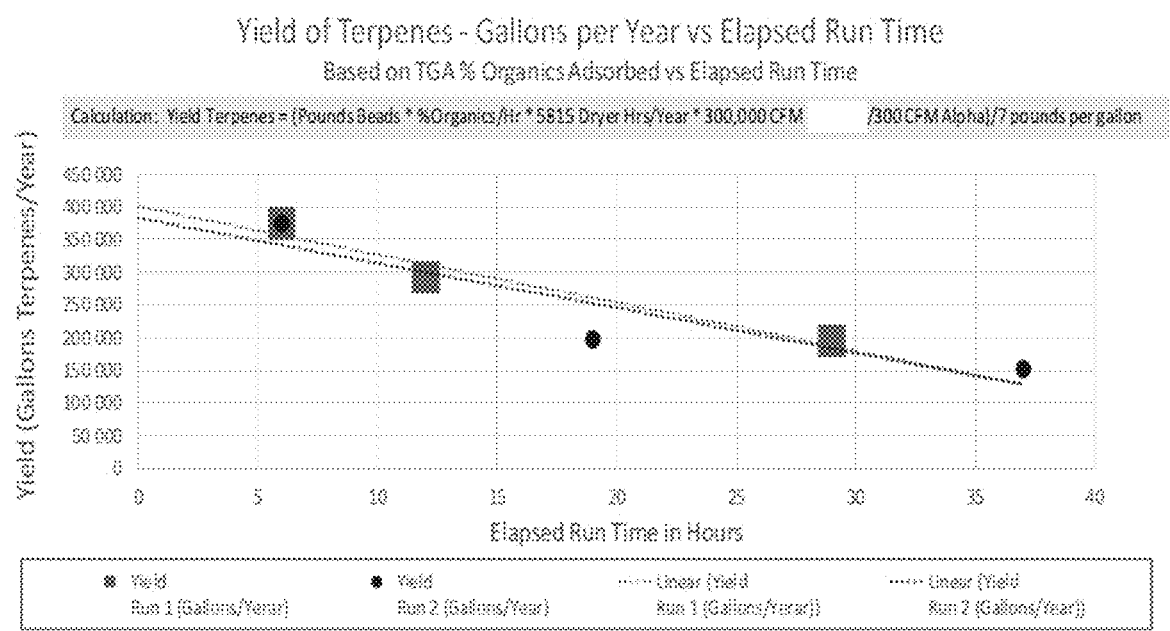

FIG. 9C provides the terpenes yield, extrapolated over a year as a function of run time, as calculated in Example 5 of the present disclosure.

Figure 9D:
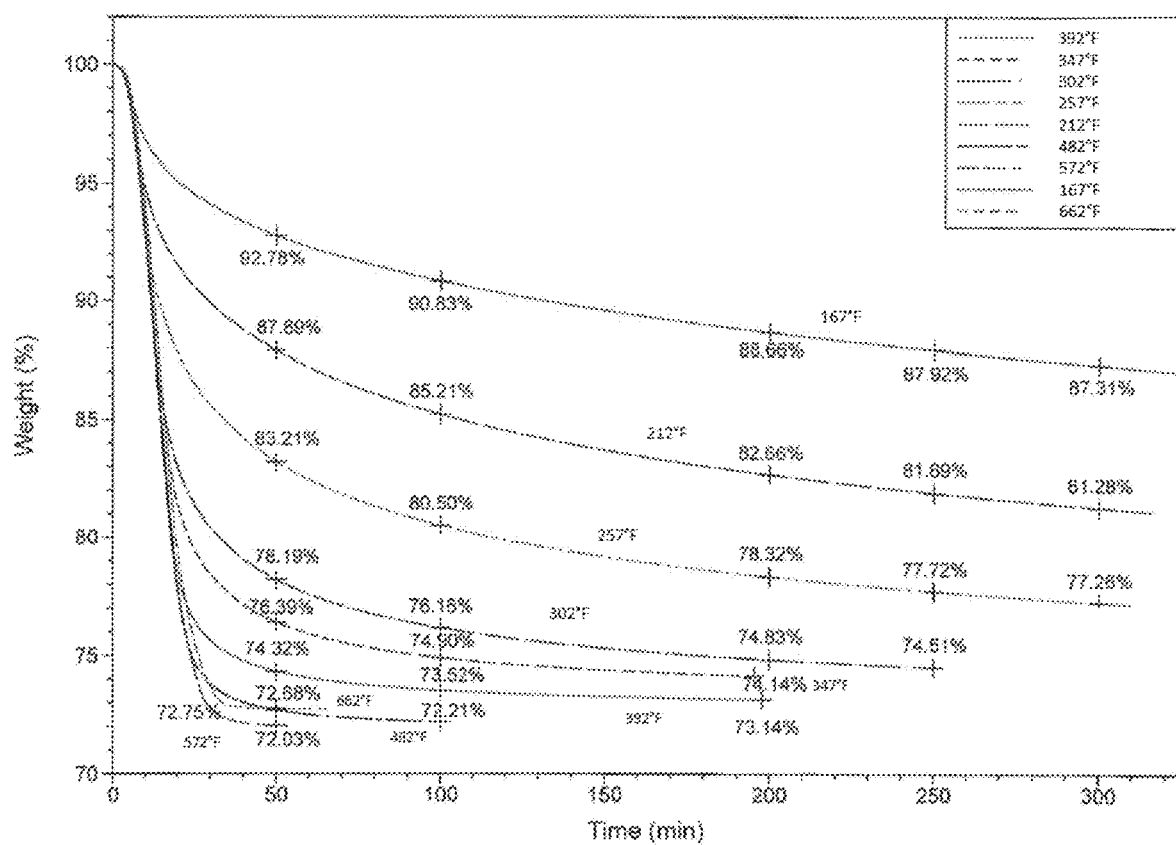

FIG. 9D shows the results of thermal gravimetric analysis, carried out isothermally, on adsorbed sorbent, as described in Example 5 of the present disclosure.

Figure 9E:
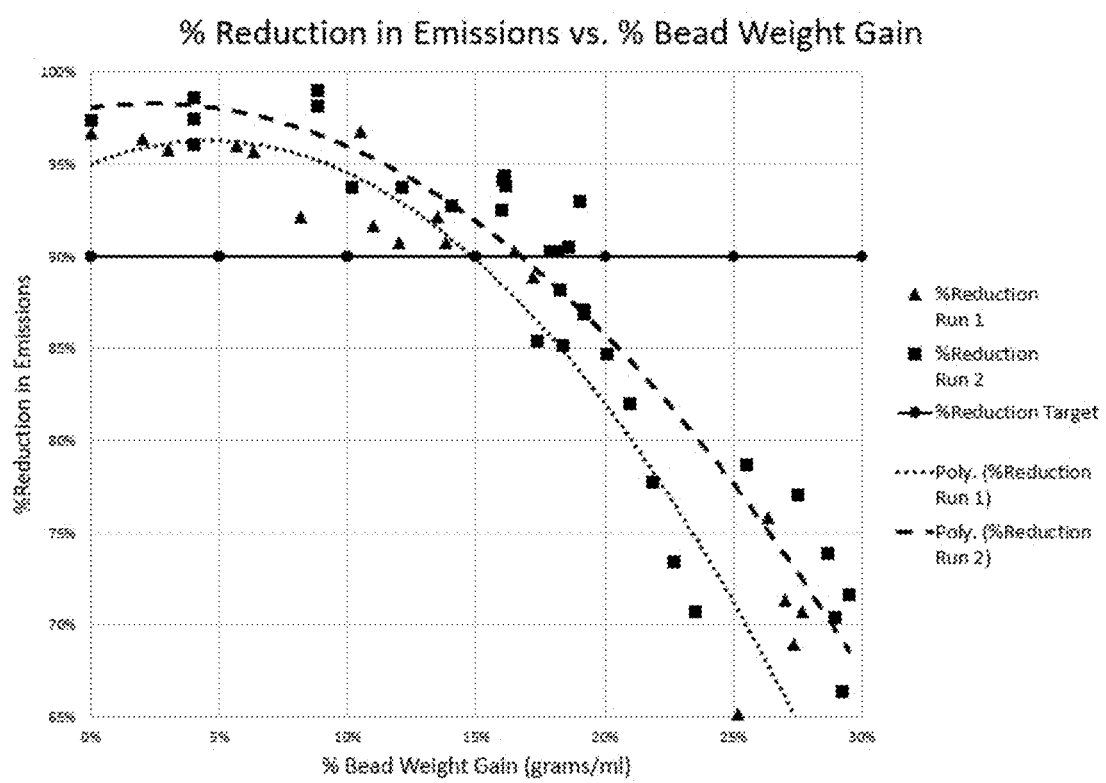

FIG. 9E compares the percentage reduction in volatile organic compounds (VOCs) (based on FID analysis) in a dryer exhaust stream after adsorption and the percentage weight gain of the sorbent used for adsorption, as described in Example 5 of the present disclosure.

Figure 9F:
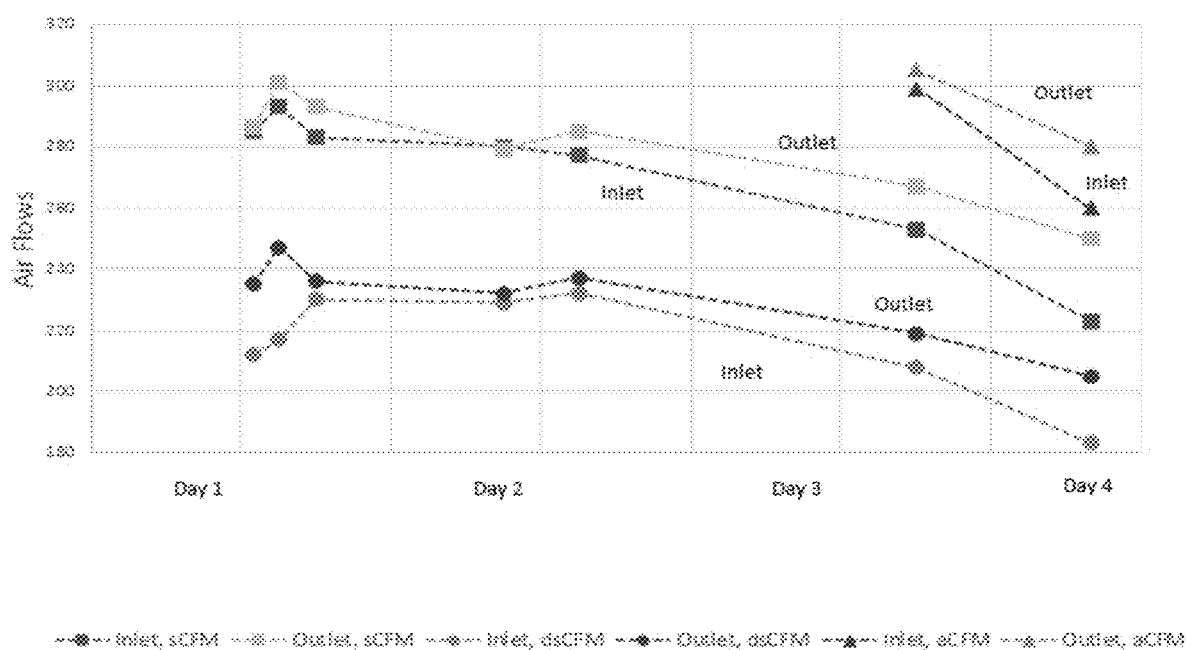

FIG. 9F shows the air flow at the inlet and outlet of the fluidized bed in terms of standard cubic feet per minute (scfm), dry standard cubic feet per minute (dscfm), and actual cubic feet per minute (acfm) in accordance with Example 5 of the present disclosure.

Figure 9G:
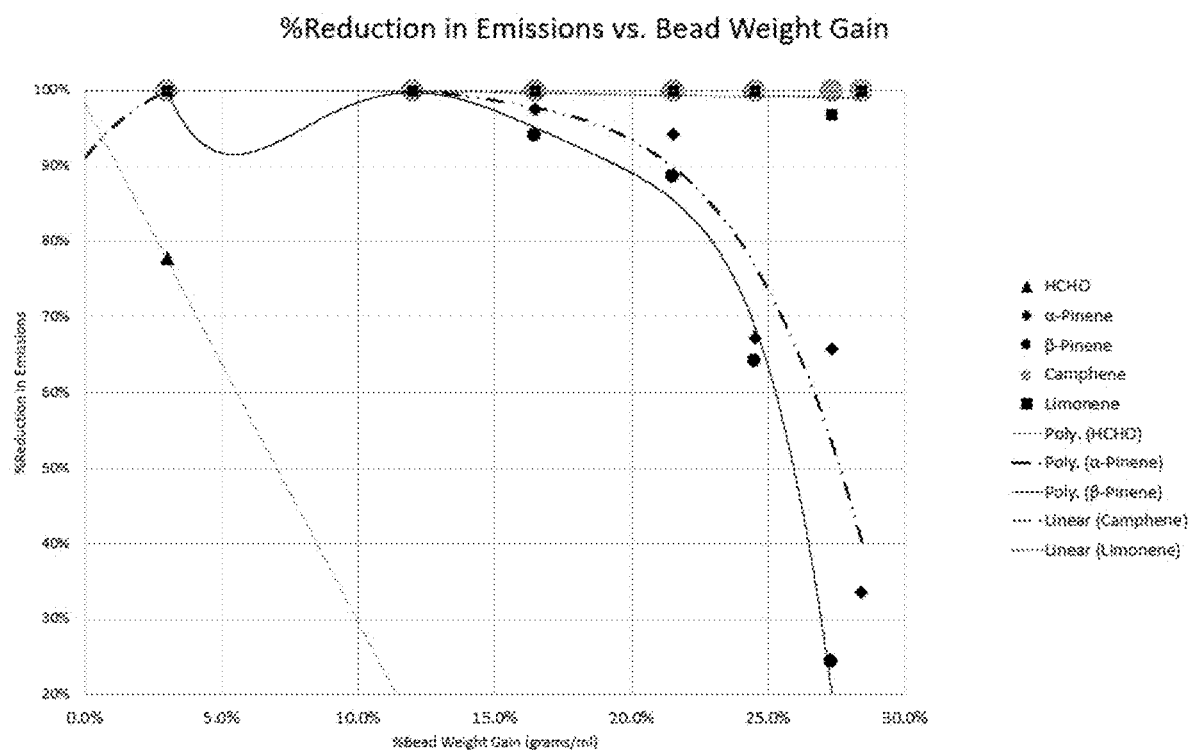

FIG. 9G compares the percentage reduction in VOCs (based on air samples from impingers) in a dryer exhaust stream after adsorption and the percentage weight gain of the sorbent used for adsorption, as described in Example 5 of the present disclosure.

Figure 9H:
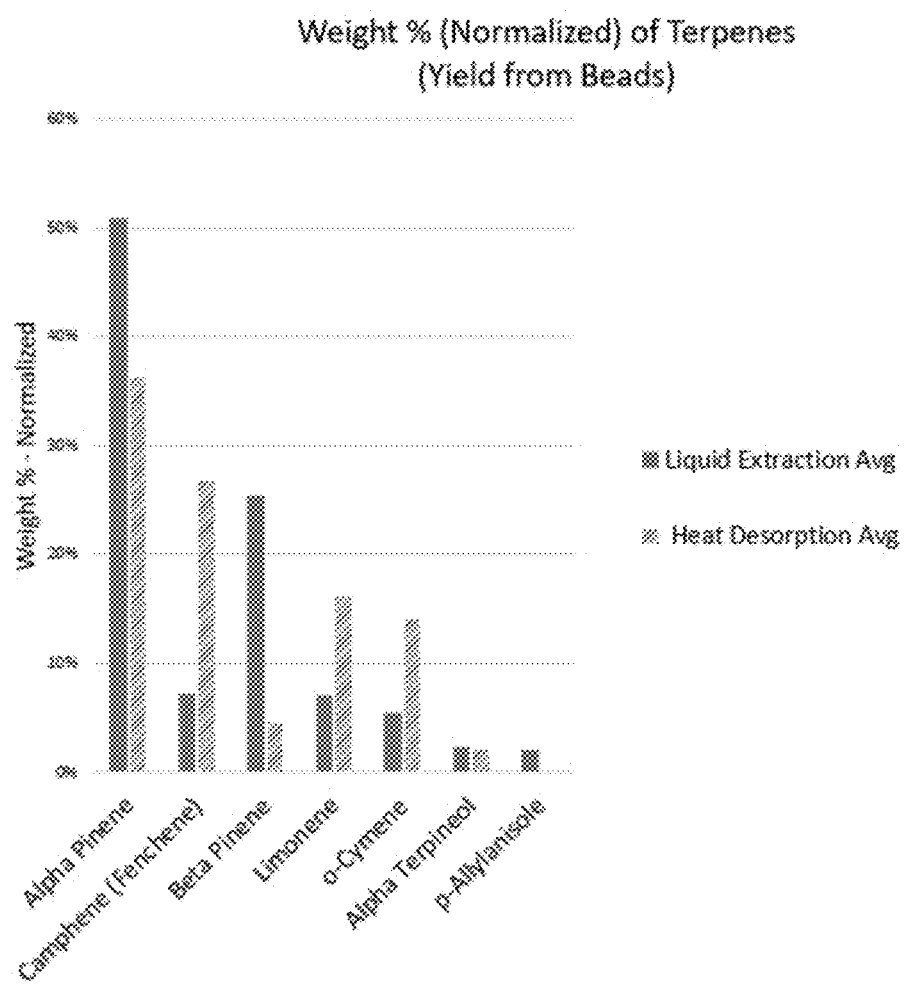

FIG. 9H compares the normalized terpene compositions in terpenes extracted from sorbent using thermal desorption as compared to liquid-liquid extraction at room temperature, as described in Example 5 of the present disclosure.

Figure 10A:
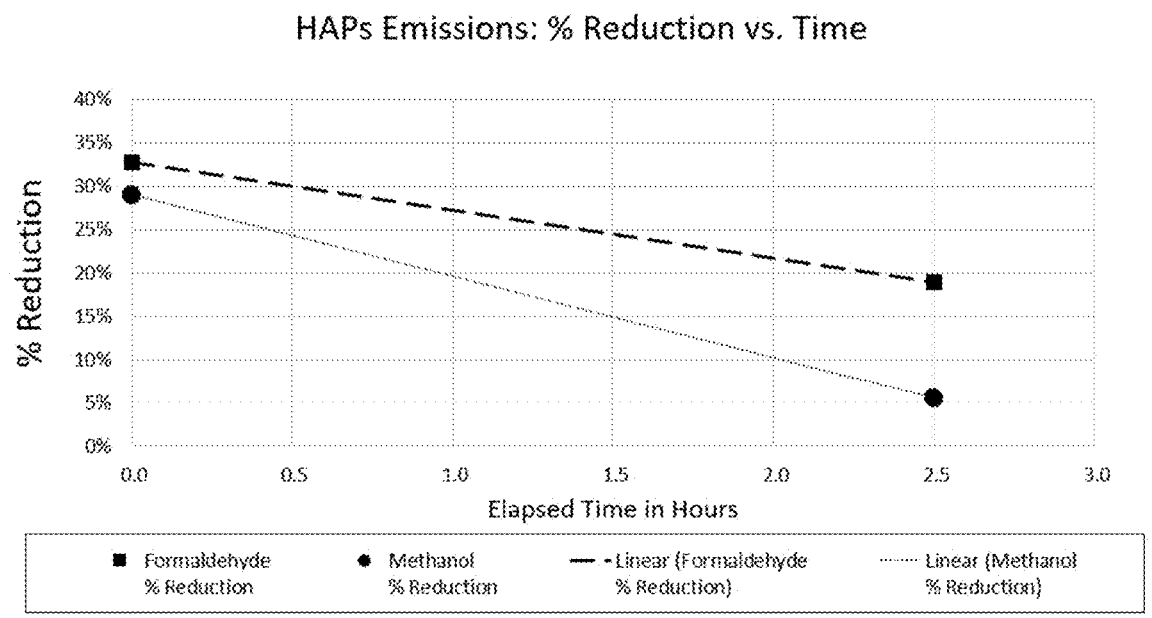

FIG. 10A shows the percentage reduction in hazardous air pollutants (HAPs) methanol and formaldehyde over a 2.5 hour run time, as measured by impingers in accordance with Example 6 of the present disclosure.

Figure 10B:
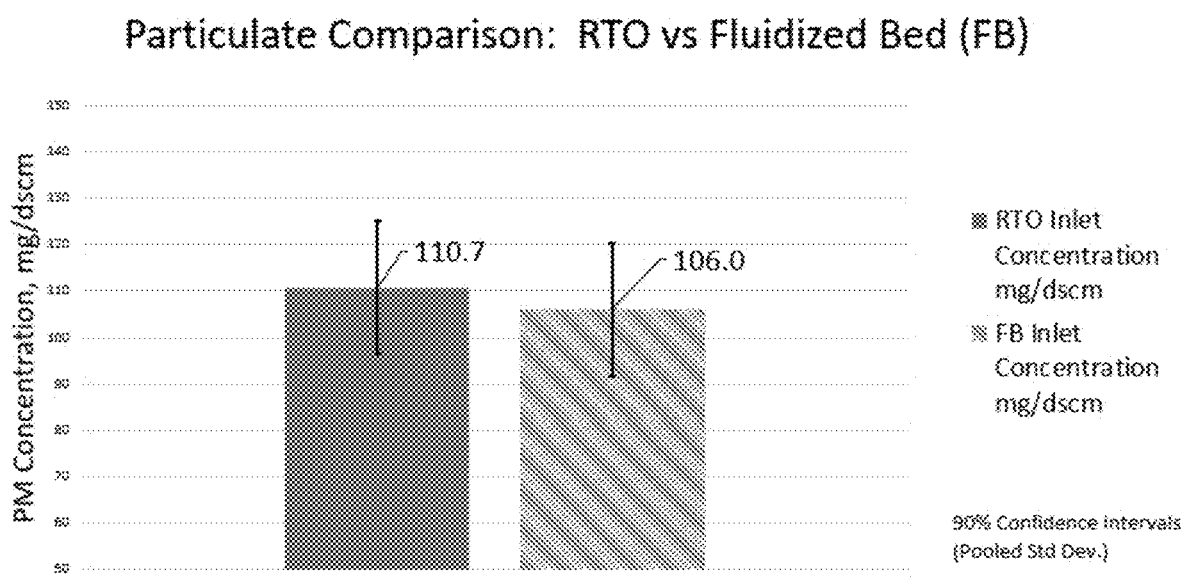

FIG. 10B compares the particulate matter concentration at the inlet of the fluidized bed and a conventional regenerative thermal oxidizer (RTO), as described in Example 6 of the present disclosure.

Figure 10C:
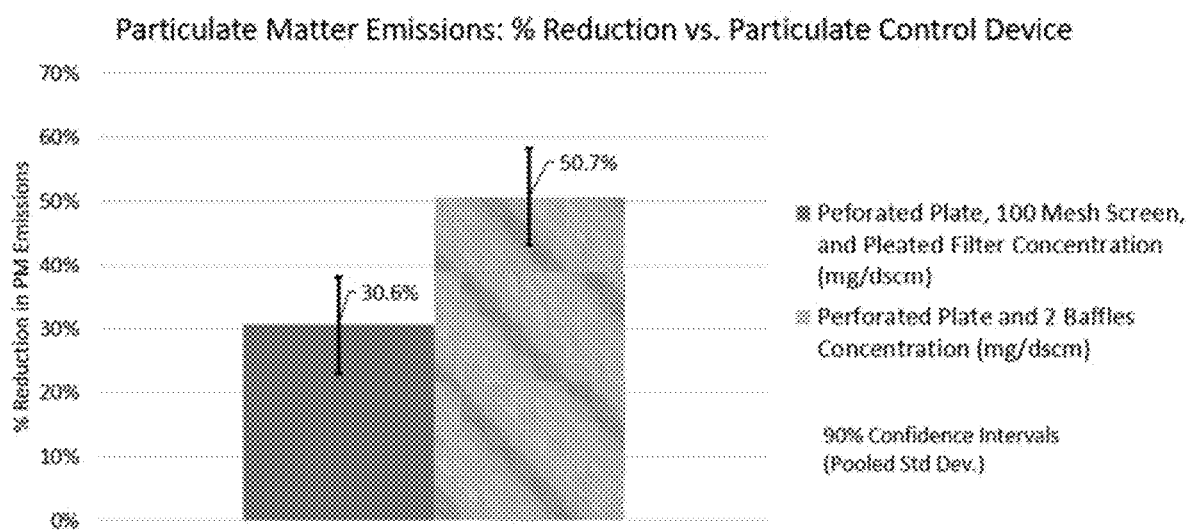

FIG. 10C compares the particulate matter reduction attributable to two different pre-treatment set ups, as described in Example 6 of the present disclosure.

Figure 10D:
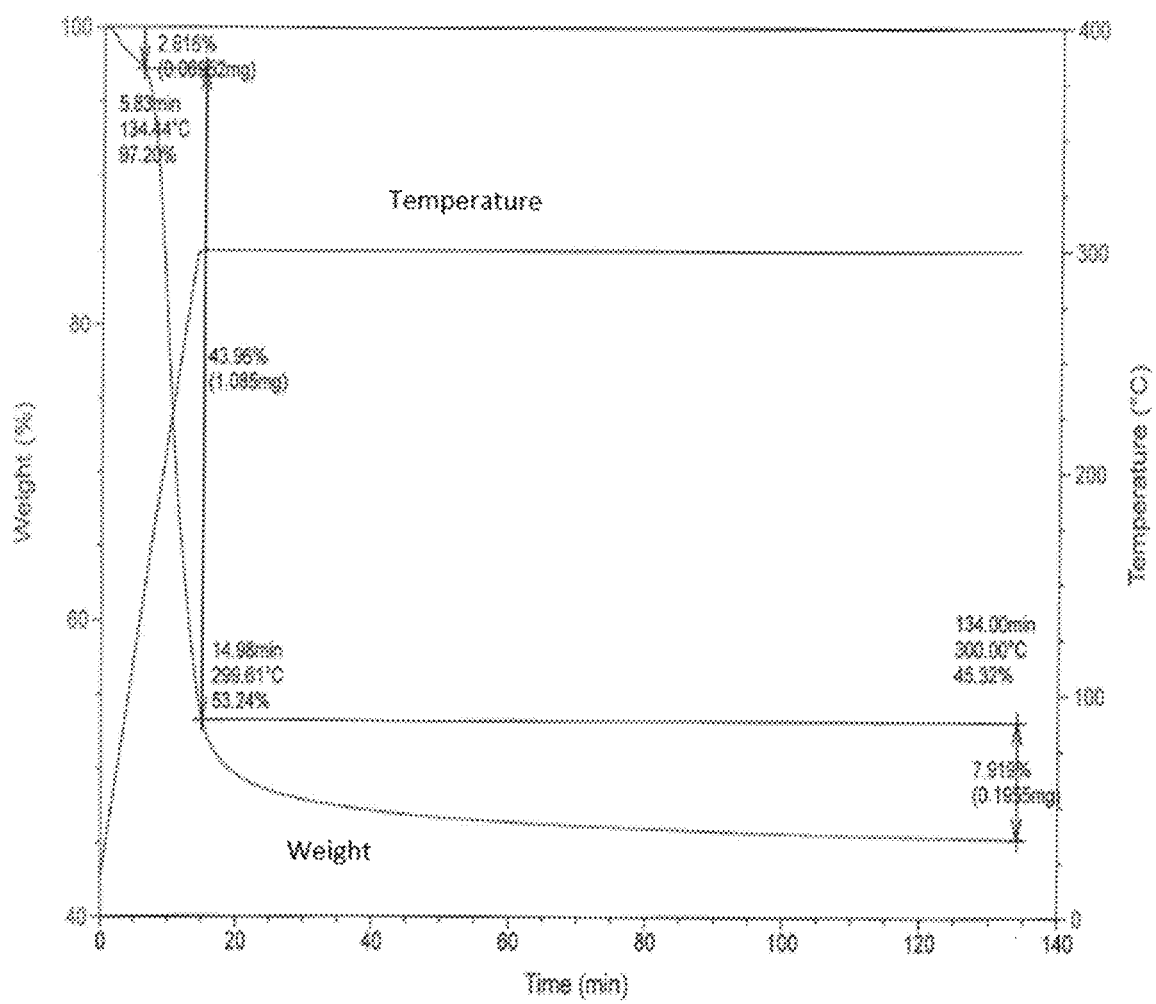

FIG. 10D shows the results of thermal gravimetric analysis on commercially available gum turpentine within a pre-treatment system, as described in Example 6 of the present disclosure.

Figure 11A:
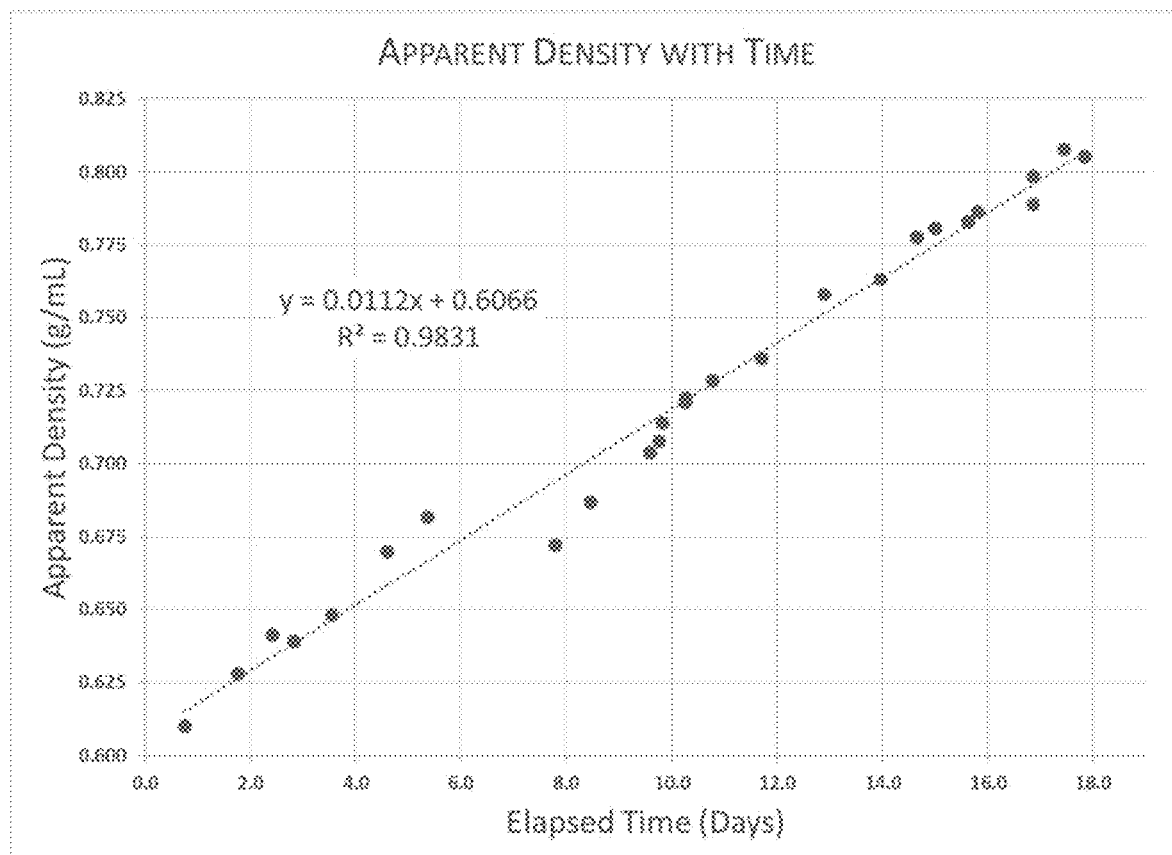

FIG. 11A shows the sorbent apparent density as a function of time in the side stream reactivation trials of Example 7 of the present disclosure.

Figure 11B:
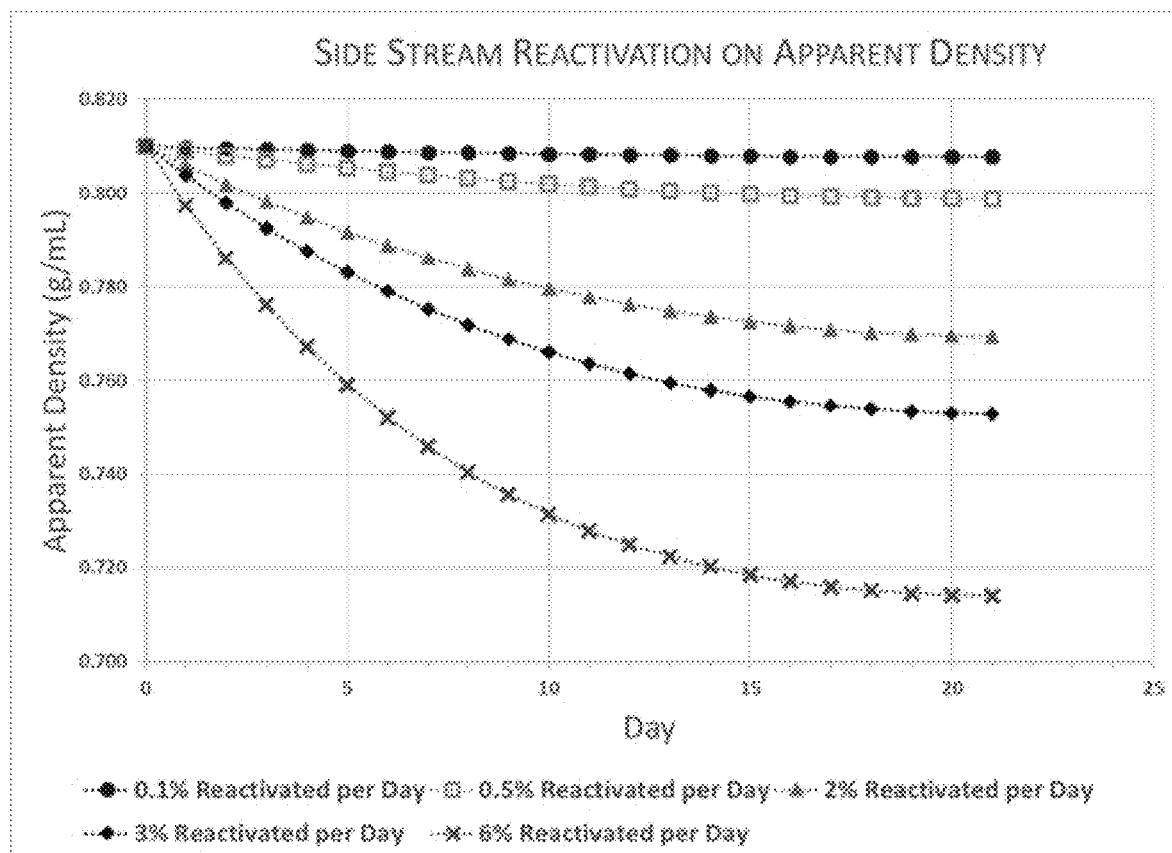

FIG. 11B shows the effect of side stream reactivation on sorbent apparent density, as described in Example 7 of the present disclosure.

Figure 12A:
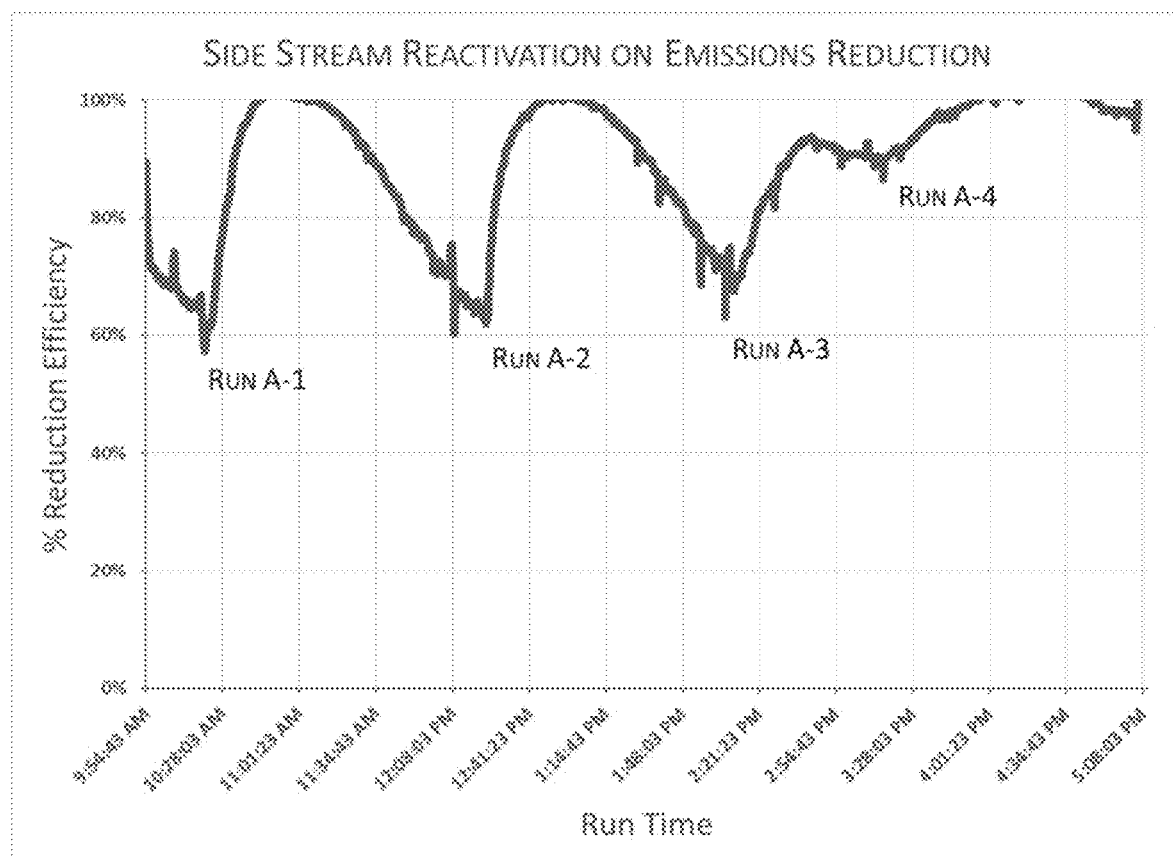

FIG. 12A shows the percent of reduction efficiency across a first trial as described in Example 8 of the present disclosure where sorbent apparent density was maintained at about 0.78 g/mL to about 0.805 g/mL.

Figure 12B:
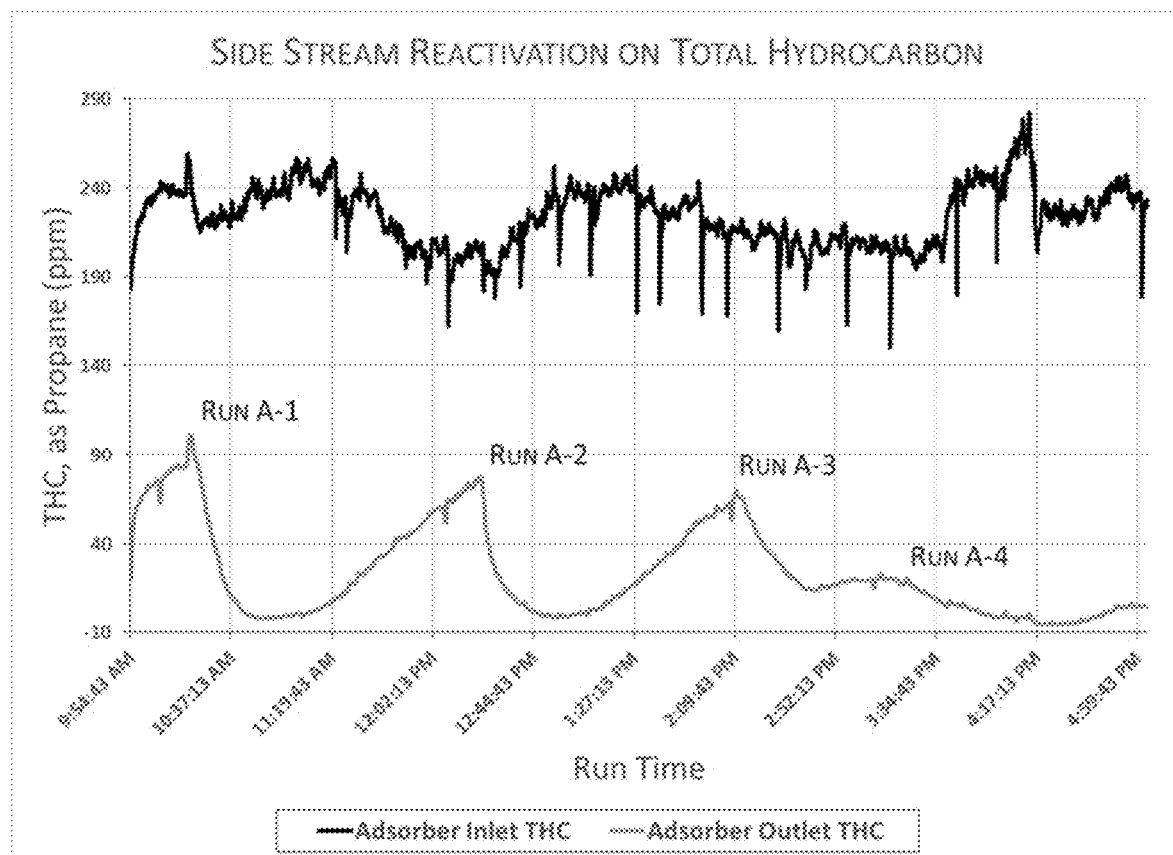

FIG. 12B shows the inlet versus outlet total hydrocarbon (THC) across a first trial as described in Example 8 of the present disclosure where sorbent apparent density was maintained at about 0.78 g/mL to about 0.805 g/mL.

Figure 13:
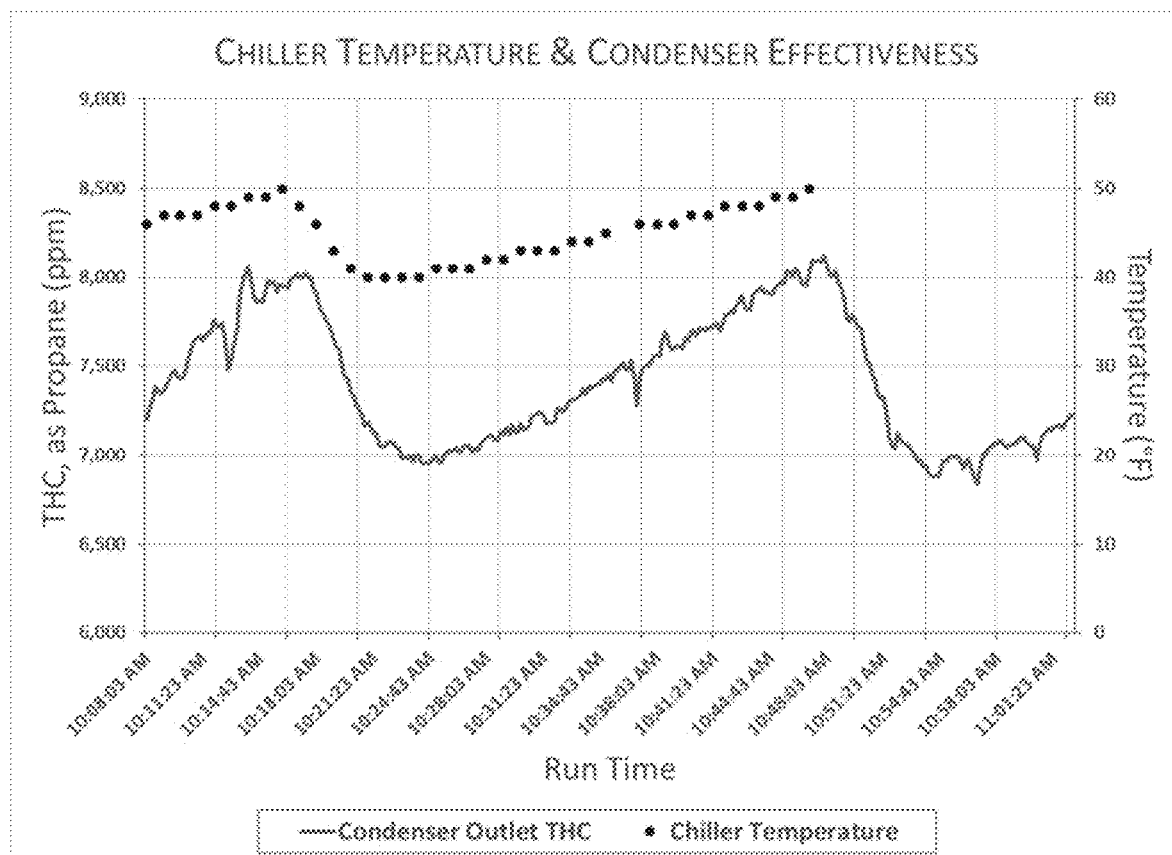

FIG. 13 shows a relationship between condenser chiller temperature and THC at the condenser outlet recycling back to desorber as described in Example 8 of the present disclosure.

Figure 14A:
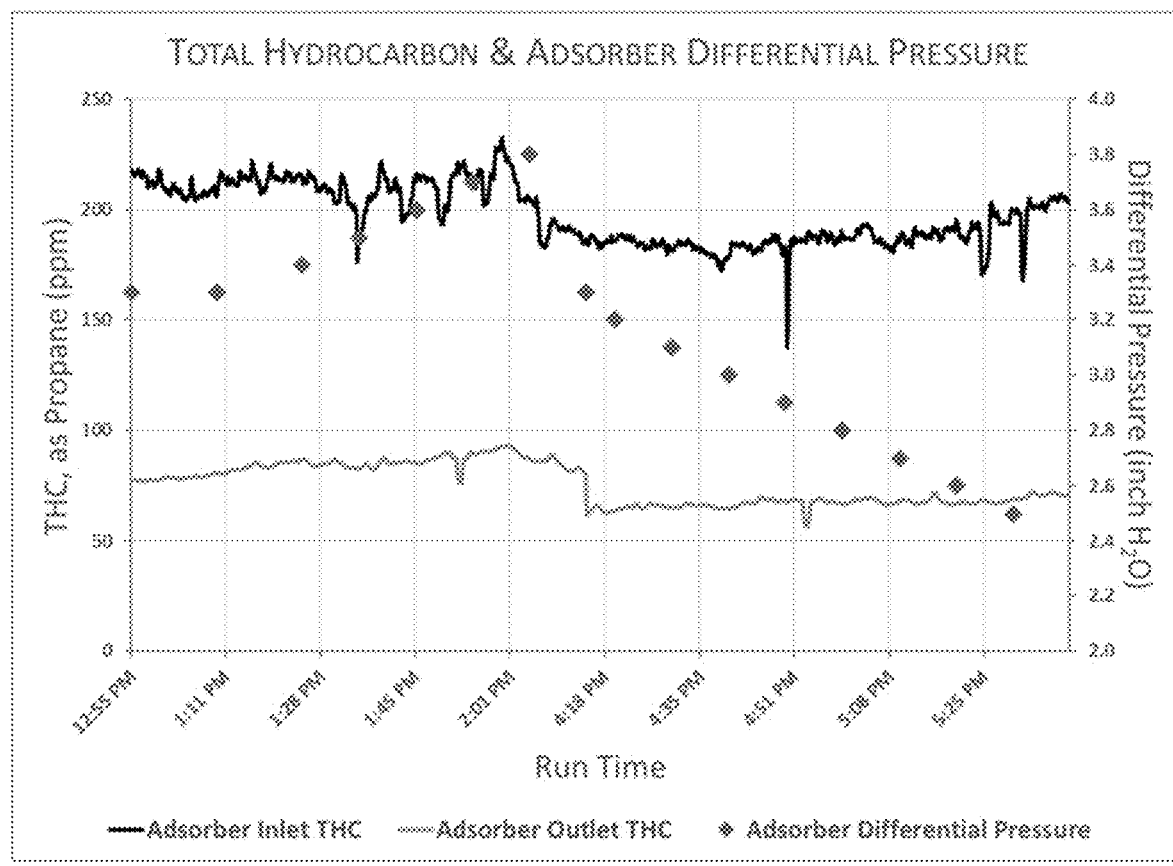

FIG. 14A shows the relationship of adsorber differential pressure to the amount of THC inlet versus outlet, as described in Example 8 of the present disclosure.

Figure 14B:
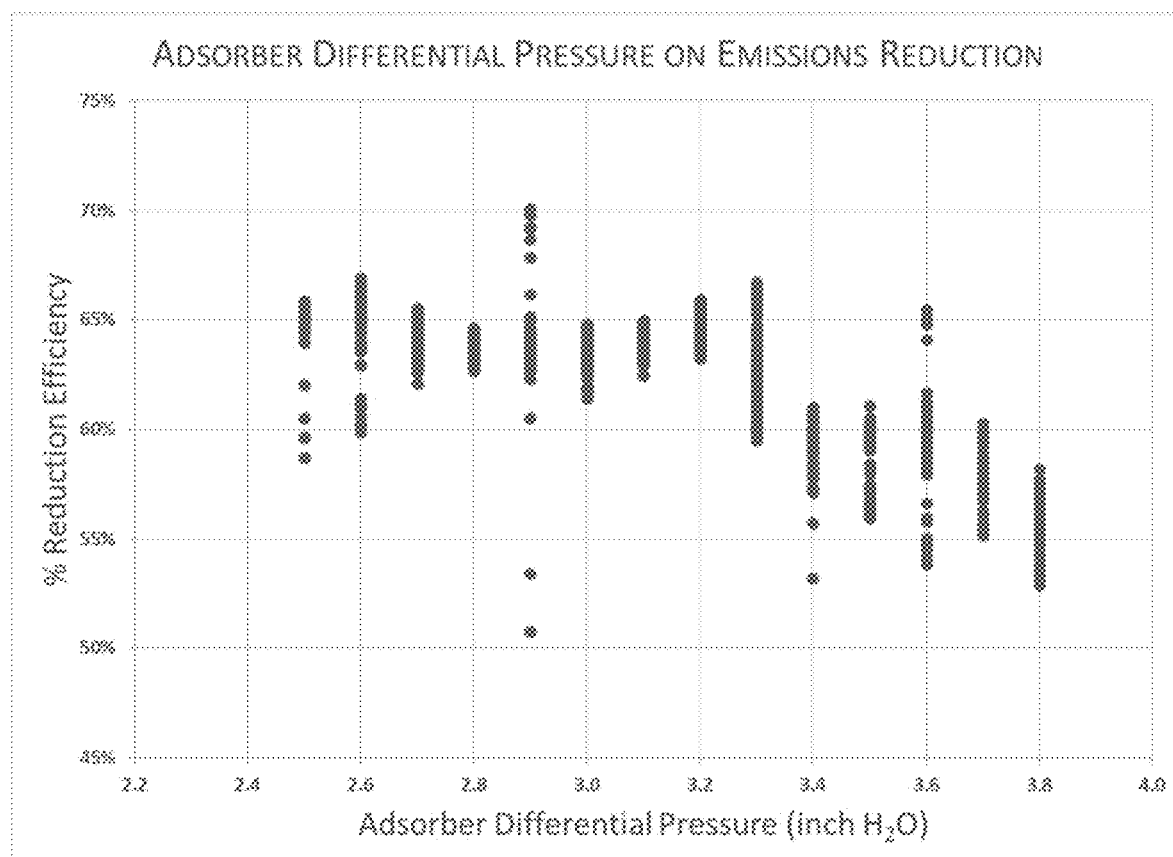

FIG. 14B shows the percent of reduction efficiency and adsorber differential pressure across a second trial as described in Example 8 of the present disclosure where sorbent apparent density was maintained at about 0.78 g/mL to about 0.805 g/mL.

Figure 15:
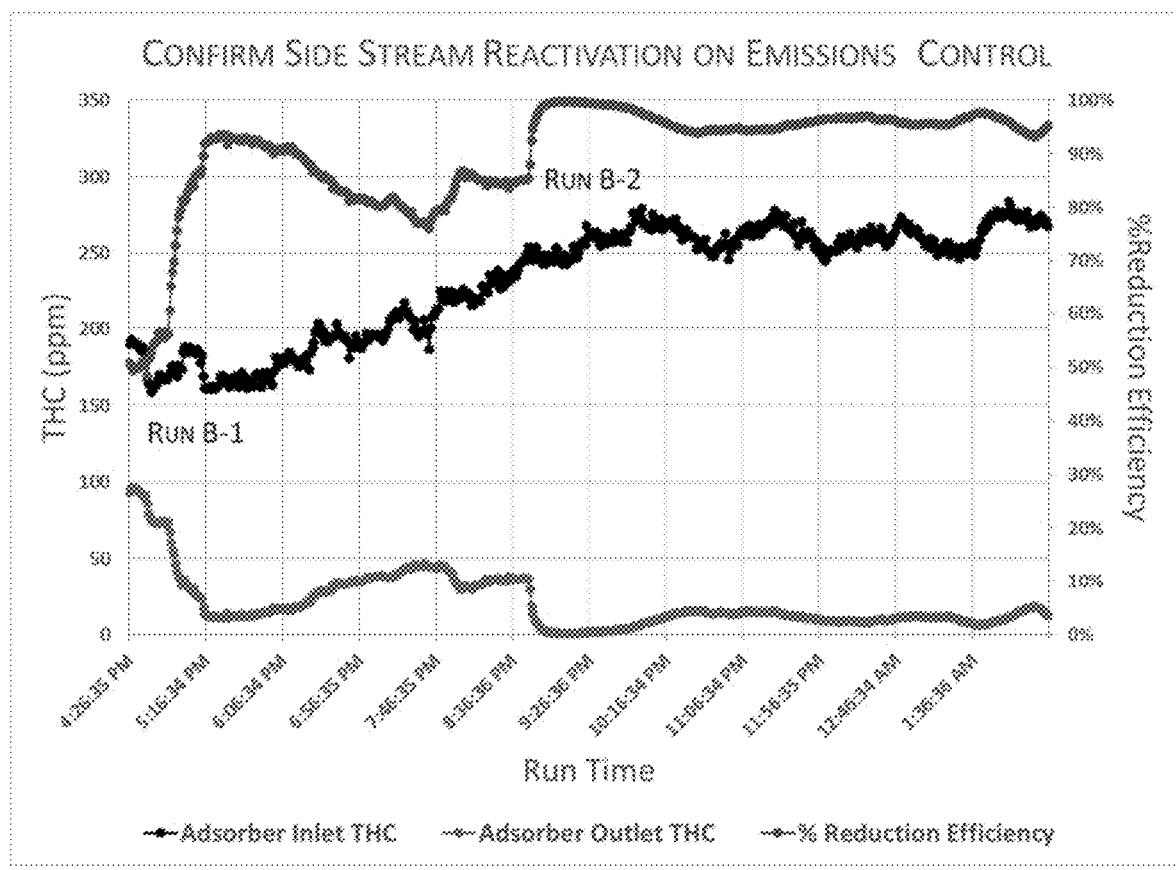

FIG. 15 shows the percent of reduction efficiency and inlet versus outlet THC across a trial as described in Example 9 of the present disclosure where sorbent apparent density was maintained at about 0.76 g/mL to about 0.785 g/mL.

Figure 16A:
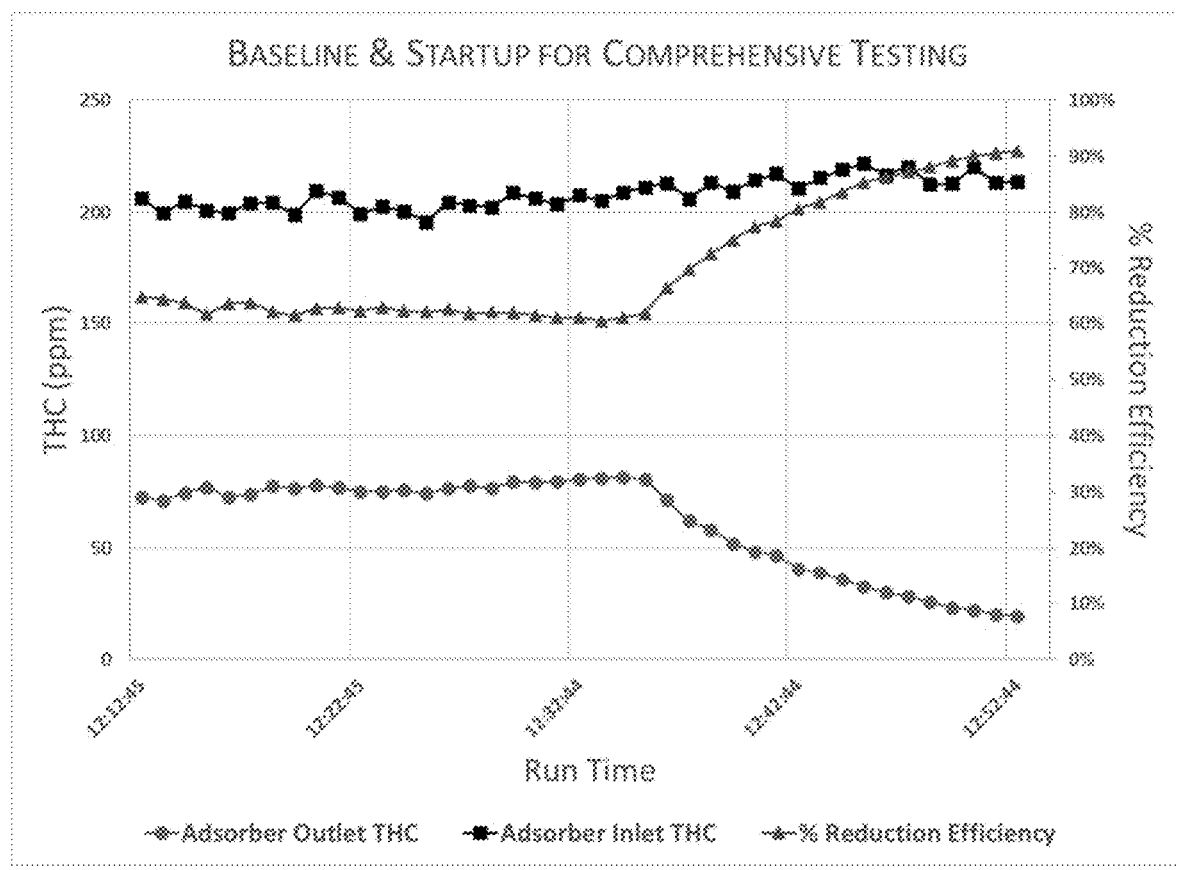

FIG. 16A shows percent reduction efficiency and inlet and outlet THC for baseline and startup runs as described in Example 9 of the present disclosure.

Figure 16B:
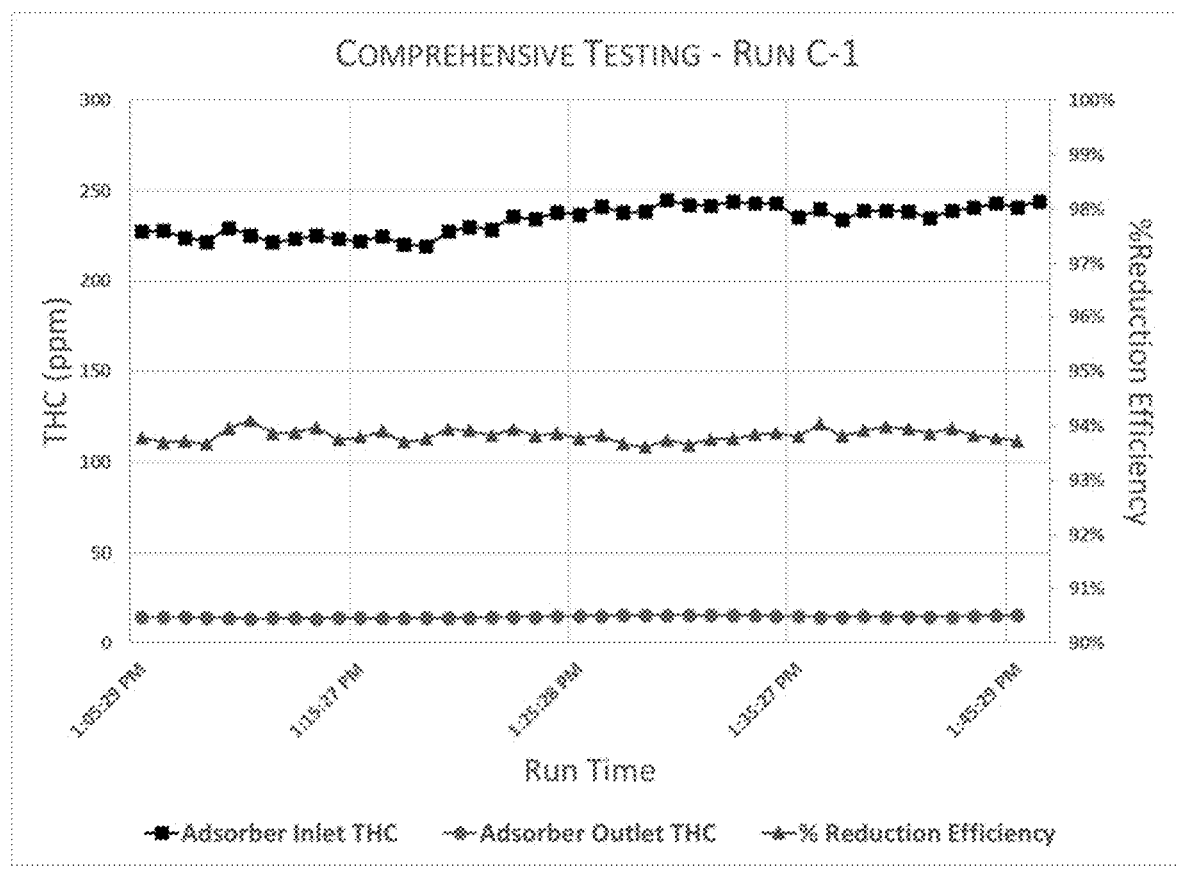

FIG. 16B shows percent reduction efficiency and inlet and outlet THC for a run as described in Example 9 of the present disclosure.

Figure 16C:
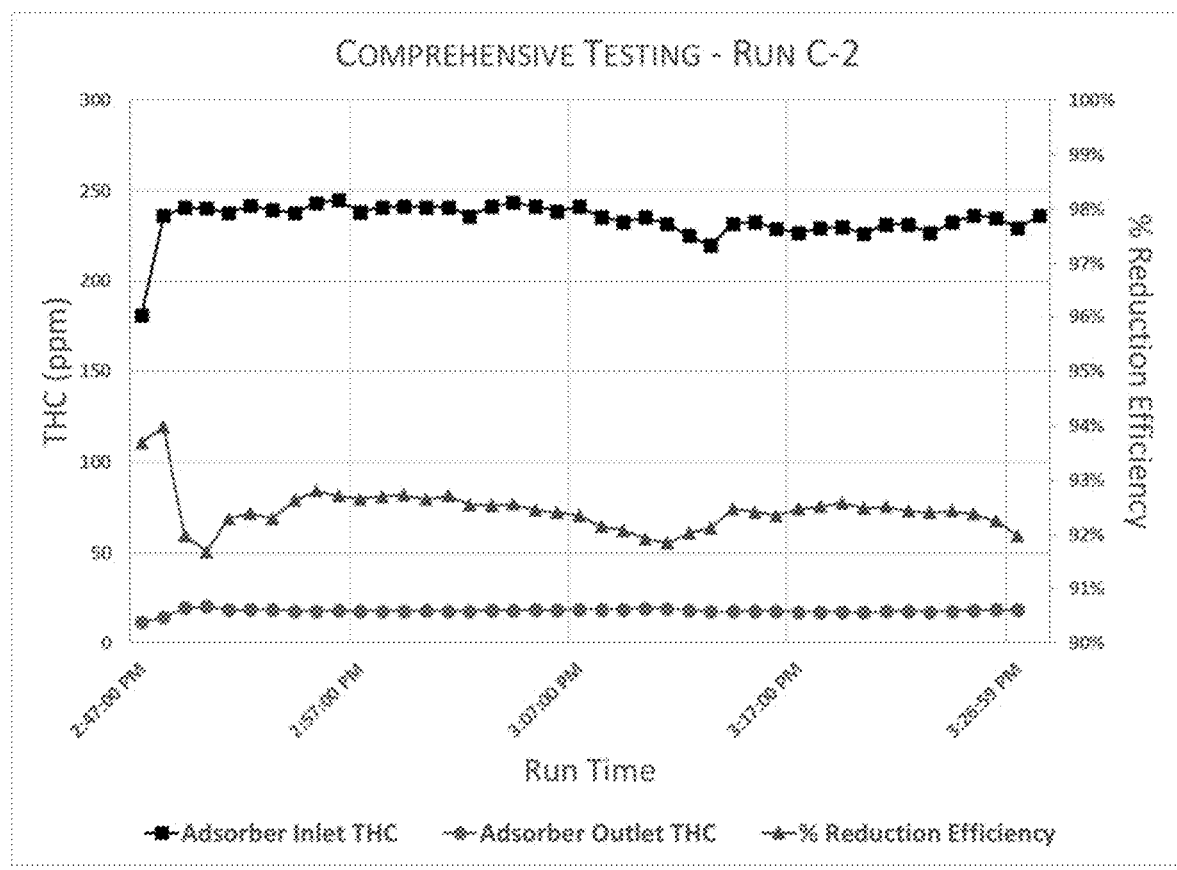

FIG. 16C shows percent reduction efficiency and inlet and outlet THC for a run as described in Example 9 of the present disclosure.

5. DETAILED DESCRIPTION

The present disclosure provides methods and systems for obtaining exhaust streams from wood drying processes that can be suitable for downstream recovery of terpenes from the exhaust streams, e.g., by adsorbing terpenes from the exhaust streams. The presently disclosed subject matter also provides methods and systems for controlling emissions, specifically, from exhaust streams created by wood drying operations. These and other aspects of the disclosed subject matter are discussed more in the detailed description and examples.

5.1 Definitions

The terms used in this specification generally have their ordinary meanings in the art, within the context of this subject matter and in the specific context where each term is used. Certain terms are defined below to provide additional guidance in describing the compositions and methods of the disclosed subject matter and how to make and use them.

As used in the specification and the appended claims, the singular forms "a", "an", and "the" include plural referents unless the context clearly dictates otherwise. Thus, for example, reference to "a compound" includes mixtures of compounds.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to systems or processes, the term can mean within an order of magnitude, preferably within five-fold, and more preferably within two-fold, of a value.

"Coupled" as used herein refers to the connection of a system component to another system component by any means known in the art. The type of coupling used to connect two or more system components can depend on the scale and operability of the system. For example, and not by way of limitation, coupling of two or more components of a system can include one or more joints, valves, transfer lines, or sealing elements. Examples of joints include, but are not limited to, threaded joints, soldered joints, welded joints, compression joints, and mechanical joints. Non-limiting examples of fittings include, but are not limited to, coupling fittings, reducing coupling fittings, union fittings, tee fittings, cross fittings, and flange fittings. Non-limiting examples of valves include, but are not limited to, gate valves, globe valves, ball valves, butterfly valves, block control valves, and check valves.

As used herein, "terpenes" refers to volatile organic compounds from plants, which are derived from isoprene. For example, monoterpenes include two isoprene units and have the general formula $C_{10}H_{16}$.

5.2 Systems for Obtaining Exhaust Streams for Terpene Recovery and Controlling Emissions The present disclosure provides systems for obtaining an exhaust stream comprising terpenes from a wood drying process, wherein the exhaust stream is suitable for downstream recovery of the terpenes. The systems can generally include a wood dryer along with one or more components for removing particulate matter and/or heating the exhaust from the wood dryer.

The present disclosure also provides also systems for controlling emissions from exhaust streams, such as are created by wood drying operations. The systems can include an adsorber containing a sorbent for removing volatile organic compounds (VOCs) from an exhaust stream to generate a purified air stream. The purified air stream can have reduced emissions, e.g., VOCs and particulate matter, and can also be suitable for release into the environment. In certain embodiments, systems of the present disclosure do not require a Regenerative Thermal Oxidizer (RTO). Further, in particular embodiments, methods of the present disclosure do not require thermal oxidation.

5.2.1 Overview

Figure 1:
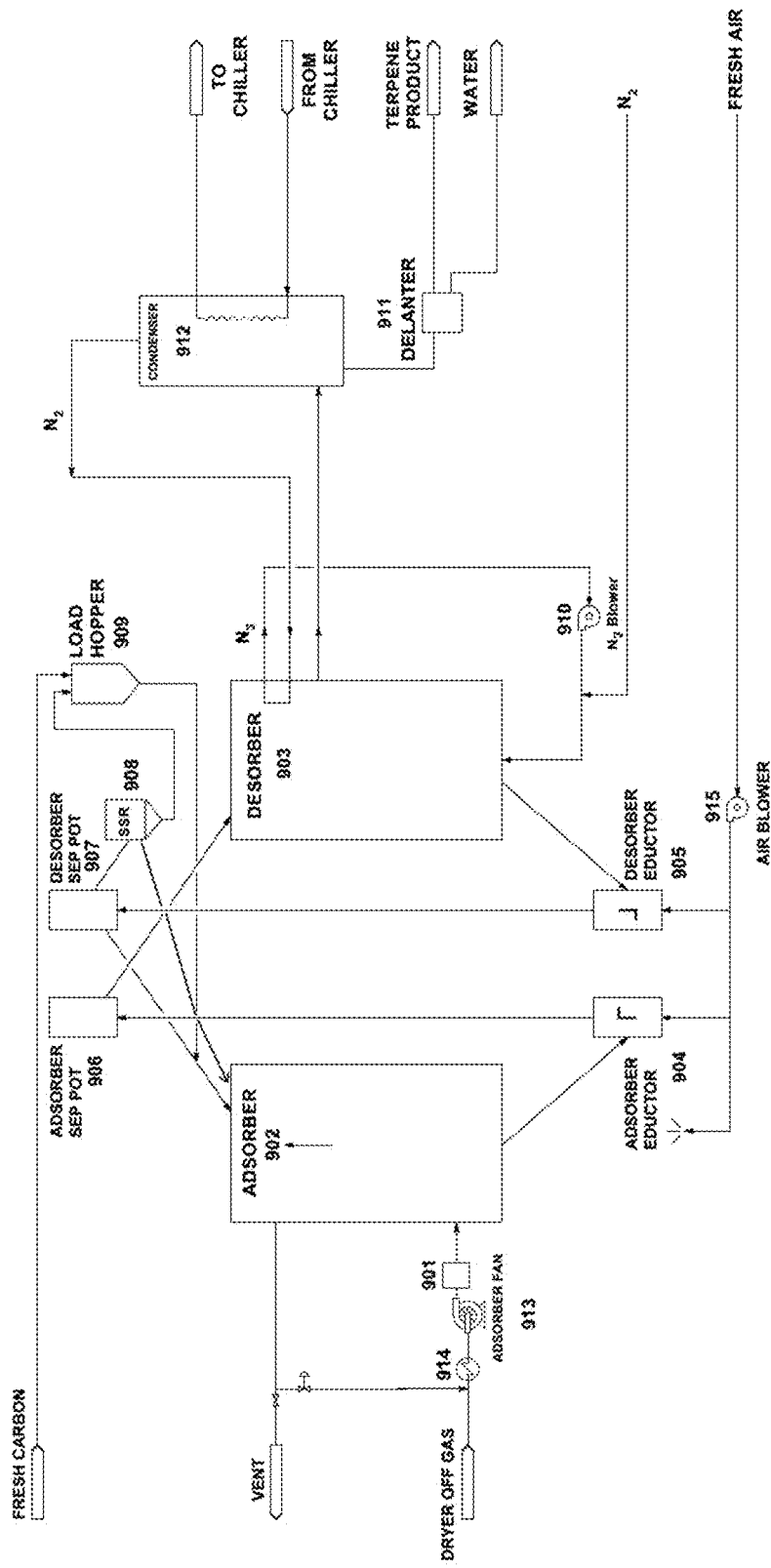

FIG. 1 provides an illustrative overview of a non-limiting example of a process flow schematic in accordance with embodiments of the present disclosure. In FIG. 1, an exhaust stream, such as that from a wood dryer, is optionally heated in a heat exchanger 914 located upstream of an adsorber fan 913. Upon heating, the exhaust stream then optionally passes through a pre-treatment unit 901 as described in the presently disclosed subject matter, where certain particulate matter and/or VOCs, can be filtered or removed from the exhaust stream. Alternatively, in certain embodiments, an exhaust stream, such as that from a wood dryer, can pass through an adsorber fan located upstream of a pre-treatment unit optionally including a heat exchanger for heating the exhaust stream.

Fresh sorbent, such as but not limited to fresh carbon, is supplied to a load hopper 909. The load hopper 909 houses sorbent until the sorbent is needed and fed to an adsorber 902.

After the exhaust stream is pre-treated in the pre-treatment unit 901, it can be routed into an adsorber 902 at an inlet location toward the bottom of the adsorber 902. A separate sorbent stream from a load hopper 909 and/or a desorber separation pot 907 is fed to the adsorber 902 at an inlet location toward the top of the adsorber 902. In the adsorber 902, the upflowing exhaust stream is contacted with the downflowing sorbent stream, and certain compounds, emissions particulates, VOCs, and/or HAPs are adsorbed onto the sorbent. A clean exhaust stream, which is exits at the top of the adsorber 902 can be vented to a downstream location and/or to the atmosphere.

Spent sorbent exits the adsorber 902 and is directed to, for example and not limitation, an adsorber eductor 904 or airlift blower, to which fresh air can be supplied. The spent sorbent stream is directed to an adsorber separation pot 906 or adsorber separator before spent sorbent enters a desorber 903. Spent sorbent containing adsorbed emissions particulates and compounds from an upstream wood drying process is desorbed in the desorber 903, which releases adsorbed materials from the spent sorbent. A nitrogen blower 910, supplied from a nitrogen source, recirculates nitrogen and air flow through the desorber 903 to facilitate desorption of the sorbent. The VOCs can be further passed through a secondary adsorber in desorber.

Reactivated sorbent that has been desorbed in the desorber 903 can be routed via a desorber eductor 905 to a desorber separation pot 907 or desorber separator. Reactivated sorbent, which has had adsorbed materials removed by the desorber 903, can be circulated and fed back into the adsorber 902 to adsorb exhaust stream.

A slip stream or side stream from the desorber separation pot 907 can be routed to a side stream reactivator 908. The side stream reactivator 908 provides further sorbent reactivation, releasing any additional adsorbed materials from the sorbent that was not desorbed and removed in the desorber 903. Reactivated sorbent from the side stream reactivator 908 is then routed to load hopper 909 or adsorber 902, and can be supplied to the adsorber 902 as sorbent is needed.

The desorber 903 can also be coupled to a condenser 912. A mixture stream of desorbed materials and nitrogen is routed from the desorber 903 to the condenser 912. A chiller or other cooling source can provide heat exchange in the condenser 912. Nitrogen separated from desorbed materials, including terpenes, is recycled and circulated from the condenser 912 back to the desorber 903. Desorbed materials, such as terpenes, is routed from the condenser 912 to a decanter 911 used primarily to separate the water from the terpenes. Recovered terpene products can then be stored for further commercial purposes. Alternatively, a mixed stream of desorbed materials and nitrogen can be routed to an incinerator to incinerate VOCs. Such process, although economically viable, can be less desirable for not providing recovery of terpenes and increasing greenhouse gas emissions.

5.2.2 Sources of Exhaust Streams

The systems and methods of the present disclosure can be used to treat exhaust streams from various wood drying operations. Thus, systems of the present disclosure can include one or more wood dryers. Wood drying is used during the processing and manufacturing of many wood-based products to control moisture content, and can sometimes occur at multiple stages within various manufacturing processes. Drying wood can make it more suitable for construction or woodworking purposes, or reduce moisture content to increase the combustibility of the wood.

For example, and not limitation, wood dryers can be used during the manufacturing of construction materials, including, but not limited to, oriented strand board (OSB or flakeboard), plywood, fiberboard (including medium-density fiberboard or MDF), particle board, lumber, scrimber, hardboard, parallel strand lumber, laminated wood products (such as laminated timber, laminated veneer, laminated strand board, laminated strand lumber, and cross-laminated timber), wood composites (including transparent wood composites), and various beams, joints, trusses, and other wood products. Additionally, wood dryers can be used in the manufacturing of wood-based biofuels, such as wood pellets. Thus, as embodied herein, the exhaust stream can be obtained from one or more of these manufacturing processes, or any other manufacturing process involving the drying of wood. In particular embodiments, the wood drying process occurs during the manufacture of oriented strand board and/or plywood, and wood pellets.

In large-scale manufacturing processes, wood dryers can be ovens or kilns that can heat wood over a certain period of time. In certain embodiments, rotary dryers can be used, including single- or multi-pass rotary dryers. Alternatively, one or more flash tube dryers can be used. Some operations recycle a portion of the dryer exhaust gas back into the entrance of the dryer as a dryer energy reduction, emissions control, and wood drying control measure. The dryers can be heated indirectly, e.g., using steam, or directly fired, e.g., with wood, natural gas, and/or fuel oil burners. The wood being dried can be in any suitable form during heating, including, by way of example and not limitation, as logs, veneers, boards, pellets, chips, flakes, pulp, etc. The drying process is typically controlled based on the supply (mass flow) of wood to the wood dryers, which can ensure even heating, and temperature controls, to minimize moisture and prevent overheating. The drying process can be controlled based on the outlet temperature of the dryer (which can be a function of moisture release, e.g., in rotary dryers). The outlet temperature can be based, for example and not limitation, on wet bulb temperature, dry bulb temperature, relative temperature, or the moisture of the wood outputted from the dryer. In certain embodiments, the temperature can be measured and controlled at two or more points along the length of the drying cycle to create a drying profile. As such, temperature and/or moisture sensors can be placed within the dryer and/or at the dryer outlet and/or inlet. A person of skill in the art will appreciate that the type of control can be based on the type of dryer or kiln used in the wood drying process. In certain processes, the wood can be air dried or humidified (e.g., sprayed with water) prior to drying to ensure that all wood supplied to the wood dryer has similar moisture content.

As wood is heated during the drying process, it is known to release several VOCs and their thermal decomposition products into the exhaust from the dryers. For example, and not limitation, such VOCs and thermal decomposition products can be found in the lignin, cellulose, hemicellulose, and resin of trees. Many of these VOCs are terpenes or turpentine, although the exhaust can also include other HAPs. Commonly-found HAPs include formaldehyde, methanol, phenol, acrolein, acetaldehyde, and/or propionaldehyde, although other HAPs can also be found in the process exhaust stream. Exhaust from wood drying processes can additionally include air and steam, and can further include undesirable emissions other than VOCs and HAPs, such as particulate matter, carbon monoxide, carbon dioxide, $NO_x$ emissions, and/or inorganic emissions, such as inorganic compounds containing potassium, silicon, sulfur, chlorine, calcium, manganese, magnesium, antimony, arsenic, beryllium, cadmium, chromium, cobalt, mercury, nickel, phosphorus, sodium, lead, rubidium, iron, copper, and/or zinc.

In the present disclosure, "process exhaust stream" is used to refer to exhaust released directly from a wood dryer, e.g., containing air, steam, VOCs, HAPs (such as formaldehyde, methanol, phenol, acrolein, acetaldehyde, and/or propionaldehyde), particulate matter, carbon monoxide, carbon dioxide, $NO_x$, and/or inorganic compounds. As embodied herein, and for example and not limitation, the volume of the process exhaust stream supplied to a downstream adsorber can range from about 50 cfm to about 500,000 cfm, or from about 100 cfm to about 500,000 cfm, or from about 500 cfm to about 500,000 cfm, or from about 1,000 cfm to about 500,000 cfm, or from about 10,000 cfm to about 500,000 cfm, or from about 20,000 cfm to about 100,000 cfm, or from about 50,000 cfm to about 100,000 cfm, or from about 100,000 cfm to about 500,000 cfm, or from about 100,000 cfm to about 300,000 cfm. In certain embodiments, the volume of the process exhaust stream supplied to a downstream adsorber can range from about 75 cfm to about 200,000 cfm, or from about 100 cfm to about 100,000 cfm, or from about 125 cfm to about 90,000 cfm, or from about 150 cfm to about 80,000 cfm, or from about 175 cfm to about 70,000 cfm, or from about 200 cfm to about 60,000 cfm, or from about 225 cfm to about 50,000 cfm, or from about 250 cfm to about 40,000 cfm, or from about 275 cfm to about 30,000 cfm, or from about 300 cfm to about 20,000 cfm, or from about 300 cfm to about 10,000 cfm. In certain embodiments, the air flow of process exhaust provided to the adsorber can range from about 25,000 cfm to about 175,000 cfm, or from about 37,500 cfm to about 150,000 cfm, or from about 50,000 cfm to about 125,000 cfm, or from about 60,000 cfm to about 100,000 cfm, or from about 75,000 cfm to about 90,000 cfm. In certain embodiments, the volume of the process exhaust stream supplied to a downstream adsorber can be from about 250 cfm to about 325 cfm. In certain embodiments, the volume of the process exhaust stream supplied to a downstream adsorber is about 300 cfm.

The content and composition of the process exhaust stream can depend on the type of wood used, as wood drying processes are applied to a large number of different woods. Such woods include, but are not limited to, softwoods, such as cedars, firs, spruces, pines, larch, hemlock, juniper, redwood, and yew; and/or hardwoods, such as birches, elms, maples, eucalyptus, alder, ash, aspen, oak, poplar, bamboo, basswood, beech, cottonwood, and willow. Additionally, various other factors can affect the content and composition of the exhaust stream, including, but not limited to, the age of the wood and its geographic source. Environmental, harvesting (from cutting to drying), and weather conditions before and after harvesting the wood can also impact the composition of the exhaust stream when the wood is dried.

5.2.3 Particulate Matter Removal

As embodied herein, the presently disclosed systems and methods can include the use of particulate removal equipment and/or one or more air treatment boxes for reducing the amount of particulate matter in the process exhaust stream. Various types of particulate matter can be found in exhaust streams from wood drying processes, ranging in size and composition. In certain embodiments, the particulate matter can comprise PM 2.5 and/or PM 10 emissions. Additionally or alternatively, the particulate matter can comprise larger debris such as ash, flakes, dust, wood fibers, inorganics, and the like. Particulate matter can be broadly composed of both condensables and filterables, e.g., as measured by EPA Method 202 and EPA Method 5. As embodied herein, an air treatment box can be positioned upstream and/or downstream from the dryer. For example, an air treatment box that is disposed upstream from the dryer can be suitable for removing fibers, dust, small wood particles, bark, sand, dirt, and debris. Similarly, an air treatment box that is disposed downstream from the dryer can be suitable for removing flakes, ash, lignin, pitch, wood fibers, and inorganic emissions.

Thus, one or more features for particulate reduction can be disposed upstream and/or downstream from the wood dryer. For example, in certain embodiments, the systems can include mesh screens or other filters upstream from the wood dryer, e.g., at one or more locations corresponding to upstream wood processing steps, such as chipping and/or flaking processes. In certain embodiments, the systems can include mesh screens, filters, baffles, etc. downstream from the wood dryer. In certain embodiments, the systems can be included in one or more air treatment boxes. For example, and not by limitation, in particular embodiments, systems for reducing the amount of particulate matter in the process exhaust stream can include one or more baffles within one or more air treatment boxes. As noted above, the wood can be broken down into smaller form prior to drying and such upstream screens and filters can prevent particulate from traveling to the wood dryer, thereby reducing the amount of particulate in the outputted process exhaust from the wood drying process. For example, in certain embodiments, particularly embodiments suitable for use with the manufacturing of oriented strand board, screens can be positioned downstream from the strander but upstream from the wood dryer to reduce the amount of fine particulate matter entering the wood dryer. A wide variety of screens can be used upstream from the dryers, as will be appreciated by a person of ordinary skill in the art.

A person of skill in the art will appreciate that, depending on the screen employed, various types of particulate can be removed upstream from the dryer. For example, and not limitation, when disc screens or other fines screens are used, the type of particulate removed includes, but is not limited to, finely divided wood particles. In addition to reducing particulate matter, for example finely divided wood particles, ash and mineral particles, and condensables, in the process exhaust stream, upstream screening can have several other advantages. For example, upstream screening can improve the yield of the drying process because the removed material is not dried, thereby conserving energy and dryer capacity. Additionally, upstream screening can reduce HAP and VOC formation in the dryer because small particles dry more quickly, and are therefore more susceptible to over-drying, which can cause the wood tissue to breakdown and form more HAPs. As embodied herein, upstream screening can reduce HAPs in the process exhaust stream by up to about 30%, up to about 40%, up to about 50%, or up to about 60%, depending on the type of wood, drying temperature and moisture content, type of screen used, etc.

Additionally or alternatively, one or more air treatment boxes can be provided downstream from the wood drying to remove particulate matter from the process exhaust stream. The downstream air treatment box can comprise one or more traps for particulate matter, including, but not limited to, screens, filters, perforated plates, baffles, electrostatic screens, and the like. For example, in certain embodiments, the air treatment box can include two or more traps in series, e.g., for trapping increasingly small particulates. In particular embodiments, the air treatment box can include at least one screen, at least one filter, and/or at least one perforated plate. In certain embodiments, the mesh of the screen and/or filter, if present, can range from about 400 mesh to about 30 mesh, or from about 200 mesh to about 60 mesh, or from about 140 mesh to about 80 mesh, or about 100 mesh. As embodied herein, pressure drop across the air treatment box can be used to calibrate the plugging of screens, plates, and filters within the air treatment box.

In certain embodiments, the system can include one or more baffles, alone or in combination with one or more particulate traps, such as screens, filters, and/or perforated plates. As embodied herein, the baffles can be disposed within the air treatment box. In addition to reducing particulate matter, the baffles can also reduce the amount of stickies within the system. As used herein, "stickies" refers to wood resins that can accrue as deposits within the system, for example, but not limitation, pitch and/or rosin. In certain embodiments, baffles can be integrated into a filter, such as in a grease filter (e.g., Titan-Flo™ Baffle Grease Filters, available from Air Filters, Inc., Houston, TX). For example, and not limitation, baffles can be oriented substantially vertically to collect greasy material in the process exhaust stream. In certain embodiments, the air treatment box can include a manual or automated wash system for removing collected particulate matter from the various components within the air treatment box.

The system can further include other components for reducing the amount of particulate, as known in the art. For example, and not limitation, the system can include one or more electrostatic precipitators, including wet electrostatic precipitators (WESPs) or dry electrostatic precipitators (DESPs), cyclones, bag filters, mist eliminators, wet venture scrubbers, cyclonic separators, and the like.

5.2.4 Moisture Removal & Heating Systems

As embodied herein, the system can also include features to reduce the amount of moisture in the process exhaust stream. If too much moisture remains in the exhaust stream during adsorption, the moisture can condense and block the sorbent and/or compromise fluidization of the sorbent within the bed of an adsorber. Additionally, water can reduce the overall amount of alpha-pinene and beta-pinene relative to other terpenes in a recovered terpene stream. Condensation of the moisture in the exhaust stream can be avoided by pre-heating the exhaust stream before it is provided to the adsorber in order to reduce the relative humidity prior to entering the adsorber.

Thus, the presently disclosed systems can further include one or more heaters and/or heat exchangers. For example, and not limitation, heat can be provided by electrical elements, steam heating, a natural gas and/or oil burner, or thermal fluid heating. In certain embodiments, heat can be provided to the exhaust stream from the dryer using an economizer to recover heat from one or more streams, e.g., a stream from the adsorber or another downstream component. In certain embodiments, fresh air to the dryer can be pre-heated with an economizer, e.g., to a temperature of about the dewpoint of the fresh airstream (e.g., from about 140° F. to about 150° F.), thereby capturing heat from the process exhaust stream and/or a stream from a downstream component, such as an adsorber. Additionally or alternatively, the system can include a dehumidifier downstream from the wood dryer. Suitable dehumidifiers can be comparable to spray dryer systems.

For example, in certain embodiments, the exhaust stream can be pre-heated prior to adsorption using an electrical heating coil, economizer, or heat exchanger, such as a plate fin heat exchanger, shell and tube heat exchanger, plate heat exchanger, and/or plate and shell heat exchanger. In certain embodiments, the heat exchanger can incorporate heat from a purified outlet stream exiting the adsorber or another downstream operation. For example, in such embodiments, the purified outlet stream can be directed through the heat exchanger to pre-heat the incoming exhaust stream, thereby recovering heat from the outlet stream from the adsorber. Additionally, and as known in the art, the wood drying and manufacturing processes disclosed herein can include the use of hot oil, e.g., in presses used in the manufacture of various wood products, including oriented strand board. Such hot oil can be circulated to a heat exchanger or a jacket to heat the process exhaust stream. Additionally or alternatively, heating oil, natural gas, and/or electric heat can be used to heat the process exhaust stream or other components of the system.

Additional heating components can be used to heat the system as part of startup options. For example, prior to starting to dry wood in the dryer, a preheating system can be used to preheat a downstream adsorber to a target temperature such that the adsorber functions immediately upon starting the dryer and to prevent condensation within the adsorber.

5.2.5 Adsorbers

As embodied herein, a system for controlling emissions from an exhaust stream includes an adsorber. The exhaust stream can be directed to and coupled to the adsorber, which can contain sorbent for removing certain compounds from the exhaust stream.

The housing of the adsorber can be formed of any suitable material for withstanding the temperatures and acidic compounds in the exhaust stream, e.g., up to about 300° F. Additionally, the housing is preferably resistant to corrosion. For example, and not limitation, suitable materials include, but are not limited to, stainless steel. The housing can optionally be further encased in an insulating material with heat trace for maintaining the temperature of the adsorber and to prevent water from condensing and organics from coalescing.

The adsorber can further include a bed design for containing the sorbent while the exhaust stream is contacted with the sorbent. In preferred embodiments, the adsorber can include a fluidized bed. However, any suitable bed configuration can be used, including, but not limited to, a static or fixed bed, a rotary bed, or a moving bed. Although some of the following description will make reference to a fluidized bed, it should be understood that the same principles and techniques can be applied to other types of beds. As embodied herein, the adsorber can include a single bed, or can include two or more beds. If two or more beds are used, the beds can be arranged in series and/or in parallel. For example, an arrangement of multiple beds in series can increase the removal efficiency of undesired components from the exhaust stream, whereas an arrangement of multiple beds in parallel can increase the throughput of the adsorber. Where two or more beds are used, each bed can be housed within the same or separate housings.

Additionally, the one or more beds can include additional features to control the flow of exhaust and/or sorbent within the adsorber. For example, in embodiments having a fluidized bed, the fluidized bed can include one or more trays. In certain embodiments, one or more trays can be horizontal or dead level.

Figure 2:
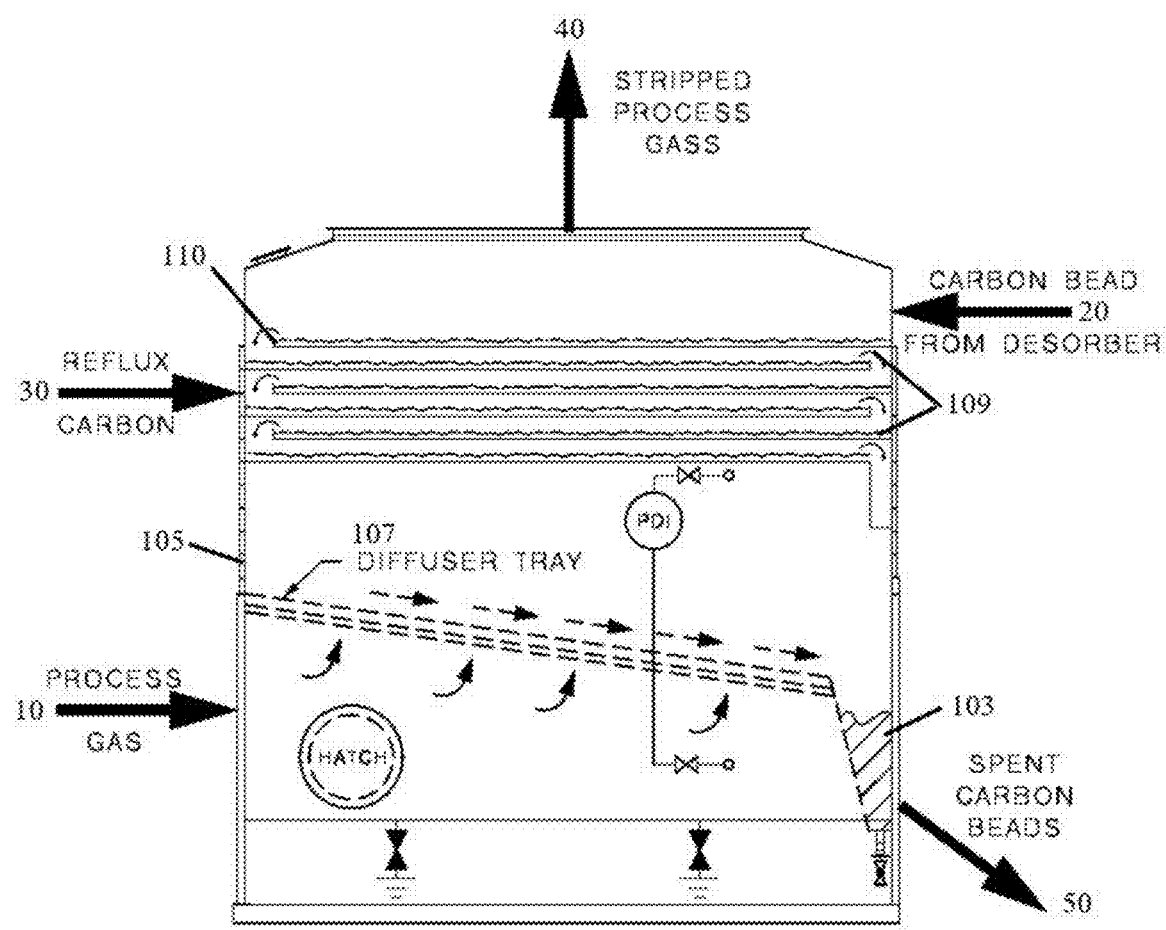
Figure 3A:
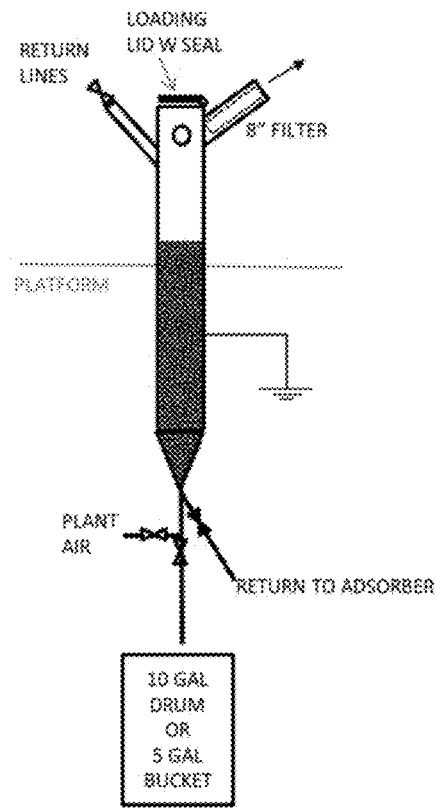
Figure 3B:
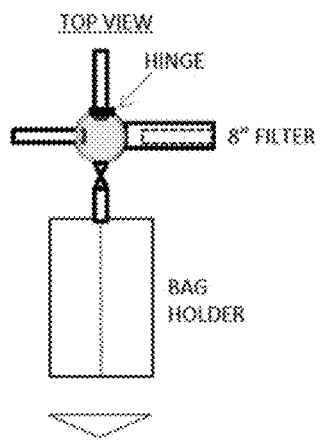

For the purpose of illustration, FIG. 2 provides a schematic of a non-limiting embodiment of an adsorber in accordance with the presently disclosed subject matter. As shown in FIG. 2, process gas 10 can enter the adsorber towards the bottom of the housing 105. A diffuser 107 can be provided to direct the gas upwards through the adsorber and to the one or more trays 109. At the same time, fresh sorbent 20 can be provided at a point above the trays, e.g., from a downstream desorber or sorbent reactivation system. A second sorbent source 30 can also be provided, e.g., at a point below the fresh sorbent 20.

In certain embodiments, the second sorbent source 30 can be reflux sorbent provided from within the adsorber. The reflux sorbent can ensure that all trays within the adsorber remain full of sorbent. The purified air stream, stripped of undesirable components such as VOCs, can exit through the top of the adsorber while spent sorbent 50 can be directed by the diffuser 107 out the bottom of the adsorber. In certain embodiments, the spent sorbent 50 can be portioned in a separation pot into reflux sorbent, provided as the second sorbent source 30, and sorbent sent to a downstream process, e.g., a desorber.

For example, a portion of the spent sorbent 50 can be recycled as reflux sorbent to one or more trays within the adsorber. The reflux sorbent can be provided at any tray, but is preferably provided to intermediate trays within the adsorber. The percentage of spent sorbent provided as reflux can range from about 0% to about 100%, from about 0% to about 50%, from about 50% to about 100%, from about 80% to about 100%, from about 90% to about 100%, from about 95% to about 100%, or from about 99% to about 100%, depending on mode of operation. For example, during startup, most of the spent sorbent will be provided to the top tray until all trays are full. However, when downstream operations, e.g., a downstream desorber, is ready to accept spent sorbent, a portion of the spent sorbent 50 will be sent downstream, with none or only a portion refluxed back to the adsorber. Once the desorber is full and overflowing to the adsorber hopper, the reflux ratio can be adjusted in order to maintain full sorbent levels on the intermediate and lower trays, as needed. In certain embodiments, the amount of refluxing can be automated based on sorbent level within hopper(s) and the differential pressure across the trays of the adsorber.

The overall number of trays in the adsorber can vary depending on a variety of factors, including, but not limited to, the size and capacity of the adsorber, the properties of the sorbent used, the desired level of purification, among others. However, in general, it can be desirable to increase the overall number of trays. As embodied herein, the number of trays required to efficiently collect emissions from the exhaust can be determined by one of ordinary skill in the art, and the tray arrangement can efficiently remove emissions via countercurrent flow such that the exhaust stream becomes successively cleaner as it passes upward through multiple trays within the adsorber. For example, in certain embodiments, the adsorber can include from about 4 trays to about 20 trays, e.g., from about 4 trays to about 15 trays, from about 4 trays to about 10 trays, from about 4 trays to about 6 trays, from about 8 trays to about 20 trays, or from about 10 trays to about 15 trays. The trays can optionally include generally vertical weirs, which can hold fluidized sorbent on the tray. For illustration, FIG. 2 shows trays 109 having vertical weirs 110. The height of the weirs can be proportionate to the size of the trays, but should be sized to hold the desired amount of fluid and sorbent on each tray. Additionally, the weirs can include angular or circular notches to encourage overflow out of the tray. The trays can be spaced apart from each other in order to facilitate cleaning between the trays. For example, in certain embodiments, the trays can be spaced by from about 6 inches to about 3 feet, or from about 1 foot to about 3 feet, or about 2 feet. In certain embodiments, the depth of sorbent on each tray can be from about 0.5 inch to about 2 inches, from about 1 inch to about 1.5 inches, or about 1.5 inches. A person of skill in the art will appreciate that the depth of sorbent can be selected to minimize the differential pressure through the adsorber and minimize the amount of energy required for the process fan.

In addition to the features shown in FIG. 2, one or more of the trays can include one or more downcomers. In certain embodiments, each tray includes a downcomer. The downcomers can be stepped down ledges around each tray, such that overflowing sorbent falls along the downcomer and onto the tray below. In certain embodiments, the downcomer can be filled to about 50% capacity by the sorbent to prevent an up flow of air. In certain embodiments, the downcomer can have an open area that is smaller than the open area of the tray, and the hole size of the downcomer can be about the same as the hole size of the tray. The downcomers can be generally parallel with or angled as to the trays. Additionally or alternatively, one or more air flow adjusters can be used with the downcomers to adjust the flow of sorbent within the adsorber, e.g., by reducing air flow through the downcomer to increase the amount of sorbent on the trays or increasing air flow through the downcomer to decrease the amount of sorbent on the trays. The presently disclosed fluidized bed system can be configured for single pass or multiple passes on each tray.

In certain embodiments of the present disclosure, the adsorber can be heated. Thus, the adsorber can be coupled to a heater or heat exchanger, as is known in the art. In particular embodiments, a heating jacket, heating tape, or one or more shelf drum heaters can be used to provide heat to the adsorber. For example, and not limitation, heat can be provided using an electrical heater or with thermal oil and/or a gaseous stream, e.g., a recycled exhaust stream from the outlet of the adsorber. In certain embodiments, prior to starting to dry wood in the dryer, a preheating system (which can comprise the same or different components as are used to heat the adsorber during operation) can be used to preheat a downstream adsorber to a target temperature such that the adsorber functions immediately upon starting the dryer and to prevent condensation, moisture, and/or coalescing of organics within the adsorber.

In certain embodiments, the operating temperature of the adsorber can be maintained at between about 50° F. to about 700° F., or between about 60° F. to about 650° F., or between about 70° F. to about 600° F., or between about 80° F. to about 550° F., or between about 90° F. to about 500° F., or between about 100° F. to about 450° F., or between about 110° F. to about 400° F., or between about 120° F. to about 350° F., or between about 125° F. to about 300° F., or between about 130° F. to about 250° F., or between about 135° F. to about 200° F., or between about 140° F. to about 190° F., or between about 145° F. to about 180° F.

In certain embodiments, the active temperature or operating temperature of the adsorber can be adjusted by one of ordinary skill in the art to maintain a desired tray temperature (e.g., top trays, middle trays, bottom trays). For example, and not by limitation, the temperature of one or more adsorber trays can be maintained between about 90° F. to about 200° F., about 90° F. to about 115° F., about 100° F. to about 200° F., or between about 105° F. to about 190° F., or between about 110° F. to about 180° F., or between about 115° F. to about 170° F., or between about 120° F. to about 165° F., or between about 120° F. to about 160° F., or between about 120° F. to about 155° F., or between about 125° F. to about 160° F., or between about 130° F. to about 160° F., or between about 130° F. to about 155° F., or between about 135° F. to about 165° F., or between about 140° F. to about 165° F., or between about 145° F. to about 165° F., or between about 150° F. to about 170° F., or between about 155° F. to about 165° F., or between about 155° F. to about 170° F., or between about 155° F. to about 175° F.

The operating pressure of the adsorber can be adjusted and maintained by a person of ordinary skill in the art. In certain embodiments, the operating pressure of the adsorber can be maintained between about 1 inch of water to about 50 inches of water, or between about 1 inch of water to about 40 inches of water, or between about 2 inches of water to about 30 inches of water, or between about 2 inches of water to about 25 inches of water, or between about 3 inches of water to about 22 inches of water, or between about 3 inches of water to about 20 inches of water, or between about 4 inches of water to about 18 inches of water, or between about 4 inches of water to about 15 inches of water, or between about 5 inches of water to about 12 inches of water, or between about 5 inches of water to about 10 inches of water, or between about 5 inches of water to about 8 inches of water, or between about 10 inches of water to about 30 inches of water, or between about 18 inches of water to about 22 inches of water. In certain embodiments, the operating pressure of the adsorber can be maintained between about 2 inches of water to about 5 inches of water, or between about 2.5 inches of water to about 4.5 inches of water, or between about 2.5 inches of water to about 4 inches of water, between about 2.5 inches of water to about 3.5 inches of water, between about 3.2 inches of water to about 3.3 inches of water. In particular embodiments, the operating pressure of the adsorber can be maintained at about 2 inches of water, about 2.5 inches of water, about 3.2 inches of water, or about 3.5 inches of water.

The adsorber can optionally include one or more additional components. For example, and as described in greater detail below, one or more hoppers can be disposed within the housing of the adsorber or otherwise coupled to the adsorber to supply fresh sorbent. In certain embodiments, the hopper can house sorbent during startup operations such that air and/or process exhaust does not condense on the surface of the sorbent. In certain embodiments, an operating temperature of the hopper can be maintained between about 100° F. to about 200° F., between about 150° F. to about 190° F., between about 145° F. to about 170° F., or between about 170° F. to about 174° F., or between about 175° F. to about 185° F. In particular embodiments, the hopper can be maintained at an operating temperature of about 100° F., about 125° F., about 150° F., about 180° F., or about 200° F.

The adsorber can have at least one deluge spray nozzle. For example, the at least one deluge spray nozzle can be at the top of the adsorber to extinguish fires. The adsorber can also have or be coupled to a deluge system or alternative mechanism to release water if overfilled. Such a deluge mechanism would prevent any overfill of water, sorbent, or other compounds in the adsorber that can then flow into a downstream desorber unit, which can cause deflagration. In certain embodiments, the deluge mechanism can incorporate a J loop or duck bill component to prevent water from filling adsorber.

The system can optionally include one or more components for sorbent reactivation, which is described in greater detail below.

Additionally or alternatively, as noted above, a diffuser can be provided at the inlet to the adsorber, where the exhaust stream is introduced, to control the velocity of the incoming exhaust. In certain embodiments, the adsorber can include features to accommodate changes in the flow of the exhaust stream. The flow rate and pressure of the exhaust stream can fluctuate, e.g., depending on the output of the wood dryers supplying the exhaust and the number of wood dryers online. Such features can ensure that the sorbent remains fluidized within the fluidized bed system, e.g., by ensuring that the flow rate of exhaust at the inlet of the adsorber is maintained at or above a minimum superficial velocity through the bed of the adsorber. For example, if the flow rate drops below the minimum superficial velocity, outside air can be used as make-up. In certain embodiments, an orifice coupled to a fan controlled VFD can be utilized upstream of the adsorber inlet to minimize process air flow variation. This can further enhance filling and fluidization of sorbent within the adsorber trays. In certain embodiments, the differential pressure across the orifice can range from about 0.5 inches of water to about 10 inches of water, about 1 inch of water to about 10 inches of water, or from about 1.5 inches of water to about 9 inches of water, or from about 2 inches of water to about 8 inches of water, or from about 2.5 inches of water to about 7 inches of water, or from about 2.5 inches of water to about 6 inches of water, or from about 3 inches of water to about 5 inches of water. In certain embodiments, the differential pressure across the orifice can range from about 0.5 inches of water to about 1.5 inches of water, or from about 0.5 inches of water to about 1 inch of water, or from about 0.8 inches of water to about 1.2 inches of water. In particular embodiments, the differential pressure across the orifice can be about 0.5 inches of water, about 0.8 inches of water, about 1 inch of water, about 1.2 inches of water, about 1.5 inches of water, or about 3.2 inches of water.

Additionally or alternatively, all or a portion of the purified air stream can be recycled back to the inlet of the adsorber. Recycling the purified air stream has several advantages over using fresh air. For example, the purified air stream has already been tempered and therefore can warm the exhaust stream and minimize startup time in the adsorber. A recycle also provides a reduction in the mass emissions of trace organics that can be present in the purified air stream exiting the adsorber.

As embodied herein, a system for recycling all or a portion of the purified airstream to the adsorber as make-up can include a duct to convey the purified stream from the outlet of the adsorber and back to the suction side of the process fan. For example, the flow rate can be controlled using at least one barometric damper (i.e., a balancing damper). In certain embodiments, the flow rate can be controlled using two or more barometric dampers. As the flow rate of process exhaust from the dryer decreases, the negative pressure on the suction side of the process fan can increase. This increased negative pressure can incrementally pull the barometric damper open, allowing some or all of the purified air stream to draw into the process fan. The greater the negative pressure, the more the damper will open. In this manner, a constant airflow can be delivered to the inlet of the adsorber. In certain embodiments, the process fan suction can range from about −10 inches of water to about −15 inches of water, or from −14 inches of water to about −15 inches of water, or from about −9 inches of water to about −10 inches of water. In particular embodiments, the process fan suction can be about −9 inches of water, about −10 inches of water, about −11 inches of water, about −12 inches of water, about −13 inches of water, about −14 inches of water, or about −15 inches of water.

In alternative embodiments, the flow of the purified air stream back to the adsorber as make-up can be automated. For example, a recirculation duct damper with an actuator and a pressure transducer can be used. The transmitter can monitor the internal duct pressure on the suction side of the process fan and provide a signal to a Distributive Control System (DCS).

During normal operation, the negative pressure on this suction side of the process fan should be constant; however, if the DCS detects a transmitter signal which indicates a more negative condition, the DCS can send a signal to the actuator on the damper, which will incrementally open the recirculation damper to provide air from the purified air stream. When the DCS detects that the negative pressure magnitude is normal, the actuator will hold the damper in that position. When airflow of the process exhaust from the dryer is restored, the reverse action can take place as the pressure on the suction side of the process fan becomes increasingly positive. In this manner, constant air flow can be maintained through the adsorber at a desirable flow rate to maintain fluidization within the adsorber. For example, the system can maintain the flow rate through the adsorber within a variation of about 20% or less, or within a variation of about 10% or less.

The adsorber can further include a vent or stack for releasing the purified exhaust stream, e.g., from the top of the fluidized bed. This exhaust stream can be primarily composed of air, but can further include components not removed by the adsorption, such as particulate matter, $NO_x$, carbon monoxide (CO), carbon dioxide ($CO_2$), sulfur dioxide ($SO_2$), and/or non-adsorbed VOCs and/or HAPs. As embodied herein, the purified exhaust stream can be suitable for release into the environment and can meet regulatory standards for emissions.

5.2.6 Sorbent

The adsorber of the presently disclosed system contains at least one sorbent, e.g., within a bed, such as a fluidized bed. The sorbent of the present disclosure can be any sorbent that is suitable for removing undesirable emissions, such as HAPs, VOCs, and/or particulate matter, from an exhaust stream from a wood drying process.

For example, and without limitation, the sorbent can include beads, particles, or a combination thereof. The sorbent can be made of any suitable material, including, but not limited to, carbon (including activated carbon), zeolite, silica (e.g., fumed silica or silica gel), purolytic synthetic material, polymeric material, activated alumina, bauxite, clays (e.g., amorphous, crystalline, and/or mixed layer clays), iron oxide, magnesium oxide, magnesium silicate, molecular sieves, zirconium oxide, and combinations thereof. In certain embodiments, the beads or particles can be nanoporous, including microporous (e.g., having a pore size less than 2 nm), mesoporous (e.g., having a pore size from 2 nm to 50 nm) and/or macroporous (e.g., having a pore size greater than 50 nm) beads and particles. In certain embodiments, the sorbent can comprise activated carbon, including bead activated carbon (BAC). Activated carbon can also be in the form of carbon fiber, chop, felt, or yarn, or can be powdered, granularized, pelletized, or embedded in a cloth. As embodied herein, the activated carbon can optionally be impregnated to improve adsorption efficiency, e.g., of one or more specific VOCs.

Examples of activated carbon suitable for use with the present disclosure include, but are not limited to, Bead-Shaped Activated Carbon (from Kureha America, LLC) or other forms of spherical activated carbon (such as those available from Blucher GmbH). In certain embodiments, the sorbent can comprise polymer materials, such as those described in U.S. Pat. Nos. 8,999,202; 9,133,295; 9,133,337; 9,464,162; 9,598,525; 9,714,172; U.S. Patent Pub. No. US20130209348A1; and U.S. Patent Pub. No. US20150329364A1, the contents of which are hereby incorporated by reference in their entireties. In certain embodiments, the sorbent can comprise Dowex resin beads (from Dow Chemical Company).

Sorbents for use in the present disclosure can have any suitable size and shape. For example, the sorbent can be spherical, granular, pelletized, or a combination thereof. As used herein, the term "beads" refers to a generally spherical sorbent. The size of the sorbent can be from about 10 microns to about 10 mm, or from about 10 microns to about 4 mm, or from about 10 microns to about 800 microns, or from about 400 microns to about 700 microns.

Generally, the amount of the sorbent can be selected based on the expected amount of material to be adsorbed. For example, the capacity of the sorbent can be up to about 75%, or up to about 50% of the initial weight of the sorbent. In certain embodiments, it is preferred that the amount of material adsorbed during operation is from about 10% to about 50%, or from about 15% to about 33%, or at least about 20% of the initial weight of the sorbent. In particular embodiments, the amount of material adsorbed during operation can be about 30% of the initial weight of the sorbent. Generally, the amount of the sorbent can be selected based on the expected amount of material to be adsorbed. For example, in certain embodiments, the weight of sorbent can be from about 2 times to about 10 times, or from about 5 times to about 7 times the weight of material expected to be adsorbed.

Sorbent particles can also be defined by their density, bulk density, void fraction, size distribution, and terminal velocity. For example, and not limitation, the apparent density of the virgin sorbent can be from about 0.1 g/mL to about 5 g/mL, or about 0.2 g/mL to about 2 g/mL, or about 0.3 g/mL to about 1 g/mL, or about 0.6 g/mL. The apparent density of spent sorbent or reactivated sorbent can be greater than that of virgin sorbent, e.g., from about 0.5 g/mL to about 1.5 g/mL, or from about 0.6 g/mL to about 0.9 g/mL. During operation, the apparent density of the sorbent can be from about 0.1 g/mL to about 1.5 g/mL, or from about 0.5 g/mL to about 1 g/mL, or from 0.78 g/mL to about 0.81 g/mL, or from about 0.81 g/mL to about 0.813 g/mL, or from about 0.55 g/mL to about 0.9 g/mL, or from about 0.6 g/mL to about 0.8 g/mL, or from about 0.6 g/mL to about 0.7 g/mL. In certain embodiments, the apparent density of the sorbent can be about 0.6 g/mL, or about 0.62 g/mL, or about 0.64 g/mL, or about 0.66 g/mL, or about 0.68 g/mL, or about 0.7 g/mL, or about 0.72 g/mL, or about 0.74 g/mL, or about 0.76 g/mL, or about 0.78 g/mL, or about 0.785 g/mL, or about 0.8 g/mL, or about 0.803 g/mL, or about 0.805 g/mL, or about 0.81 g/mL. In certain embodiments, the apparent density of the sorbent is maintained at or below 0.79 g/mL, or at or below 0.785 g/mL, or at or below 0.78 g/mL, or at or below 0.775 g/mL, or at or below 0.77 g/mL, or at or below 0.765 g/mL, or at or below 0.76 g/mL, or at or below 0.755 g/mL, or at or below 0.75 g/mL. As embodied herein, the apparent density can be measured by the ASTM Standard Test Method for Apparent Density of Activated Carbon (Designation D 2854-96), the contents of which are hereby incorporated by reference in entirety. In certain embodiments, the bead density of the sorbent can be from about 0.4 g/mL to about 0.7 g/mL or from about 0.5 g/mL to about 0.7 g/mL. In particular embodiments, the bead density of the sorbent can be about 0.584 g/mL, about 0.603 g/mL, about 0.6 g/mL, about 0.611 g/mL, about 0.618 g/mL, about 0.630 g/mL, or about 0.633 g/mL.

In certain embodiments, the Brunauer-Emmett-Teller (BET) surface area of the virgin sorbent can be from about 500 m$^2$/g to about 2000 m$^2$/g, or from about 700 m$^2$/g to about 1500 m$^2$/g, or from about 1000 m$^2$/g to about 1200 m$^2$/g, whereas the BET surface area of the spent sorbent can be less than about 20 m$^2$/g, or less than about 15 m$^2$/g, or less than about 10 m$^2$/g.

In certain embodiments, the adsorber can contain two or more types of sorbent. For example, and not limitation, different types of sorbent can be combined together in a single bed, or can be present in different beds. If two or more different sorbents are used, they can differ by material, size, shape, and/or any other parameter. As a result, the adsorption and/or desorption properties of the two or more sorbents can differ. For example, in certain embodiments, the sorbents can adsorb different components from an exhaust stream. Additionally or alternatively, the sorbents can have different parameters for desorption (e.g., different desorption temperatures in the case of thermal desorption), allowing the release of adsorbed material in a staged manner.

Fluidization of the sorbent in a fluidized bed can increase the attrition of the sorbent, as its particles can be cracked or broken due to the mechanical impact of fluid-like flow within the adsorber. Thus, it can be important to select a sorbent that is resistant to cracking and breaking. If the attrition of the sorbent is reduced, then the rate of sorbent replenishment can also be reduced. As embodied herein, sorbent attrition can be low, e.g., less than 1% per year.

Sorbent that has succumbed to cracks and breaks can be filtered or otherwise removed from the system, either from within the adsorber or at a downstream component. For example, and not limitation, in certain embodiments, cyclonic separation can be used to remove broken sorbent based on the weight change due to breakage.

5.2.6.1 Systems for Conveying Sorbent

As embodied herein, the system can further include components for providing the sorbent to and from the adsorber. The components described herein can be used to automatically or manually load and unload sorbent from the adsorber, e.g., as sorbent currently in use, but being stored during mill downtime; as new virgin sorbent; or reactivated sorbent after desorption and/or reactivation.

In certain embodiments, sorbent (i.e., used or spent sorbent, virgin sorbent, and/or reactivated sorbent) can be stored in one or more load and/or storage hoppers prior to conveyance to the adsorber. Additionally or alternatively, the system can include one or more hoppers disposed within the adsorber, i.e., adsorber hoppers. The hopper(s) for use in the present disclosure can be made of any suitable material, as known in the art, including, but not limited to, stainless steel, carbon steel, or fiber reinforced plastic (FRP). To prevent sorbent from becoming stuck or aggregating within the system, the hopper(s) can optionally include vibrators and/or air blast cannons.

The hopper(s) can have an overall conical shape to encourage flow of the sorbent down through the hopper(s) with less bridging of organic compounds. For example, the angle of the conical shape can be optimized to improve sorbent flow; for example, and not limitation, the minimum angle of the conical shape can range from about 25 degrees to about 45 degrees, or from about 28 degrees to about 30 degrees to provide suitable sorbent bead flow. For the purpose of illustration, FIGS. 2A-2B provide schematics of an example load and/or storage hopper for supplying fresh sorbent to the adsorber and having a conical shape to direct the flow of sorbent.

In certain embodiments, a load and/or storage hopper can include additional components to dry sorbent. During operation, sorbent can become wet due to moisture condensation, cleaning, etc. As such, air can be provided to the load and/or storage hopper, for example, heated air from downstream of the adsorber, which can blow across the sorbent. In such embodiments, a filter can be provided at the air outlet of the hopper to prevent sorbent from escaping with the passing air and ensure that sorbent is retained within the hopper.

In certain embodiments, the load and/or storage hopper can include internal components to promote mixing and fluidization during sorbent drying. The volume of the hopper can be large enough to hold enough sorbent to fill the adsorber and desorber and allow at least 30% freeboard to dry the carbon before loading it into the adsorber before a startup.

Additionally or alternatively, the load and/or storage hopper can be sized large enough to ensure that the sorbent does not impinge onto the top inside surface of the hopper, which can minimize sorbent attrition due to mechanical fracturing against the top surface of the hopper. In certain embodiments, the height to diameter ratio of the load and/or storage hopper can be anywhere from about 12:1 to about 8:1, e.g., about 10:1.

In certain embodiments, the hopper(s) can include one or more air flow valves and/or nozzles to promote the flow of sorbent within the hopper(s), to the hopper(s) from upstream equipment (e.g., a desorber separator pot, fresh sorbent source, side stream reactivator), and/or from the hopper(s) to downstream equipment (e.g., adsorber). For example, such air flow valves can be particularly advantageous within the adsorber hopper, which can help to regulate the flow of sorbent within the adsorber.

Additionally, in certain embodiments, one or more hoppers can be heated to reduce or prevent condensation by bringing the temperature of the adsorber hopper and sorbent closer to the active temperature of the adsorber and above the dewpoint of the inlet stream to the adsorber. For example, and not limitation, the active temperature of the adsorber can be from about 2° F. to about 60° F. above the dewpoint, or from about 5° F. to about 40° F. above the dewpoint, or from about 10° F. to about 20° F. above the dewpoint of the exhaust stream at the adsorber inlet.

The hopper(s) and the entire adsorber can be heated using any suitable means, as known in the art. For example and not limitation, the hopper(s) and/or adsorber can be heated as needed via electrical heat tracing, an electric heating blanket, or the like. Advantageously, separate temperature controllers can be used to maintain the adsorption system (i.e., hopper) and/or certain sections of the adsorber (i.e., bottom section, middle section, and top section) at different temperatures. Additionally or alternatively, the gaseous stream(s) entering the hopper(s) can be pre-heated by direct or indirect heat exchangers. Additionally or alternatively, the hopper(s) can be partially or completely surrounded with insulation. For example and not limitation, the bottom valve of the adsorber hopper can be insulated to improve heat retention of the adsorber hopper and reduce or prevent moisture accumulation and/or condensation in the adsorber hopper and/or the adsorber.

As noted above, the one or more hoppers can be disposed within the housing of the adsorber or can be separately housed, but otherwise coupled to the adsorber. The hopper (s) can supply sorbent towards the top or bottom of the bed, such that, for example and not by limitation, sorbent can flow down to the adsorber hopper during fluidization. For example, sorbent can be supplied from a load and/or storage hopper at the top of the adsorber or below the top tray of the adsorber in order to ensure that lower trays within the adsorber remain full and fluidized. In certain embodiments, a load and/or storage hopper can be used alternatively or in combination with an adsorber hopper.

Additionally, and as detailed above, an additional sorbent source, such as reflux sorbent, can be provided at the lower trays. The reflux sorbent can be provided from the adsorber hopper, which can also be used to direct the flow of sorbent to a downstream desorber. Thus, an adsorber hopper, if present, can be disposed towards the bottom of a bed within the adsorber and circulate sorbent to the top of the bed or an intermediate tray of the bed. Additionally or alternatively, sorbent can be supplied at the top of the bed directly from a downstream desorber, e.g., to recycle desorbed sorbent back to the adsorber. Alternatively, e.g., in a two-pass fluidized bed, sorbent can be supplied at the bottom of the bed and conveyed through the adsorber to the top of the bed for adsorption.

As embodied herein, during startup operations, sorbent can be recirculated within the adsorber until the system reaches its operating temperature. In certain embodiments, the system can be heated prior to introduction of the sorbent into the adsorber to reduce or prevent moisture accumulation and/or condensation in the adsorber hopper and/or the adsorber.

In certain embodiments, sorbent can be conveyed from the hopper to the adsorber using an eductor and airlift system coupled with a separator pot, which can be in a certain position relative to the adsorber and bed to fill trays and/or equipment and maintain a bead transfer rate (i.e., rate at which sorbent flows into the adsorber and desorber, for example, about 300 pounds per hour to about 500 pounds per hour). The eductor can include an adjustment lever to adjust a bead transfer rate. The eductor can have a diameter of from about 1 inch to about 10 inches, or from about 1 inch to about 8 inches, or from about 2 inches to about 9 inches, or from about 3 inches to about 8 inches, or from about 4 inches to about 7 inches, or from about 4 inches to about 6 inches, or from about 4 inches to about 5 inches, or from about 5 inches to about 9 inches, or from about 5 inches to about 8 inches, or from about 6 inches to about 8 inches. One of ordinary skill in the art can size and select eductor diameter as necessary for the purposes presently disclosed. Additionally or alternatively, the sorbent can be conveyed by gravity flow into the hopper (e.g., adsorber hopper).

As embodied herein, the system can further include one or more additional load and/or storage hoppers, which can store sorbent when the system is offline or undergoing maintenance. For example, such a load and/or storage hopper can be separate from the adsorber hopper and used during changeouts of sorbent or to supply virgin sorbent to the adsorber or to return sorbent to the adsorber during continuous operations. In some embodiments, it can be desirable to exchange all of the sorbent in the system. During such a total sorbent exchange, desorbed old sorbent can be removed via the load and/or storage hopper into containers, e.g., steel drums, and fresh sorbent can be loaded into the adsorber via the load and/or storage hopper.

In certain embodiments, sorbent removed from the adsorber can be desorbed and returned to the load and/or storage hopper, in a batch, semi-batch, or continuous process. Thus, the system can further include a desorber and additional sorbent reactivation processes (e.g., a side stream reactivator), as wells as lines for conveying spent sorbent to the desorber and back to the top of the bed or to a hopper. In certain embodiments, the operating temperature of the desorber can be maintained between about 360° F. to about 470° F., between about 370° F. to about 470° F., between about 390° F. to about 420° F., or between about 390° F. to about 430° F. In particular embodiments, the operating temperature of the desorber can be maintained at about 390° F., about 400° F., about 410° F., about 420° F., or about 430° F. In particular embodiments, sorbent is circulated in a continuous process. Additionally or alternatively, sorbent can be periodically removed from the adsorber for cleaning and reactivation, as described in greater detail below. Moreover, the system can include one or more features for supplying virgin sorbent to the hopper(s) and/or adsorber.

The sorbent can be conveyed within the system using any suitable means, as known in the art. For example, and not limitation, sorbent can be conveyed using airlift eductors, fans, pneumatics, nozzles, etc. Advantageously, orifices can be included within airlift systems to minimize airflow variation and to minimize variation in sorbent transfer rate. In certain embodiments, airlift systems can be advantageously heated with heat trace and/or insulated to prevent water condensation within the airlift systems, which can prevent sorbent flow in the overall adsorption system. A sorbent sampling system can be provided in order to periodically examine, test, and sample the sorbent (e.g., for apparent density) and improve accuracy of the adsorption system.

In certain embodiments, a fan can be used to promote the flow of sorbent within the adsorber. The fan can be disposed before or after the adsorber, or multiple fans can be placed at one or more locations before and/or after the adsorber. Suitable fans include, but are not limited to, Dyson fans, centrifugal fans, axial-flow fans, ring compressor fans, and regenerative blowers. The fan(s) can have blades with any suitable configuration, including, but not limited to, curved, plate, and radial-tip blades. In certain embodiments, the blades can be coated to reduce the bridging of organics, which could cause build up on the blades. Build up on blades can increase friction and cause the fans to lose their balance. In certain alternative embodiments, the fans can be bladeless. One or more fans can be used to ensure that there are no dead spots within the adsorber, i.e., regions where sorbent does not travel.

Additionally, one or more air flow valves can be used to manipulate fluidization within the adsorber, thereby improving sorbent flow.

5.2.6.2 Sorbent Reactivation

Over time, sorbent can become blocked from adsorbing efficiently due to buildup within pores or on the surface of the sorbent. Thus, the presently disclosed system can further include a sorbent reactivation system. Using the sorbent reactivation system, sorbent can be removed from the adsorber and/or desorber and cleaned. In certain embodiments, the sorbent can be stored in a load and/or storage hopper prior to reactivation. The sorbent reactivation system can be operated continuously, or in batch or semi-batch mode. For example, in particular embodiments, sorbent reactivation can take place continuously, such that a small side stream of sorbent is treated while the system is operating, i.e., in a side stream reactivator. In certain embodiments, the sorbent reactivation system can comprise at least one desorber, coupled with and arranged downstream of the adsorption system. In some embodiments, the sorbent reactivation system can comprise a desorber and at least one side stream reactivator unit.

Spent or used sorbent that is no longer efficiently adsorbing compounds in the adsorber can be directed to the desorber for treatment to remove and separate buildup within pores or on the surface of the sorbent. In addition to the desorber, some embodiments of the present disclosure also provide and maintain an amount of reactivated spent sorbent to the adsorber via a side stream reactivator (SSR). Such a sorbent reactivation system comprising a side stream reactivator is particularly beneficial when sorbent needs to be reactivated continuously for ongoing operations. As disclosed herein, benefits and advantages of a side stream reactivator include, but are not limited to, a continuous steady supply of reactivated sorbent to the adsorber, a reduction in the amount of fresh (i.e., virgin) sorbent needed for the adsorption system, management of particulate buildup on adsorber trays and plugging of downcomers, and an ability to monitor and maintain sorbent apparent density at a preferred and/or operationally desirable value. Further, by maintaining a certain sorbent apparent density, it is possible to control emissions of and particulate matter within a wood dryer exhaust stream as desired to be in compliance with environmental regulations and/or environmental requirements.

The presently disclosed subject matter has found that by maintaining a certain sorbent apparent density, the side stream reactivator can help the overall adsorption system achieve about 100% reduction efficiency, or at least about 99% reduction efficiency, or at least about 98% reduction efficiency, or at least about 97% reduction efficiency, or at least about 96% reduction efficiency, or at least about 95% reduction efficiency, or at least about 94% reduction efficiency, or at least about 93% reduction efficiency, or at least about 92% reduction efficiency, or at least about 91% reduction efficiency, or at least about 90% reduction efficiency of emissions from the exhaust stream at the adsorber inlet.

In certain embodiments, the side stream reactivator can provide reactivated sorbent at a rate between about 0.05% per day to about 10% per day, or between about 0.1% per day to about 10% per day, or between about 0.5% to about 10% per day, or between about 1% to about 10% per day, or between about 5% per day to about 8% per day. In certain embodiments, the side stream reactivator can provide reactivated sorbent at a rate of about 6% per day, or at a rate of about 5% per day, or at a rate of about 4% per day, or at a rate of about 3% per day, or at a rate of about 2% per day, or at a rate of about 1% per day, or at a rate of about 0.9% per day, or at a rate of about 0.8% per day, or at a rate of about 0.7% per day, or at a rate of about 0.6% per day, or at a rate of about 0.5% per day, or at a rate of about 0.4% per day, or at a rate of about 0.3% per day, or at a rate of about 0.2% per day, or at a rate of about 0.1% per day, or at a rate of about 0.05% per day based on sorbent flow to the adsorber.

As an alternative to sorbent reactivation via the sorbent reactivation system as presently disclosed, virgin sorbent can be continuously introduced into the adsorption system at a rate of about 6% per day, or at a rate of about 5% per day, or at a rate of about 4% per day, or at a rate of about 3% per day, or at a rate of about 2% per day, or at a rate of about 1% per day, or at a rate of about 0.9% per day, or at a rate of about 0.8% per day, or at a rate of about 0.7% per day, or at a rate of about 0.6% per day, or at a rate of about 0.5% per day, or at a rate of about 0.4% per day, or at a rate of about 0.3% per day, or at a rate of about 0.2% per day, or at a rate of about 0.1% per day, or at a rate of about 0.05% per day based on sorbent flow to the adsorber.

As embodied herein, the sorbent can be reactivated using any suitable physical and/or chemical techniques. For example, sorbent can be reactivated (i.e., cleaned) by heating to thermally decompose organics, using a high velocity impact to release particulate matter. For further example, in particular embodiments, a side stream reactivator can heat sorbent to between about 1000° F. to about 1600° F., or between about 1000° F. to about 1400° F., or between about 1400° F. to about 1600° F., or between about 1100° F. to about 1200° F., or between about 1400° F. to about 1500° F., or between about 1450° F. to about 1500° F. In particular embodiments, the side stream reactivator can heat sorbent to about 1000° F., about 1100° F., about 1200° F., about 1300° F., about 1400° F., about 1450° F., about 1500° F., or about 1600° F. In certain embodiments, the side stream reactivator can heat sorbet to at least about 1400° F., at least about 1450° F., at least about 1500° F., or at least about 1600° F. The side stream reactivator heats sorbent in nitrogen in the presence of water to clean organics from the sorbent by thermally destroying them and using the water and/or superheated steam to assist with the cleaning. An amount of water used can be from about 1% w/w to about 20% w/w, or about 1% w/w to about 10% w/w, or about 1% w/w to about 5% w/w, or about 10% w/w to about 20% w/w, or about 5% w/w to about 10 w/w %, on the basis of water to sorbent (e.g., carbon) being treated. In particular embodiments, an amount of water used can be about 1% w/w, about 5% w/w, about 10% w/w, about 15% w/w, or about 20% w/w, basis of water to sorbet (e.g., carbon) being used. The system can further include a capture system, such as a cyclone or wet scrubber, bag filter, wet electrostatic precipitator, or the like, to collect particulate matter. Alternatively, particulate matter can be combusted, e.g., in a burning boiler with any unburned particulate filtered from the boiler exhaust.

Additionally or alternatively, the sorbent can be chemically treated with water (e.g., steam), super critical carbon dioxide, and/or caustic solution. In certain embodiments, a non-oxygen atmosphere can be used to create pyrolysis on the sorbent or a solvent extraction system can be used for sorbent reactivation.

When the sorbent is chemically treated, it can be desorbed in a bed, such as but not limited to in a fixed bed, fluidized bed, or packed moving bed. In certain embodiments, the residence time of the sorbent within the bed of the adsorber can range from about 0.5 hours to about 4 hours. In certain embodiments, the sorbent can be used in the system with at least about 6 months, or at least about 1 year, between reactivations.

5.2.7 Additional Components

The systems of the present disclosure can further include other components and accessories, as known in the art.

For example, the presently disclosed systems can further include features to facilitate cleaning and maintenance. For example, access panels can be provided within one or more components, such as the wood dryer, the air treatment box, the adsorber, the desorber, the condenser, separator pots, the side stream reactivator (SSR), etc. for cleaning and maintenance. Additionally, lids, site glasses, covers, etc. can be provided within one or more components of the systems of the present disclosure.

For example, the presently disclosed systems can include components for pre-heating the exhaust stream and/or the adsorber before the exhaust stream is provided to the adsorber. For example, in certain embodiments, the exhaust stream can be pre-heated using an electrical heating coil, economizer, or heat exchanger, such as a plate fin heat exchanger, shell and tube heat exchanger, plate heat exchanger, and/or plate and shell heat exchanger. Additionally or alternatively, fresh air entering the airlift eductors used to convey sorbent to the adsorber can be pre-heated. In certain embodiments, the exhaust stream, adsorber, and/or fresh air can be pre-heated using the purified air stream exiting the adsorber. For example, in such embodiments, the purified air stream can be directed through a heat exchanger to pre-heat the incoming exhaust stream or fresh air stream, thereby recovering heat from the outlet stream. Additionally, and as known in the art, the wood drying and manufacturing processes disclosed herein can include the use of hot oil, e.g., in presses used in the manufacture of various wood products including oriented strand board. Such hot oil can be circulated to a heat exchanger or a jacket at or prior to the adsorber to heat the incoming exhaust stream and/or the adsorber. Additionally or alternatively, heating oil, natural gas, and/or electric heat can be used to heat the incoming exhaust stream, adsorber, or other components of the system.

As embodied herein, the inlet exhaust stream can undergo one or more pre-treatments prior to the adsorber. For example, the system can include one or more upstream baffles, filters, screens, or perforated plates for removing particulate matter from the exhaust stream. The one or more pre-treatments can be included, for example, in one or more air pre-treatment boxes. For further example, and not limitation, the system can include one or more electrostatic precipitators, including wet electrostatic precipitators (WESPs) or dry electrostatic precipitators (DESPs), cyclones, bag filters, mist eliminators, wet venture scrubbers, cyclonic separators, and the like. In certain embodiments, the system can include a heater and/or dehumidifier for reducing the moisture of the exhaust stream prior to the adsorber.

The presently disclosed systems can further include features to facilitate cleaning and maintenance. For example, access panels and spray nozzles for introducing water and/or detergent solutions can be provided within the housing of the adsorber, which can provide access to the bed(s) for cleaning and maintenance. Cleaning solutions exist in the art and within the field of the presently disclosed subject matter. For example and not limitation, cleaning solutions of the present disclosure can include trisodium phosphate, sodium hydroxide, potassium hydroxide, ammonium hydroxide, calcium hydroxide, magnesium hydroxide, Panel Bright, or the like.

In certain embodiments, cleaning and maintenance of can be facilitated through direct manual application or by a remote-controlled spray nozzle system, e.g., a deluge at the top of the adsorber. Scheduled cleaning and maintenance of equipment helps to ensure longevity of the adsorption system and effectiveness for emissions control. In some embodiments, scheduled and routine cleaning and maintenance can be performed monthly, bimonthly, weekly, and/or after a set number of days (e.g., every 10 days).

In a non-limiting example of a scheduled cleaning, the equipment in need of cleaning (e.g., adsorber) is cooled. Sorbent is emptied from the adsorber by, for example, draining the sorbent from the bottom of the adsorber. The emptied sorbent can be stored in vessels (e.g., pails or drums) or alternatively transported to a load hopper via the eductor, airlift system, and separator pots. Sorbent can be additionally cleaned from the adsorber by brushing the adsorber trays to facilitate bead drainage and collection from the bottom of the adsorber. Drained sorbent can be collected into a container or filter bag as appropriate. The adsorber is isolated from upstream and downstream equipment through the close and lock of appropriate valves. The adsorber internals are first rinsed with fresh water via manual water deluge located at the top of the adsorber. A cleaning solution, such as, but not limited to, trisodium phosphate or Panel Bright is applied to the internals of the adsorber for approximately 30 minutes. The adsorber is then rinsed again with fresh water to remove cleaning solution. An operator can perform a visual inspection of the adsorber internals via sight glasses and determine whether the surfaces and undersides of the adsorber trays have been cleaned. Multiple cycles of cleaning and rinsing with fresh water can be employed. When cleaning and rinsing is complete, the adsorber can be connected to process fan(s) and/or airlift fan(s) as presently disclosed for drying. After the adsorber is clean and dried, the adsorber can be reconnected with upstream and downstream equipment via control and/or isolation valves. Sorbent is reloaded into the adsorber for startup.

Various process controls can be used to ensure the safety and efficiency of the system. The process controls can be based on read outs from various measurement features, and can optionally be automatically triggered by certain threshold measurements. These process control features can include any suitable measurement or other process control accessory known in the art including, but not limited to, pressure indicators, pressure transmitters, pressure regulators, differential pressure cells, thermowells, temperature indicators, thermocouples, temperature switches, resistance temperature detectors, pH meters, flow meters, mass meters, turbine meters, flow monitors, flow regulators and valves, gas analyzers, LEL monitor, oxygen analyzer, humidity sensors, radar sensors, hopper level probes, ammeters, current meters, liquid level and level interface detectors (e.g., in a terpene collection system), photon ionization detectors (PID), solenoids, and/or drives (e.g., electrical drives). In certain embodiments, the process controls can be implemented using a programmable logic controller (PLC) and/or DCS system with both on- and off-site access capability. Process controls include, but are not limited to, water deluge to extinguish fires, system shut downs, or heater shut downs, etc. For example, in the adsorber, sensors can be used to trigger water deluge to extinguish fires.

5.3 Methods of Obtaining Exhaust Streams for Terpene Recovery and Controlling Emissions from Exhaust The present disclosure further provides methods of obtaining an exhaust stream comprising terpenes from a wood drying process. Specifically, the resulting exhaust streams can be suitable for downstream recovery of the terpenes. The methods can include drying a wood product to obtain a process exhaust stream, reducing an amount of particulate matter in the process exhaust stream, and heating the process exhaust stream to obtain an exhaust stream comprising terpenes, which can then be adsorbed in an adsorber.

The present disclosure provides methods of controlling emissions from exhaust streams. Specifically, the exhaust streams can be derived from a wood drying process. The methods can include providing an exhaust stream to an adsorber and contacting the exhaust stream with a sorbent within the adsorber to remove undesirable emissions from the exhaust stream and generate a purified air stream.

In certain embodiments, methods can include pre-treating the process exhaust stream coming from a wood dry process. For example, the exhaust stream can be physically and/or chemically treated, as described above, and in particular, can be passed through one or more baffles, filters, screens, and/or perforated plates to remove particulate matter and larger debris from the exhaust stream. Additionally or alternatively, the exhaust stream can be dehumidified and/or pre-heated prior to introduction to the adsorber. For example, and not limitation, the exhaust stream can be heated to reduce its relative humidity downstream from the dryer, but upstream from the adsorber.

As embodied herein and in order to achieve effective adsorption, the exhaust stream can be introduced to the adsorber at a temperature and pressure sufficient to fluidize sorbent within a fluidized bed. For example, and not limitation, the pressure of the exhaust stream at the inlet of the adsorber can range from about 1 inch of water to about 20 inches of water, or from about 1 inch of water to about 15 inches of water, or from about 1 inch of water to about 10 inches of water, or from about 1 inch of water to about 8 inches of water. For further example, and not limitation, the differential pressure across the adsorber can range from about 1 inch of water to about 20 inches of water, or from about 1 inch of water to about 10 inches of water, or from about 1 inch of water to about 6 inches of water, or from about 1 inches of water to about 5 inches of water, or from about 2 inches of water to about 4 inches of water, or from about 3 inches of water to about 4 inches of water, or preferably about 3.2 inches of water. Thus, the pressure of the stream at the outlet of the adsorber can range from about 1 inch of water to about 10 inches of water, or from about 1 inch of water to about 8 inches of water, or from about 1 inch of water to about 5 inches of water. As embodied herein, a low differential pressure can conserve energy, e.g., as compared to conventional RTO systems.

For example, and not limitation, the operating temperature of the exhaust stream entering the adsorber can be from about 2° F. to about 60° F. above the dewpoint, or from about 5° F. to about 40° F. above the dewpoint, or from about 10° F. to about 20° F. above its dewpoint.

In certain embodiments, for example, and not limitation, wherein the dryer is used in the production of oriented strand board, the temperature of the exhaust stream at the inlet of the adsorber can be maintained at from about 140° F. to about 230° F., or from about 140° F. to about 210° F., or from about 140° F. to about 200° F. For further example, in embodiments wherein the dryer is used in the production of veneer laminated plywood production, the temperature of the exhaust stream at the inlet of the adsorber can be maintained at from about 260° F. to about 400° F. In certain embodiments, the temperature of the exhaust stream at the inlet of the adsorber can be maintained at about 330° F.

In certain embodiments, the relative humidity of the process exhaust stream at the inlet of the adsorber can be less than about 60%, less than about 55%, or less than about 50%.

In certain embodiments, methods can include increasing the airflow and stabilizing the bed temperature in order to minimize condensation within the adsorber. Moreover, the airflow can be controlled to maintain minimum fluidization velocity without exceeding sorbent entrainment velocity. In certain embodiments, the airflow can be maintained using the differential pressure signal from the inlet diffuser wherein the signal is controlled via a PLC having logic to adjust a variable frequency drive (VFD). The VFD can adjust the process fan speed to maintain a nominal pressure drop at the inlet diffuser and constant flow across orifice.

The sorbent can be circulated within the adsorber at a mass transport rate of from about 10 pounds per hour to about 1000 pounds per hour, from about 300 pounds per hour to about 1000 pounds per hour, from about 10 pounds per hour to about 500 pounds per hour, or from about 10 pounds per hour to about 250 pounds per hour, or from about 100 pounds per hour to about 250 pounds per hour, or from about 100 pounds per hour to about 205 pounds per hour, or from about 100 pounds per hour to about 500 pounds per hour. In certain embodiments, the sorbent can be circulated within the adsorber at a mass transport rate of at least about 300 pounds per hour, or at least about 400 pounds per hour, or at least about 500 pounds per hour, or at least about 1000 pounds per hour. The sorbent can be circulated from the desorber to the adsorber at a mass transport rate of from about 10 pounds per hour to about 100 pounds per hour, from about 30 pounds per hour to about 80 pounds per hour, or from about 40 pounds per hour to about 85 pounds per hour, or from about 30 pounds per hour to about 50 pounds per hour. In certain embodiments, the mass transport rate of sorbent circulated from the desorber to the adsorber can be about 34 pounds per hour, about 38 pounds per hour, or about 44 pounds per hour.

The sorbent can overflow from the desorber back to the adsorber at a mass transport rate of from about 400 pounds per hour to about 500 pounds per hour or from about 430 pounds per hour to about 470 pounds per hour. Overflow of sorbent from the adsorber to the desorber can be from about 1% to about 30%, from about 5% to about 15%, or about 5% to about 10%. In particular embodiments, overflow of sorbent from the adsorber to the desorber can be about 1%, about 5%, about 10%, or about 15%.

For example, the sorbent can be circulated using an airlift fan operating with a discharge pressure of from about 10 inches of water to about 100 inches of water, about 10 inches of water to about 60 inches of water, about 25 inches of water to about 75 inches of water, or about 18 inches of water to about 22 inches of water. However, a person of skill in the art will appreciate that the air flow rate and mass flow rate will depend on several factors, including the output from the dryers, the capacities of the adsorber, desorber, and other equipment used in the presently disclosed method, and various process parameters, including pressure, space velocity, desorber heated section capacity, operating temperature, and the like.

As the exhaust stream passes through the adsorber, it can contact the sorbent, which can remove one or more undesirable components from the exhaust stream. For example, and not limitation, VOCs, such as terpenes, can be adsorbed from the exhaust stream. Such terpenes include, but are not limited to, alpha-pinene, beta-pinene, camphene, fenchene, alpha-fenchene, limonene, o-cymene, p-cymene, alpha-terpineol, cis-beta-terpineol, trans-beta-terpineol, gamma-terpineol, p-allylanisole, tricyclene, p-xylene, vinylcyclohexen, 2-norpinene, terpilene, p-cymenene, fenchol, myrcene, terpinolene, cis-anethole, trans-anethole, caryophyellenes, alpha-phellandrene, beta-phellandrene, methyl chavicol, tricyclene, 1,4-cineole, 1,8-cineole, 3-carene, alpha-terpinene, gamma-terpinene, isoterpinolene, camphor, L-camphor, isoborneol, borneol, L-borneol, cis-1,8-terpin, and trans-1,8-terpin, camphenilone, fenchone, exo-fenchol, exo-2,7,7-trimethylbicyclo[2.2.1]heptan-2-ol, fenchyl acetate, borneol acetate, among others. Additionally or alternatively, HAPs, such as formaldehyde, methanol, phenol, acrolein, acetaldehyde, and/or propionaldehyde, can be adsorbed. In embodiments of the presently disclosed subject matter, various fatty acids, acetic acid, acetone, and other organic compounds can be adsorbed by sorbent; such fatty acids and organic compounds can include, but are not limited to, propanoic acid, isobutyric acid, hexadecanoic acid, octadecanoic acid, oleic acid, dihydroabietic acid, furfural, 5,5-dimethyl-2(5H) furanone, N,N-dibenzoyloxyheptane diamide, 3-3-dimethyl-1(3H)-isobenzofuranone, among others.

Surprisingly, it was also found that some particulate matter can also be adsorbed by the sorbent, possibly due to the sorbent acting as a dry scrubber for certain components of the particulate matter. For example, certain components of PM 2.5 particulate matter can be adsorbed, in particular, resins found within PM 2.5 particulate matter. This adsorbed material can be later desorbed, e.g., using thermal desorption. Once desorbed, it can be collected for various end uses, or can be further purified and/or isolated. In certain embodiments, the desorbed material can be combusted (e.g., via thermal oxidation), thereby significantly lowering the overall amount of gas (e.g., air) containing material for combustion that must be heated relative to RTO systems. Thus, in such embodiments, this represents a significant energy savings over conventional RTO systems.

Additionally, and as embodied herein, the system can manage the stickies found in the exhaust stream. As used herein, "stickies" refers to wood resins that can accrue as deposits within the system, for example, but not limitation, pitch and/or rosin. For example, and in certain embodiments, at least a portion of the stickies can adsorb onto the surface of the sorbent. Such stickies can be desorbed and thereby removed from the sorbent prior to recycling the sorbent back to the adsorber, or the stickies can be removed (e.g., thermally disintegrated) from the sorbent during reactivation of the sorbent. Additionally or alternatively, at least a portion of the stickies can impinge on the equipment in the system (e.g., the interior surface and/or trays of the adsorber) and cleaned via a caustic cleaner, as described above.

Following adsorption, a purified air stream can exit the adsorber. This purified air stream can be primarily composed of air, but can further include components not removed by adsorption, such as certain particulate matter, $NO_x$, carbon monoxide, carbon dioxide, sulfur dioxide, and/or non-adsorbed VOCs, HAPs, inorganics (e.g., containing potassium, silicon, sulfur, chlorine, calcium, manganese, magnesium, antimony, arsenic, beryllium, cadmium, chromium, cobalt, mercury, nickel, phosphorus, sodium, lead, rubidium, iron, copper, and/or zinc), PM 2.5, PM 10, and larger particulate matter. The purified air stream can be sent to a vent or stack for release into the environment. Alternatively, it can be subjected to further purification.

As embodied herein, as compared to the exhaust stream taken from the wood drying process, the presently disclosed systems and methods can reduce VOCs. In the present disclosure, removal efficiencies are measured as actual abatement percentages and are not inclusive of air dilution resulting from air lift fans. For example, in the presently disclosed systems and methods, actual abatement of the reduction of VOCs is at least about 70%, at least about 80%, or at least about 90%.

As disclosed herein, all percentages provided refer to actual abatement. In particular, the presently disclosed systems and methods can reduce terpenes by at least about 70%, at least about 80%, or at least about 90%. Similarly, formaldehyde, methanol, phenol, acrolein, acetaldehyde, and/or propionaldehyde, individually or in the aggregate, can be reduced by at least 10%. For example, and not limitation, formaldehyde can be reduced by at least about 20%, or at least about 30%; and/or methanol can be reduced by at least about 10%, at least about 20%, or at least about 30%. Particulate matter, including PM 2.5, PM 10, filterable particulate matter, and condensable particulate matter, individually or in the aggregate, can be reduced by at least about 20%, or at least about 40%, or at least about 50%, or at least about 70% on a grains per dry standard cubic foot basis (e.g., in mg/dscm). For example, and not limitation, filterable particulate matter can be reduced by at least about 35%, or at least about 50%; and/or condensable particulate matter can be reduced by at least about 10%, at least about 20%, at least about 50%, at least about 60%, or at least about 70%; and/or PM 2.5 can be reduced by at least about 20%, at least about 30%, at least about 50%, at least about 60%, or at least about 70%; and/or PM 10 can be reduced by at least about 25%, at least about 40%, at least about 50%, or at least about 60%. As embodied herein, the reduction in particulate matter can be determined on a grains per dry standard cubic foot basis (e.g., in mg/dscm). The purified air stream can contain less than about 200 ppm, less than about 100 ppm, less than about 50 ppm, or less than about 25 ppm VOCs, including terpenes, which can be as measured as total hydrocarbons on a propane calibration basis, for example less than about 10 ppm, or less than about 2 ppm methanol; and/or less than about 10 ppm, or less than about 7 ppm formaldehyde. The purified air stream can contain less than about 200 mg/dscm, less than about 150 mg/dscm, less than about 100 mg/dscm total particulate matter.

The purified air stream exiting the adsorber can include primarily air. For example, and not limitation, the purified air stream can contain less than about 15 ppm, or less than about 12 ppm, or less than about 10 ppm $NO_x$. Similarly, the amount of carbon dioxide in the purified air stream can be from about 2.0% to about 3.5%, as compared to air exiting a conventional RTO, which typically contains from about 2.5% to about 5% carbon dioxide. The purified air stream exiting the adsorber can meet regulatory emissions standards and be suitable for direct release into the environment.

5.3.1 Methods of Desorption

As embodied herein, materials can be recovered from spent sorbent via downstream desorption. The desorption can be carried out using a number of different techniques. For example, in certain embodiments, materials can be desorbed from the sorbent in nitrogen or another inert gas via thermal desorption. For example and not limitation, thermal energy can be provided via electric immersion heaters or thermal oil. Advantageously, thermal oil can minimize temperature variation. However, desorption can occur through various other mechanisms, including supercritical $CO_2$ desorption, solvent extraction, and steam stripping.

Thus, the presently disclosed methods and systems can include the use of a desorber to desorb material (e.g., terpenes) from the sorbent. The desorber can include one or more beds to which spent sorbent can be provided, and in which the desorption can occur. For example, and not limitation, packed moving beds and fluidized beds are suitable for use in the presently disclosed desorbers. Alternatively, in certain embodiments, a rotary calciner can be used in the desorber, such that the rotation of the rotary calciner creates a falling bed. As embodied herein, and in certain embodiments, sorbent from the adsorber can be directed to two or more beds within the desorber using a distributor. In certain embodiments, the beds can be generally tubular. In certain embodiments, the desorber includes packed moving beds. The capacity of the desorber can be controlled by adjusting the number and the diameter of the beds.

As embodied herein, an inert gas stream can be provided to the desorber via a gas line. In particular embodiments, the inert gas stream can be provided to the desorber via a blower. The inert gas can reduce the presence of oxygen in the desorber, reducing the chance of auto-ignition of released volatile compounds. In certain embodiments, the inert gas stream can be maintained at an operational makeup pressure between about 30 inches of water to about 50 inches of water, between about 35 inches of water to about 45 inches of water, or between about 37 inches of water to about 43 inches of water. In certain embodiments, the operational recirculation rate of the inert gas stream can be maintained between about 7 cfm to about 11 cfm, between about 8 cfm to about 10 cfm, or between about 8.5 cfm to about 9.1 cfm. In particular embodiments, the operational recirculation rate of the inert gas stream can be maintained at about 7 cfm, about 8 cfm, about 9 cfm, about 10 cfm, or about 11 cfm. The inert gas stream can be supplied into the system by a blower having an operational blower outlet pressure maintained between about 26 inches of water to about 34 inches of water, from about 28 inches of water to about 34 inches of water, or from about 29 inches of water to about 32 inches of water.

Suitable inert gases include, but are not limited to, nitrogen ($N_2$), liquid supercritical $CO_2$, and superheated steam. In particular embodiments, the inert gas comprises nitrogen ($N_2$). After release of volatile compounds, the gaseous stream within the desorber can remain predominantly inert gas, e.g., at least 95 wt-% or at least 98 wt-% nitrogen ($N_2$). The inert gas can thus act as a carrier gas to transport desorbed terpenes to a cooling system, e.g., via one or more transport lines. When cooled, the recovered terpenes can be condensed from the inert gas, and the inert gas can be recycled and/or released into the atmosphere. Advantageously, the inert gas can be recirculated via blower(s) from the desorber to and from a condenser. Thus, the presently disclosed system can further include one or more recycle lines and/or vents for transporting inert gas from the cooling system. In certain embodiments, a makeup inert gas stream can be added to normally circulating inert gas to replace any lost inert gas during sorbent transfer.

Figure 4:
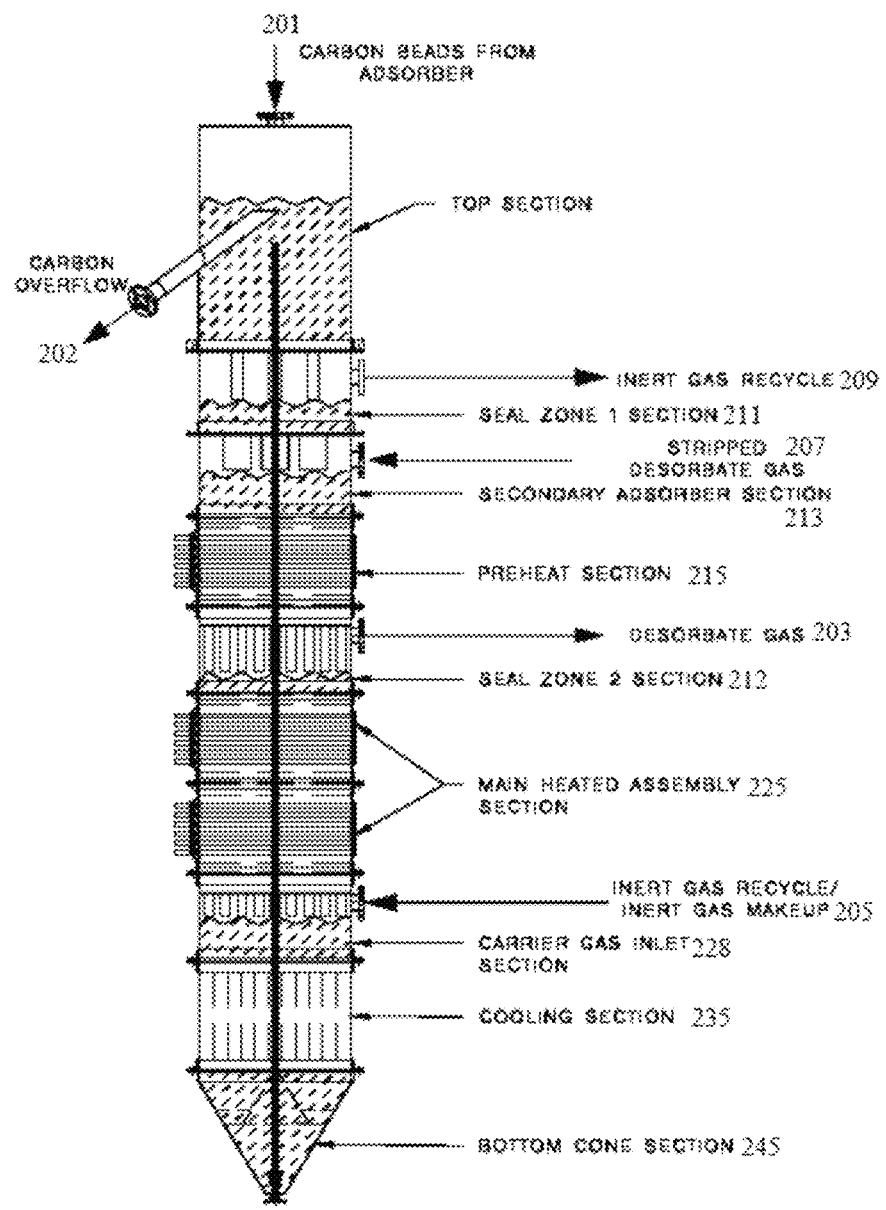

Additionally, in embodiments based on thermal desorption, the bed(s) can be provided with seal sections, and the capacity of the desorber can be further controlled by adjusting the relative amount of the bed(s) open to desorption versus closed by the seal sections. Generally, the configuration of one or more beds within the desorber can be designed to improve flow of sorbent and prevent plugging of the desorber. For the purpose of illustration and not limitation, FIG. 4 provides a schematic of a desorber in accordance with the presently disclosed subject matter. As shown in FIG. 4, spent sorbent 201 containing adsorbed material can be provided towards the top of the desorber. An exit for overflow 202 can be provided to remove any excess sorbent that accumulates at the top of the desorber, and also ensure the desorber remains full of sorbent.

Sorbent can flow downwards through the desorber to a first set of seal tubes 211. The seal tubes 211 can form a seal to prevent air from entering and increasing the oxygen content of gas in a preheat section 215 below the first set of seal tubes 211. In the preheat section 215, the sorbent is pre-heated (e.g., up to about the flash point of the adsorbed terpenes, or above the flash point of adsorbed terpenes but in the presence of inert gas), but the adsorbed material is not yet desorbed. Preheating the sorbent can facilitate removal of water from sorbent in upper section of the desorber. In some embodiments, water can be released in the preheating section. In certain embodiments, sorbent can be preheated to a temperature in a range of from about 100° F. to about 400° F., from about 200° F. to about 400° F., or from about 210° F. to about 400° F. For example and not by limitation, sorbent can be preheated to a temperature of about 125° F., or about 150° F., or about 175° F., or about 200° F., or about 225° F., or about 250° F., or about 275° F., or about 300° F.

The sorbent then flows downwards to a main heating section 225 for desorption. The main heating section 225 is isolated from the preheat section 215 with a second set of seal tubes 212. Following desorption, the sorbent can be fed to a cooling section 235 and removed from the desorber, e.g., and recycled back to an adsorber or sorbent reactivation system. The sorbent can be removed via a bottom section 245, which can have an overall conical shape to facilitate the movement of sorbent. In certain embodiments, the bottom section 245 of the desorber has a cooling capability to cool the sorbent prior to reintroduction into an adsorber coupled with the desorber. Such a cooling capability can further enhance adsorption and emission control because cooling the sorbent makes it less likely to desorb VOCs when reintroduced into the adsorber.

Within the desorber, the sorbent can encounter countercurrent flow with an inert gas, such that the inert gas strips the sorbent of the adsorbed material. For example, as shown in FIG. 4, the inert gas 205 can enter at a carrier gas inlet section 228 located below the main heating section 225. The inert gas can flow upwards, counter to the sorbent, and exit as a recycle stream 209 above the main heating section 225, preferably above the pre-heating section 215, such that it provides an inert environment as the sorbent is heated.

The desorbed gaseous stream 203 can exit the desorber immediately above the main heating section 225 such that desorbed terpenes are not fed to the preheat section 215. The desorbed gaseous stream can be sent to a downstream condenser for terpene recovery and after being stripped of terpenes and other VOCs, the gaseous stream can be recycled back to the desorber. For example, the recycled gaseous stream 207 can be recycled to a secondary adsorber section 213 for further recovery of terpenes and/or purification of the gaseous stream. In alternative embodiments, the desorbed gaseous stream 203 can be incinerated.

Figure 5:
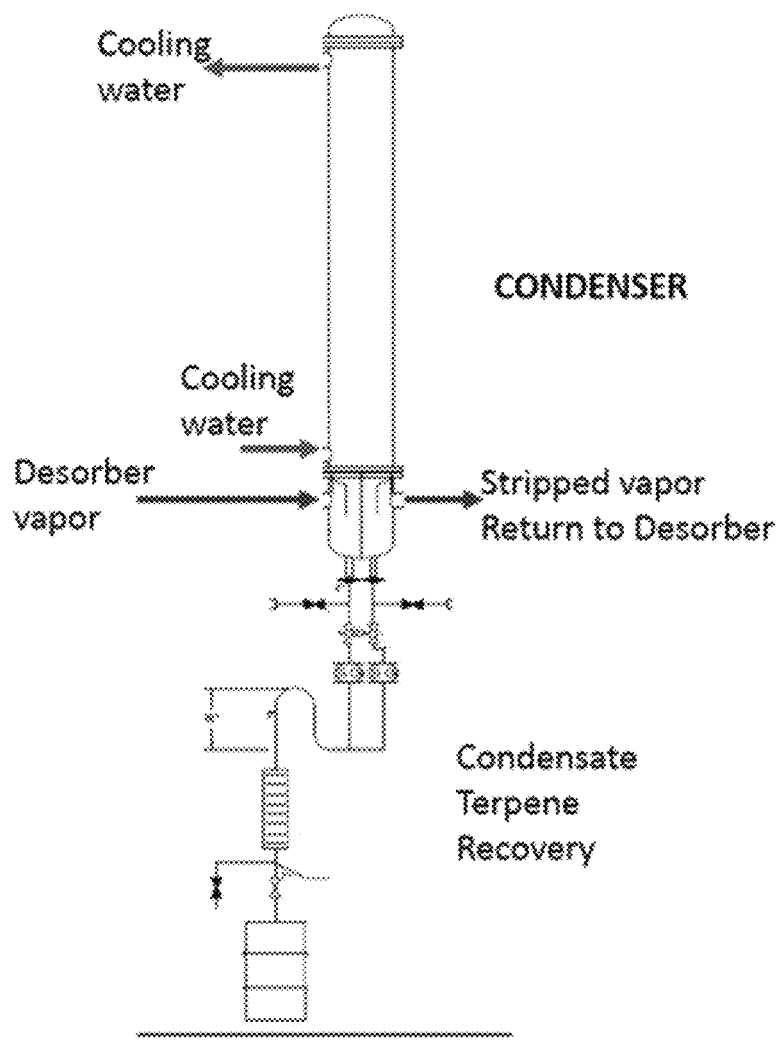

In certain embodiments, the desorbed gaseous stream from the desorber can be condensed into a liquid stream using a cooling system, such as a condenser. In the condenser, the hot gaseous stream can contact a condenser coil containing a chilled condenser fluid. For example and not limitation, FIG. 5 provides a schematic illustration of a cooling system including a condenser. As shown in FIG. 5, liquid condensate containing terpenes can be recovered at the bottom of the condenser. In particular embodiments, the condenser fluid can include water, e.g., water mixed with glycol, cooling tower water, or chilled water. Alternatively, the condenser can be air cooled. As embodied herein, the condenser can be cooled to an operating temperature of about 0° F. to about 125° F., preferably less than about 100° F. In certain embodiments, the condenser can be cooled to an operating temperature between about 40° F. to about 50° F. or between about 45° F. to about 50° F. In certain embodiments, the condenser can be cooled to an operating temperature of about 120° F., or about 115° F., or about 110° F., or about 105° F., or about 100° F., or about 95° F., or about 90° F., or about 85° F., or about 80° F., or about 75° F., or about 70° F., or about 65° F., or about 60° F., or about 55° F., or about 50° F., or about 45° F., or about 40° F., or about 35° F., or about 34° F. or about 30° F., or about 0° F. In certain embodiments, the condenser can have an operating pressure maintained from about 30 psi to about 60 psi, from about 41 psi to about 45 psi, or from about 43 psi to about 45 psi. In particular embodiments, the condenser can have an operating pressure maintained at about 41 psi, about 42 psi, about 43 psi, about 44 psi, or about 45 psi. Additionally or alternatively, cooling of the gaseous stream can be effected using expansion (Venturi) cooling.

The gaseous stream can be passed through the cooling system for one, two, or more passes. In certain embodiments, the condenser is configured for one pass. In other certain embodiments, the gaseous stream passes through the cooling system at least twice. Additionally, once terpenes have been condensed from the gaseous stream, the stripped gaseous stream can be recycled back to the desorber for use as a carrier gas, e.g., as indicated in FIG. 5, for use as a carrier gas or to further adsorb terpenes using sorbent in the desorber (e.g., in the secondary adsorber section 213).

Following desorption, a gaseous terpenes stream can be obtained from the desorber. This gaseous stream can contain desorbed terpenes, along with other desorbed materials, carried by the inert carrier gas. The terpenes and other desorbed materials can be in gaseous form, or alternatively, can be carried as small liquid droplets or solid particulates. In addition to terpenes, the desorbed materials can include other VOCs, HAPs (such as formaldehyde, methanol, phenol, acrolein, acetaldehyde, acetic acid, and/or propionaldehyde), other condensable compounds, and particulate matter, such as PM 2.5, PM 10, fatty acids, and fine particulate. In certain embodiments, the gaseous stream can be incinerated to destroy these desorbed materials such that terpenes are not recovered for downstream use.

However, in certain embodiments, the presently disclosed methods can further include recovering terpenes from the gaseous stream. In certain embodiments, other compounds, e.g., HAPs, condensable compounds, and particulate matter, can be recovered from the gaseous stream along with the terpenes. Alternatively, in certain embodiments, the gaseous stream can undergo additional separations to remove one or more of these components before or after condensation of terpenes from the gaseous stream. In particular embodiments, HAPs, such as formaldehyde, methanol, phenol, acrolein, acetaldehyde, and/or propionaldehyde, can be separately recovered from the gaseous stream, such that they are separated from the terpenes and suitable for downstream use. For example, multiple condensers operating at different temperatures can be used to selectively remove HAPs before or after condensing terpenes. Additionally, and as noted above, layers of condensed water, terpenes, and other organic fractions can be advantageously separated using a decanter.

Thus, the presently disclosed methods and systems can be used to recover a terpenes stream. As embodied herein, the terpenes stream can contain alpha-pinene and/or beta-pinene. For further example, and not limitation, the terpenes stream can contain other terpenes such as camphene, fenchene, alpha-fenchene, limonene, o-cymene, p-cymene, alpha-terpineol, cis-beta-terpineol, trans-beta-terpineol, gamma-terpineol, p-allylanisole, tricyclene, p-xylene, vinylcyclohexen, 2-norpinene, terpilene, p-cymenene, fenchol, myrcene, terpinolene, cis-anethole, trans-anethole, caryophyellenes, alpha-phellandrene, beta-phellandrene, methyl chavicol, tricyclene, 1,4-cineole, 1,8-cineole, 3-carene, alpha-terpinene, gamma-terpinene, isoterpinolene, camphor, L-camphor, isoborneol, borneol, L-borneol, cis-1,8-terpin, and trans-1,8-terpin, camphenilone, fenchone, exo-fenchol, exo-2,7,7-trimethylbicyclo[2.2.1]heptan-2-ol, fenchyl acetate, borneol acetate, among others.

The recovered terpenes stream can comprise from about 0 wt-% to about 100 wt-% alpha-pinene, or from about 1 wt-% to about 100 wt-% alpha-pinene. Additionally or alternatively, the terpenes stream can comprise from about 0 wt-% to about 50 wt-% beta-pinene.

5.4 Benefits and Advantages

The presently disclosed methods and systems achieve a number of advantages, e.g., as compared to conventional RTOs for wood drying processes, and are able to generate cleaned air streams from exhaust streams taken from wood drying operations. Such advantages include, but are not limited to, efficient recovery of terpenes from exhaust streams taken from a wood drying process and the reduction of emissions in compliance with applicable regulatory requirements.

The recovered terpenes can be suitable for use in various industries, including in the fragrance and flavor industry, which typically require relatively large amounts of these higher value terpenes. The terpene compositions can also be used in other industries, including as fuel or solvents, e.g., for paints and varnishes or for oilfield (e.g., Enhanced Oil Recovery or EOR) applications. The terpene compositions can further be used in adhesive resins or traditional medicines (e.g., traditional Chinese medicines).

Additionally, when implemented with downstream adsorption, the presently disclosed systems and methods can reduce or prevent emissions, e.g., as compared to conventional RTOs, for wood drying processes, while generating valuable terpene products. HAP emissions can be reduced by removing particulate matter upstream from a dryer, thereby reducing the amount of combusted particulate matter in the drying process. Further, removal of such particulate matter by the presently discloses system reduces the amount of HAPs as compared to conventional RTOs, which typically burn such HAPs from the exhaust stream.

Undesirable emissions including HAPs, VOCs, and particulate matter can be adsorbed by sorbent according to the presently disclosed systems and methods. The presently disclosed systems and methods provide downstream adsorption of pre-treated exhaust streams, resulting in overall reduction of VOC, particulate matter, and HAP emissions as compared to conventional RTOs (which generate additional greenhouse gases and $NO_x$ that can act as ozone precursors). Also, emissions of total hydrocarbons (THCs) are reduced by 90% or more as with RTOs, assuring compliance with PCWP MACT (plywood and composite wood products maximum achievable control technology) standards. Thus, the presently disclosed techniques can promote sustainability goals and recover valuable byproducts (e.g., VOC pollutants) that were previously incinerated, while still assuring compliance with regulatory standards. In addition, by eliminating the use of RTO, maintenance and operation costs are reduced or even avoided.

In addition to compliance with PCWP MACT standards, the system can be compliant with Prevention of Significant Deterioration (PSD) permitting standards and without causing or contributing to exceedances of the National Ambient Air Quality Standards (NAAQS). The systems and methods described herein can be easily evaluated as an alternative for emissions control, as the measurement of resulting emissions is straightforward and can be easily modeled for the known regulated pollutants. As compared to RTOs, it results in insignificant or no increases in $NO_x$, $SO_2$, and particulate matter, and thus would not be expected to trigger additional regulatory review for any of these pollutants. These techniques are in line with recent trends that favorably consider technologies that utilize pollution prevention strategies. The social and economic impacts of the presently disclosed technologies are significant.

EXAMPLES

The following examples are merely illustrative of the presently disclosed subject matter; they should not be considered as limiting the scope of the subject matter in any way.

Example 1

Adsorption Trials with Process Air

This Example describes pre-trial testing of adsorption for removing VOCs from a process exhaust stream taken from a wood drying process.

About 300 cfm of an exhaust stream from a wood dryer was diverted to an air pre-treatment box using a process fan. The air pre-treatment box was configured to reduce particulate matter of the dryer exhaust. The discharge of the process fan had two balancing dampers to control the flow of the gaseous stream to activated carbon beads (bead activated carbon or BAC from Kureha America, Inc.) within a fluidized bed at approximately 200 cfm; the remainder of the process stream bypassed the fluidized bed. The fluidized bed was operated in semi-batch mode and beads were replenished when they reached their maximum adsorption.

Sorbent beads were removed from the fluidized bed after 1 and 2 days online. The beads were subjected to thermal gravimetric analysis at temperatures from ambient temperature to 790° F. to determine the amount and type of adsorbed fluid (water versus hydrocarbons). The results of this gravimetric analysis are provided in Table 1.

TABLE 1

| Sample | Water Weight Loss (room temperature to ~212° F.) | Hydrocarbons Weight Loss (~212° F. to ~790° F.) |
| --- | --- | --- |
| Day 1 | 16.7% | 1.0% |
| Day 2 | 26.3% | 2.2% |

Throughout the trial, it was observed that beads were fluidized, but not enough that they flowed to the lowest weir within the fluidized bed. Additionally, a large amount of condensed water was present, and as demonstrated in Table 1, the beads could have adsorbed liquid water and become blocked from further adsorbing terpenes. This trial showed that, where a large amount of condensed water is present, the beads adsorbed primarily water (Table 1).

In order to reduce the amount of condensation, it was determined that measures should be taken to control the temperature of the fluidized bed and exhaust stream, e.g., by adding more insulation. Thus, a one inch duct insulation was added to the air pre-treatment box, process fan, and fluidized bed. Thereafter, another trial was performed with process air. The process parameters were set as indicated in Table 2 to normalize the temperature throughout the fluidized bed and to maximize bead fluidization.

TABLE 2

| | |
| --- | --- |
| Process fan suction | −14 to −15 inches of water |
| Fluidized bed before inlet diffuser | 15 inches of water |
| Fluidized bed after inlet diffuser | 10 to 14 inches of water |
| Fluidized bed outlet pressure | 7 to 8 inches of water |
| Temperature before air pre-treatment box | 172° F. to 173° F. |
| Temperature at process fan discharge | 182° F. to 184° F. |
| Temperature at bottom of bed (hopper) | 170° F. to 174° F. |
| Temperature at bottom tray of bed | 172° F. to 176° F. |
| Temperature at middle tray of bed | 172° F. to 176° F. |
| Temperature at top tray of bed | 146° F. to 151° F. |
| Outlet temperature | 161° F. to 168° F. |

Initially, there was some water condensation, as the fluidized bed temperature increased, the water condensation decreased from the bottom to the top of the bed, with condensation eliminated at the top tray last.

Example 2

Adsorption Trials with Clean Air

This Example describes additional trials on the fluidized bed, in which fresh air was provided to the fluidized bed to observe and maximize bead fluidization. A schematic illustration of the fluidized bed used in the present example is provided in FIG. 2.

Figure 6:
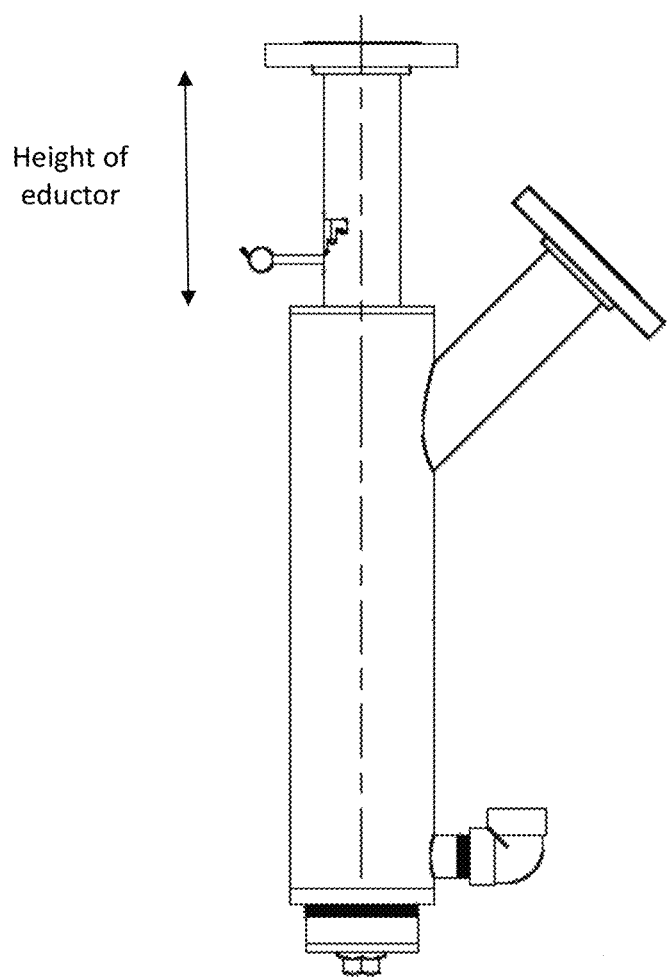

Several parameters were adjusted and the effects on bead fluidization were visually observed. First, the height of the eductor was adjusted relative to the fluidized bed. The eductor was fitted with a threaded pipe adjustment to vertically raise and lower it. It was found that movement of the eductor up and down increased and decreased bead flow, respectively. The "height" of the eductor was measured based on the distance between the top of the eductor and the bottom of the threaded pipe adjustment, as shown in FIG. 6. As the eductor was adjusted up and down, the bead flow rate was measured. The bead flow rate ranged from about 100 lb/hr to about 500 lb/hr. It was found that maximum bead flow was at 17.3 cm (for reference, at 13.5 cm, the eductor was closed).

Additionally, air flow valves disposed in the hopper at the base of the fluidized bed were turned on with nozzles set at about 30% open, which helped to fluidize the beads within the hopper. The airlift fan was set to 60-65 psig. The resulting pressures into and out of the bed were observed and are summarized in Table 3.

TABLE 3

| Process fan suction | −10 to −15 inches of water |
| Fluidized bed before inlet diffuser | 10 to 15 inches of water |
| Fluidized bed after inlet diffuser | 11 to 16 inches of water |
| Fluidized bed outlet pressure | 2 inches of water |

With the settings described in this Example and the use of air flow valves, 500 lbs/hr bead flow was generated, with the flow generally ranging from about 100 lbs/hr to about 500 lbs/hr. In this range, the trays remained generally full of beads. At lower flow rates, it was observed that beads could become stuck due to accumulated moisture. The beads were observed to fill all trays, excluding the bottom tray, within the fluidized bed. Because the bottom tray was generally empty, it acted as an air diffuser for the inlet stream. Additionally, it was found that the beads did not overflow to the downcomer tray.

Example 3

Filtration of Exhaust Stream

This Example describes a particulate control system, which can be used upstream from a fluidized bed adsorber to remove particulate matter from an exhaust stream from a wood drying process.

The particulate control system included an upstream perforated plate, followed by a 100 mesh screen, and a pleated filter, which were disposed within an air pre-treatment box. For trials 1-3, about 300 cfm of an exhaust stream from a wood dryer was diverted to the air pre-treatment box using a process fan. For trials 4-5, about 300 cfm of an exhaust stream from a wood dryer was diverted to the air pre-treatment box over 22 hours of run time.

Some particulate matter was visually observed on each feature within the air pre-treatment box. Additional particulate matter was observed on the walls of the air pre-treatment box. The most particulate matter was observed between the perforated plate and the mesh screen.

For additional observation, trial 4 was repeated with only a perforated plate over a 36 hour period. A hard black residue formed on the plate, which was analyzed and found to contain numerous inorganics including sodium, magnesium, aluminum, silicon, sulfur, chlorine, potassium, calcium, manganese, iron, copper, and zinc, some of which can come from scrapping the plates to remove the residue. Additionally, a dark colored residue collected on downstream heated filters which were adjacent to a Flame Ionization Detector (FID). These filters became plugged after approximately 6 hours and were replaced. The plugged filters were analyzed and found to contain wood fibers, dark pitch, and/or lignin type materials, as well as numerous inorganics including sodium, magnesium, aluminum, silicon, sulfur, chlorine, potassium, and calcium. IR analysis showed bands consistent with lignins and other carbons, as well as some inorganic salts. However, there was little or no observed particulate buildup on the inside of a downstream fluidized bed adsorber.

Example 4

Adsorption Trials with Fully Fluidized Fresh Beads

This Example describes a trial performed with full trays and fully fluidized beads using a process exhaust stream from a wood drying process, simulating an adsorption batch process.

About 300 cfm of an exhaust stream from a wood drying process was diverted to an air pre-treatment box using a process fan. The air pre-treatment box was configured to reduce particulate matter of the dryer exhaust. The discharge of the process fan had two balancing dampers to control the flow of the gaseous stream to activated carbon beads. The trial was run as the wood drying process was coming online. In the early stages of the process, 2 of the 5 dryers were running in the wood drying process, however, by about 2 hours into the trial, 4 of the 5 dryers were running.

During the trial, it took about 2 hours for the fluidized bed to warm to process air temperature. A schematic illustration of the fluidized bed used in the present example is provided in FIG. 2. As the process began to stabilize, after about 2 hours, the trays 109 equipped with weirs 110 began to fill and fluidize. The bead mass transport rate was increased from about 150 lb/hr to about 200 lb/hr to fully fill and fluidize beads within the trays. By 3 hours, the process was stabilized with the trays full and fluidized.

Once stable, the bed temperature averaged from about 150° F. to about 160° F., except the top tray, which was at about 135° F. throughout the trial. Small air flow adjusters, approximately 3.5"×15", were weighted for stabilization and positioned in the downcomer trays to facilitate tray filling, fluidization, and overflow to the downcomer trays. Based on pitot tube measurements, the calculated air flow within the fluidized bed was 294 cubic feet per minute (cfm).

Impingers containing 15 mL acetonitrile were set up both before (Inlet) and after (Outlet) the bed to collect emissions. System air was bubbled through impinger solutions via fritted spargers at about 50 mL/min via pressure provided from the fluidized bed. The pressure at the inlet of the bed was approximately 5-6 inches of water whereas the pressure at the outlet of the bed was approximately 3-4 inches of water.

Bead Attrition

Figure 7A:
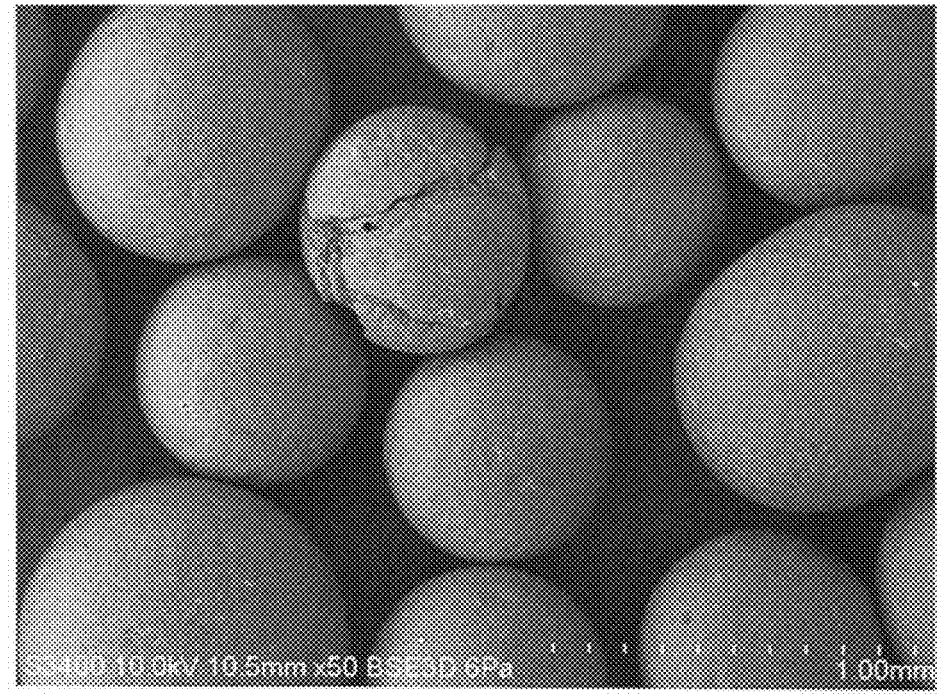
Figure 7B:
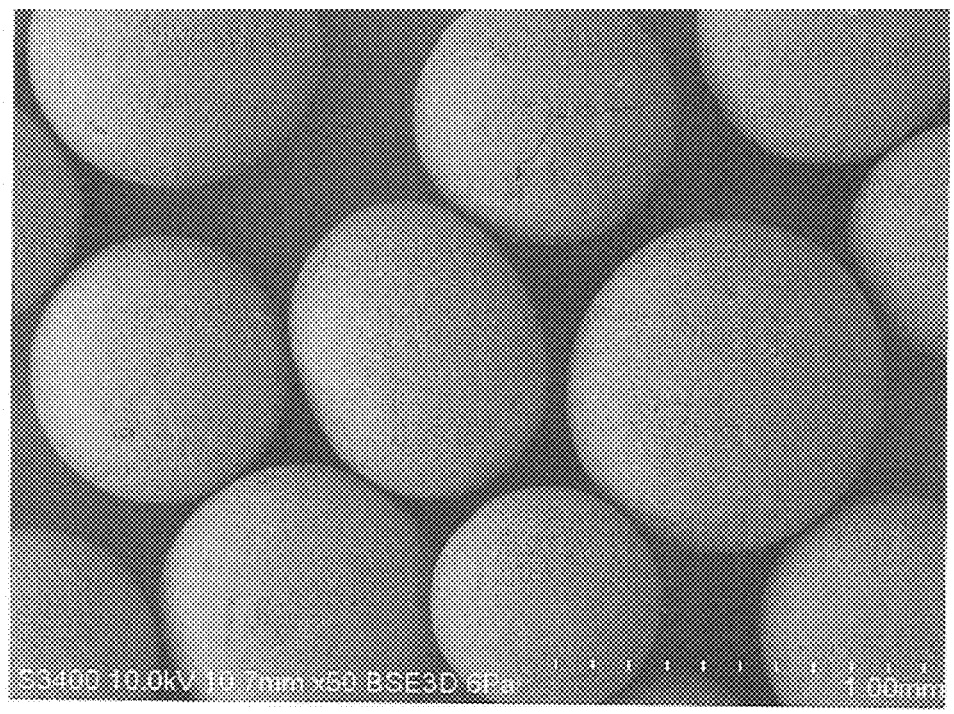

Attrition of the beads within the fluidized bed was observed using SEM microscopy. FIGS. 7A-7B provide images of new and used beads, respectively, at 50× magnification. The mechanical impact on the beads was studied to determine whether there was bead deterioration during the trial, which lasted about 6 hours.

Upon visual inspection of the SEM images, cracks were noted in both new and used beads and overall, there was no gross difference between the two sets of beads. This result indicates that the beads used in the Example are sufficiently robust to be used in the fluidized bed adsorption process with minimal attrition.

Bead Adsorption

The adsorption onto the beads was studied at various time points in the trial. The density of the beads was measured and thermal gravimetric analysis (TGA) was performed to determine the percentage of bead weight attributable to adsorbed organics. The beads were found to contain approximately 5% organics, mainly terpenes, and 3% water. The full data is presented in Table 4 and provided in FIG. 8, which shows bead density and percentage organics as a function of time. However, as described in further Examples, sorbent in a commercial system could include less water and more organics, depending in part on the startup conditions of the adsorber and the hydrophobicity of the sorbent.

TABLE 4

| Elapsed Time (min) | Notes | Bead Density (g/ml) | TGA-IR % Organics |
|---|---|---|---|
| 0 | Start air flow to warm bed | 0.584 | 0.00% |
| 120 | Load beads & start impingers | — | — |
| 180 | Process Stabilized | 0.603 | 0.82% |
| 240 | Process Stable | 0.600 | 2.60% |
| 300 | Process Stable | 0.611 | 3.93% |
| 360 | Process Stable | 0.618 | 5.10% |
| 420 | Process Stable | 0.630 | 6.06% |
| 480 | Process Stable/Shutdown | 0.633 | 6.40% |

Emissions at Impingers

As noted above, samples were taken at two impingers located at the inlet and outlet of the fluidized bed. Samples were taken over different time periods ranging from 2 to 8 hours, with the results as shown in Table 5, below.

TABLE 5

| Elapsed Time (min) | MeOH (ppm) | | HCHO (μg/mL) | | β-Pinene (ppm) | | α-Pinene (ppm) | |
|---|---|---|---|---|---|---|---|---|
| | Inlet | Outlet | Inlet | Outlet | Inlet | Outlet | Inlet | Outlet |
| 120 | ND | ND | 0.8 | 0.1 | NQ | NQ | 41.8 | NQ |
| 180 | ND | ND | 0.8 | 0.2 | NQ | ND | 41.8 | ND |
| 240 | ND | ND | 0.2 | 0.2 | NQ | ND | 47.2 | ND |
| 300 | ND | ND | 0.2 | 0.2 | NQ | ND | 47.2 | ND |
| 360 | ND | ND | 0.2 | 0.2 | NQ | ND | 39.5 | ND |
| 420 | ND | ND | 0.2 | 0.2 | NQ | ND | 39.5 | ND |

"ND" means non-detectable and "NQ" means non-quantifiable.

As shown in Table 5, there were no detectable methanol (MeOH) emissions at either the inlet or the outlet during any collection time period. Formaldehyde (HCHO) emissions were approximately the same at both the inlet and outlet, particularly once the process was stable. The outlet formaldehyde emissions in samples taken after 2 hours (120 min) were about half the amount in samples taken after 3 hours (180 min). Alpha-pinene emissions were higher at the bed inlet than the bed outlet. In particular, at the outlet impinger, alpha-pinene results were non-quantifiable (NQ), but detectable at 2 hours, during which time the beads did not fill the trays. Similarly, beta-pinene emissions were non-quantifiable but detectable at the inlet, but not detectable (ND) at the outlet, except at 2 hours, during which time the beads did not fill the trays. These results indicate that when there are fewer collisions (i.e., less air contact) with the beads, emissions are reduced to a lesser degree. Overall, the amount of terpenes, e.g., alpha- and beta-pinene, and other organics was reduced after passing through the fluidized bed, indicating that the activated carbon beads successfully adsorbed a portion of these volatile organic compounds.

Figure 8:
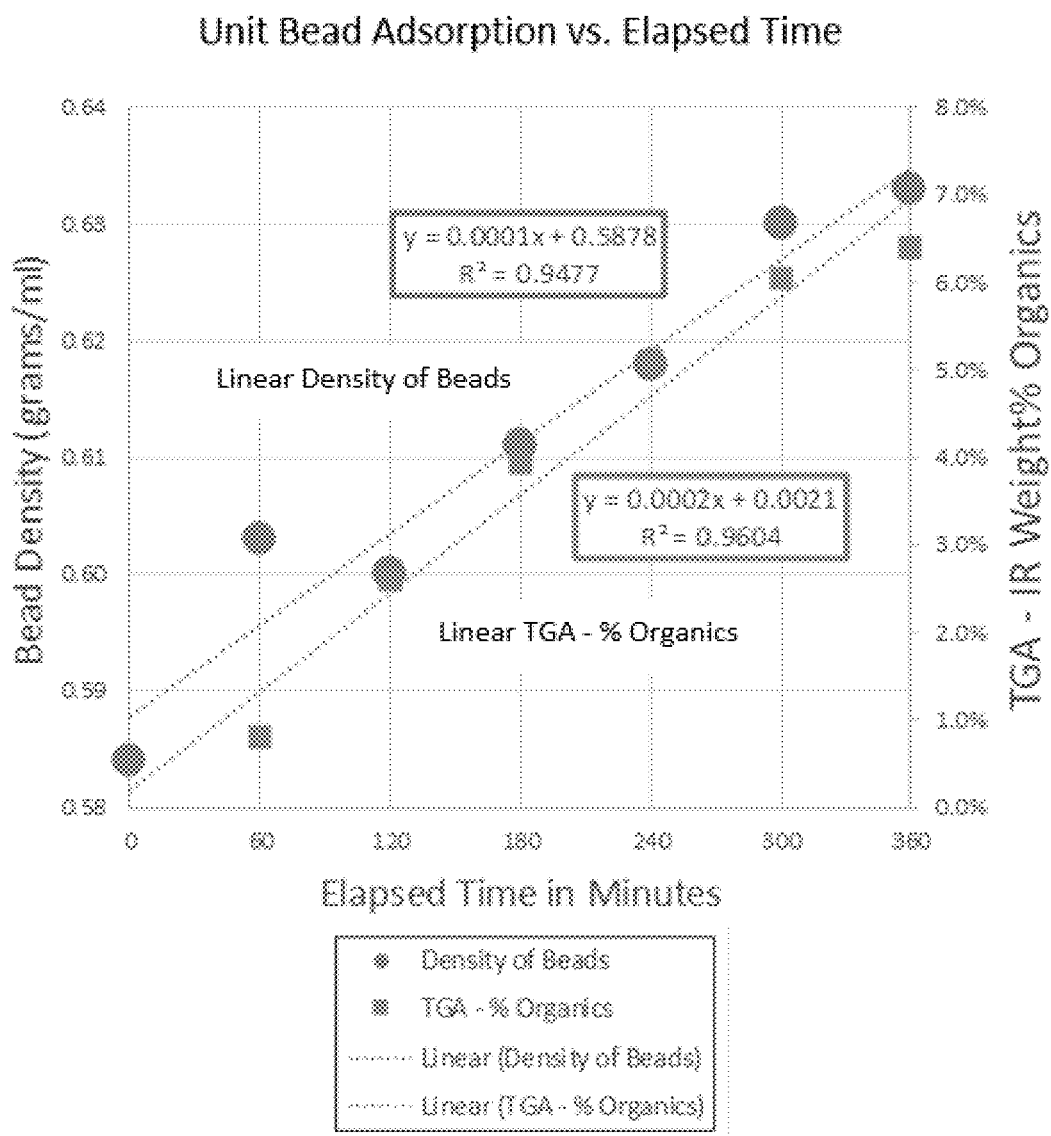
FIG. 8 shows sorbent bead density and percentage organics as a function of time in the adsorption trials of Example 4 of the present disclosure.

In sum, this Example shows that good bead flow and fluidization can be obtained using systems in accordance with the disclosed subject matter. Bead flow can be controlled by adjusting eductor height, airlift fan speed/pressure, orifice to modulate airflow through adsorber, and inlet/outlet pressures at the fluidized bed. The beads adsorbed organics linearly over the run time (FIG. 8). Additionally, the initial qualitative impinger analyses indicate that terpenes emissions are significantly reduced by adsorption onto activated carbon beads in fluidized bed.

Example 5

Pilot Scale Fluidized Bed for Adsorbing VOCs from an Exhaust Stream

This Example describes pilot scale testing of a system for removing VOCs from the exhaust stream of a wood drying process in accordance with the disclosed subject matter.

A process fan was configured to pull a slip stream of approximately 300 cfm from the exhaust stream of a wood drying process through an air pre-treatment box including a perforated plate, 100 mesh screen, and pleated filter to reduce particulate matter of the dryer exhaust. The discharge of the process fan had two balancing dampers to control the flow to a fluidized bed containing activated carbon beads at approximately 300 cfm, such that excess exhaust bypassed the bed to achieve optimum fluidization. These pilot trials were operated in semi-batch mode. A continuous process was operated through the adsorber and the desorber was operated in a batch process. Table 6 provides the parameters of the process fan and fluidized bed.

TABLE 6

| | |
|---|---|
| Process fan suction | −10 to −15 inches of water |
| Inlet pressure (upstream of discharge bypass line) | 4 to 11 inches of water |
| Fluidized bed after inlet diffuser | 5 to 12 inches of water |
| Fluidized bed differential pressure (out-in) | 2 to 4 inches of water |
| Fluidized bed outlet pressure | 1.5 to 4 inches of water |
| Temperature before air pre-treatment box | 164° F. to 178° F. |
| Temperature at process fan discharge | 164° F. to 180° F. |
| Temperature at bottom of bed (hopper) | 117° F. to 164° F. |
| Temperature at bottom tray of bed | 136° F. to 170° F. |
| Temperature at middle tray of bed | 136° F. to 168° F. |
| Temperature at top tray of bed | 122° F. to 146° F. |
| Outlet temperature | 130° F. to 158° F. |
| Bead mass transport rate | 100 to 205 pounds per hour |
| Air flow (actual) | 250 to 325 cfm |
| Air flow (dry standard) | 175 to 250 dscfm |
| Air flow (standard) | 225 to 300 scfm |

Over a period of 38 hours, samples were taken on an hourly basis for two trial runs. The following measurements were taken: bead density, percentage weight gain of the beads, ppm of hydrocarbons at inlet and outlet as measured by a flame ionization detector (FID), and the percentage water and organics as measured by thermal gravimetric analysis (TGA).

Bead Adsorption

FIG. 9A shows the bead density over time for each trial. As shown in FIG. 9A, bead adsorption generally increased with time in a linear fashion. FIG. 9A further shows the ppm of hydrocarbons at the outlet of the fluidized bed. The amount of hydrocarbons generally increased with time exponentially, presumably at the beads began to reach capacity. The trials had good replication up to about 15 hours, over which time the beads adsorbed a generally stable amount of hydrocarbons.

FIG. 9B provides the results of the thermal gravimetric analysis, comparing the percentage of organics (terpenes) and water with the run time. In the top panel of FIG. 9B, the percentage organics is overlaid with bead density showing that the percentage organics generally tracked bead density for each of the two runs. The maximum percentage organics adsorbed for both runs was approximately 22.5%. As shown in the bottom panel of FIG. 9B, the amount of water versus total adsorbed ranged from 1 to 20%, but up to about 10% water was typical. The total adsorbed amount is based on the total weight loss of the sorbent when heated to about 1100° F., when measured by thermal gravimetric analysis. Adsorption of higher levels of water was seen on bead samples with shorter run times, possibly due to adsorption of condensed water early in runs.

FIG. 9C provides the terpenes yield, extrapolated over a year as a function of run time assuming a wood drying product of about 300,000 dry tons per year. As shown in FIG. 9C, terpenes yield decreased based on run time, but generally remained over 200,000 gallons of terpenes per year. Additionally, terpene yield was estimated based on wood drying production of about 300,000 dry tons per year, assuming a terpenes yield of 1.16 gallons per dried ton (Naval Stores Reference Guide, p. 189) and an efficiency yield of 75%, resulting in an estimated about 260,000 gallons of terpenes per year. Thus, the terpenes yield extrapolated from estimated bead adsorption generally matches the calculated terpenes yield. Although FIG. 9C shows a reduction in terpenes yield versus time, under the operating conditions of continuous adsorption coupled to a desorber and condenser, the terpenes yield would be expected to be constant over time.

FIG. 9D shows thermal gravimetric analysis results, when the analysis was performed isothermally. A sample of beads taken at 29 hours was analyzed. The beads were heated at about 77° F. per minute to various hold temperatures in separate experiments and maintained at each hold temperature until weight loss stopped. The hold temperatures were 167° F., 212° F., 257° F. 302° F., 347° F., 392° F., 482° F., 572° F., and 662° F. FIG. 9D shows weight loss over time for each hold temperature. As the temperature increased, the weight loss increased and the time necessary to desorb materials generally decreased. At 662° F., there appeared to be some degradation of the beads, indicating that this temperature is too high to remove organics. Optimal desorption temperature is likely 302° F. to 932° F., or 302° F. to 662° F., with lower temperatures within that range preferred to minimize the heat energy required for desorption and to maximize the alpha-pinene and beta-pinene content in the desorbed stream.

Removal Efficiency

FIG. 9E compares the percentage reduction in VOCs (based on the FID analysis described above) and the percentage weight gain of the beads. FIG. 9E demonstrates that for both runs, the beads reduced the amount (ppm) of organics in the process exhaust by at least 90% (meeting the target for reduction) in the operating window, as specified by the Maximum Available Control Technology (MACT) requirement for plywood and composite wood products (PCWP), while the beads gained no more than 15% by weight.

FIG. 9F shows the air flow at the inlet and outlet of the fluidized bed in terms of standard cubic feet per minute (scfm), dry standard cubic feet per minute (dscfm), and actual cubic feet per minute (acfm). The air flow into and out of the fluidized bed were within 10% of each other, indicating that the air exiting the bed was not significantly diluted by the fresh air added to the bed by the airlift blower under the process conditions. Accordingly, the observed reduction in VOC emissions was due to adsorption, since any VOC emissions in the air exiting the bed were undiluted.

FIG. 9G provides the percentage reduction in VOCs (based on emissions data at impingers located at the inlet and outlet of the fluidized bed) and the percentage weight gain of the beads. The emissions were collected in two impingers in series containing 15 mL acetonitrile each for 120 minutes with approximately 1 liter/min process air flow. This emissions data from the impingers indicates that the terpenes are very efficiently adsorbed by the beads, particularly within the operating window. However, formaldehyde was less efficiently adsorbed by the beads. Under the conditions of continuous adsorption coupled to continuous desorption and recovery, the VOC (including formaldehyde) reduction is expected to be constant with time, unlike the data shown in FIGS. 9E and 9G.

Bead Desorption

Based on the thermal gravimetric analysis under isothermal conditions described above, beads were desorbed at 572° F. for 55 minutes. After desorption, the beads were subjected to further thermal gravimetric analysis to determine the amount of organics remaining on the beads following desorption. The beads showed an initial 1.8% weight loss from water. Between 572° F. and 1382° F., there was an additional 1.3% weight loss from water, carbon dioxide, and a small amount of carbon monoxide. No organic compounds or particulates were identified in the off-gases. The apparent density of virgin beads was 0.602 g/mL and the apparent density of beads after desorption was 0.608 g/mL, whereas the apparent density of the beads after adsorption was 0.76 g/mL. Thus, the apparent density of the beads after desorption was nearly equal to that of the virgin beads, indicating that only a very small percentage of the bead capacity was irreversibly blocked at 572° F., well within the design specifications for a fluidized bed adsorber. Moreover, the thermal gravimetric analysis of the beads after desorption showed only water remaining on the beads, and no organic compounds or particulates. These results indicate that the activated carbon beads of this Example can be very efficiency desorbed.

Beads were also extracted by mixing with hexane, ethyl acetate, and acetonitrile at room temperature. The resulting solvent extracts were analyzed for terpenes content, then normalized and compared to terpenes desorbed using thermal desorption. FIG. 9H provides a comparison of the terpenes yield. As shown in FIG. 9H, terpenes not exposed to heat have relatively high alpha-pinene and beta-pinene content.

In sum, this Example demonstrates that bed fluidization was sufficient for efficient adsorption onto activated carbon sorbent. Once stable, minimal operator intervention was required to maintain performance of the adsorber. Any potential water condensation issues were largely addressed by pre-warming the fluidized bed prior to bead introduction. Some condensation in the hopper caused the beads to stop flowing temporarily, indicating that additional heat (e.g., a heat source, better insulation, etc.) for the hopper can be desirable to ensure that the operating temperature remains above the dewpoint and prevent condensation.

After running continuously for 36 hours, there was no significant occurrence of particulate or tarry scale within the fluidized bed, although there was tarry scale build up on the perforated plate in the air pre-treatment box.

The maximum bead saturation was approximately 20-25% organics by weight. The amount of adsorbed water as compared to organics should not exceed 10% when system comes to equilibrium in continuous runs to ensure efficient adsorption of organics. Emissions as measured by Flame Ionization Detection (FID) indicated that the fluidized bed reduced the ppm of organics in the process air by at least 90% when beads had adsorbed less than or equal to 15% organics by weight. These density measurements demonstrated that the beads were not saturated until after the beads had adsorbed about 15% of their initial weight, indicating their high propensity for adsorption. This result demonstrates that the beads can meet a very high adsorption efficiency.

Example 6

Operation of Fluidized Bed for Removal of Volatile Organic Compounds

This Example describes pilot scale testing of a system for removing VOCs, such as terpenes, from the exhaust stream of a wood drying process.

To test the capabilities for removing such VOCs, a process fan was configured to draw a portion of exhaust of approximately 300 cfm from an exhaust stream from a wood dryer. The remaining exhaust stream was passed to a conventional regenerative thermal oxidizer (RTO). The portioned stream was passed through an air pre-treatment box to reduce particulate matter. Two balancing dampers were used to control the flow from the process fan and air pre-treatment box. After pre-treatment, the portioned stream was passed to a fluidized bed adsorber containing bead activated carbon (BAC) (from Kureha America, Inc.). The pilot system was operated in semi-batch mode to allow the BAC to adsorb pollutants, mainly VOCs.

The process parameters of the process fan and fluidized bed are summarized in Table 7, below.

TABLE 7

| | |
|---|---|
| Process fan suction | −9 to −10 inches of water |
| Inlet pressure (upstream of discharge bypass line) | 8 inches of water |
| Fluidized bed after inlet diffuser | 7 to 8 inches of water |
| Fluidized bed differential pressure (out-in) | 2 to 3 inches of water |
| Airlift fan discharge pressure | 20 to 35 inches of water |
| Temperature before air pre-treatment box | 160° F. to 175° F. |
| Temperature at process fan discharge | 165° F. to 180° F. |
| Temperature at bottom of bed | 145° F. to 160° F. |
| Temperature at bottom tray of bed | 155° F. to 170° F. |
| Temperature at middle tray of bed | 155° F. to 170° F. |
| Temperature at top tray of bed | 135° F. to 155° F. |
| Outlet temperature | 130° F. to 158° F. |
| Bead mass transport rate | 100 to 250 pounds per hour |
| Air flow (actual) | 320 to 425 cfm |
| Air flow (dry standard) | 225 to 300 dscfm |

To determine the compositions of (1) the exhaust stream entering the air pre-treatment box (and subsequently, the fluidized bed), (2) the stream exiting the fluidized bed, and (3) the stream entering into the RTO, several tests were performed. The velocity, volumetric flow rate, moisture, and molar weight of each stream were determined according to EPA Methods 2, 3, and 4. Additionally, several measurements were performed to determine the amount of particulate matter in each stream. The total amount of filterable particulate matter was determined according to EPA Method 5. The amount of filterable particulate matter having diameters less than 2.5 μm (PM 2.5) and less than 10 μm (PM 10) were measured using particle size analysis. The amount of condensable particulate matter was measured using EPA Method 202.

The VOC loading of the streams entering and exiting the fluidized bed were measured based on the gaseous streams. EPA Method 25A, without a methane cutter, was used to determine the amount of VOCs as total hydrocarbons based on a propane calibration for the RTO. EPA Method 25A, adjusting for certain organic components (such as methanol and formaldehyde) according to Wood Products Protocol 1 (WPP1), was used to determine a measure of VOCs for the fluidized bed system. The amount of HAPs, notably methanol and formaldehyde, was also measured using NCASI Method 98.01, which was performed with and without additional quality assurance samples (e.g., sample runs with reagent blanks, duplicates, and various spikes).

Emissions Projections

Based on the measured compositions, the projected hourly emissions from a scaled up fluidized bed system were determined and compared to emissions from an existing RTO, using the same wood dryer as the source of the exhaust stream. These projections are shown in Table 8 below, in which "FB" represents the fluidized bed.

TABLE 8

| | Potential Emissions | |
|---|---|---|
| Pollutant | RTO (lb/hr) | Projected FB/AB (lb/hr) |
| PM (Filterable) | 42.7 | 68.9 |
| PM 10 (Total) | 42.7* | 28.0 |
| PM 2.5 (Total) | 42.7* | 12.9 |
| VOC | 79.7** | 37.1*** |
| $NO_x$ (as $NO_2$) | 75.8 | 13.6 |
| CO | 42.4 | 94.6 |
| $SO_2$ | 7.04 | 7.00 |
| $CO_2$ equivalent ($CO_{2e}$) | 66,181.2 | 58,693.3 |
| $CO_2$ | 65,399.9 | 57,912.1 |
| $CH_4$ | 4.6 | 4.6 |
| $N_2O$ | 2.2 | 2.2 |

*PM 10 and PM 2.5 determinations in Table 9 based on EPA Method 5; thus, assumes that all filterable particulate matter is PM 10 and PM 2.5. "Total" PM 10 and PM 2.5 emissions include condensable PM emissions based on EPA Method 202 (or comparable method).
**VOC as Carbon based on EPA Method 25A.
***VOC as WPP1

In Table 8, the emissions for the RTO were based on a number of assumptions in a site-specific permitting analysis. The 79.7 lb/hr VOC (as carbon) was based on a 95% control efficiency for VOCs and organic HAPs. By comparison, annual testing of an existing RTO at the RTO inlet and outlet shows an average of 98.4% destruction and removal efficiency (DRE). The 42.7 lb/hr filterable particulate matter and PM 10 was based on a 95.4% control efficiency (including multiclones). The 42.4 lb/hr CO was based on a 75% control efficiency. The 75.8 lb/hr $NO_x$ (as $NO_2$) was based on RTO combustion control. However, a person of ordinary skill in the art will appreciate that the estimates of this Example are subject to change, e.g., based on the results of further testing.

This pilot testing indicates that the fluidized bed system can meet PCWP MACT (40 C.F.R. § 63.2240(b) and Table 1B(1)) by reducing emissions of total hydrocarbons (THC as carbon) from the wood drying process by at least 90%.

Additionally, to analyze the effects of the system on emissions in a site-specific permitting analysis, historical data on the existing RTO system was used to develop the Baseline Actual Emissions (based on average of annual stack test data per 62-210.37, F.A.C. "Emissions Computation and Reporting" and recorded production during 10-year lookback) and Projected Actual Emissions (based on the maximum finished wood drying production rate, projected 10 years and translated to equivalent dryer production rate, and the emissions developed from the pilot testing). This historical data represents trends in production, and therefore allows a realistic comparison of RTO and fluidized bed technologies, when the wood dryer used for this particular pilot testing is operating at its typical production rate (i.e., at less than full capacity). Table 9, below, compares the Baseline Actual Emissions and the Projected Actual Emissions for each type of emission shown in Table 8. Additionally, Table 9 shows the Prevention of Significant Deterioration (PSD) Significant Emission Rate (SER) for several of the pollutants, for comparison, to show which pollutants can be subject to additional PSD analysis based on an increase in their emissions.

TABLE 9

| Pollutant | Potential Emissions (tpy) | | | |
|---|---|---|---|---|
| | Baseline Actual (BAE) | Projected Actual (PAE) | Δ (PAE-BAE) | PSD SER |
| PM (Filterable) | 42.28 | 184.12 | 141.84 | 25 |
| PM10 (Total) | 111.61 | 74.78 | −36.83 | 15 |
| PM2.5 (Total) | 102.41 | 34.53 | −67.87 | 10 |
| VOC (as WPPI) | 26.77 | 98.98 | 72.21 | 40 |
| $NO_x$ (as $NO_2$) | 140.38 | 36.27 | −104.11 | 40 |
| CO | 34.74 | 252.76 | 218.02 | 100 |
| $SO_2$ | 18.10 | 18.69 | 0.59 | 40 |
| $CO_2$ equivalent ($CO_{2e}$) | 171,220.20 | 156,717.52 | −14,502.68 | 75,000 |
| $CO_2$ | 169,199.10 | 154,672.75 | −14,526.35 | — |
| $CH_4$ | 11.87 | 11.75 | −0.11 | — |
| $N_2O$ | 5.79 | 5.88 | 0.09 | — |

As shown in Table 9, the fluidized bed system (represented by Projected Actual Emissions) decreases several pollutants, most significantly, $CO_2$ and $CO_2$ equivalents (i.e., greenhouse gases), but also total particulate matter (as PM 10 and PM 2.5), $NO_x$, and $SO_2$. However, there is an increase in VOCs, filterable particulate matter, and CO emissions. As noted with respect to Table 8, a person of ordinary skill in the art will appreciate that the estimates of Table 9 are also subject to change, e.g., based on the results of further testing.

Although the amount of VOCs emitted from the fluidized bed system can increase as compared to those exiting an RTO when historical production is taken into account, the overall amount of ozone and secondary PM 2.5 is projected to decrease because of reductions in $NO_x$ emissions. For example, using "Central US Source 5" low release characteristics for ozone and secondary PM 2.5, 500 tons per year (tpy) of $NO_x$ results in 1.13 ppb of ozone and 500 tpy of VOCs results in 0.28 ppb of ozone. As shown in Table 9, the fluidized bed system is projected to avoid the $NO_x$ emissions—an ozone precursor—from fossil fuel combustion in the RTO, and thus will result in a decrease in ozone of about 0.12 ppb as compared to the RTO.

Using similar assumptions, 500 tpy $NO_x$ results in 0.302 $\mu g/m^3$ of 24-hour PM 2.5 and 0.0146 $\mu g/m^3$ of annual PM 2.5. As $NO_x$ is significantly reduced by the fluidized bed system as compared to the RTO, secondary PM 2.5 will be commensurately reduced. These assumptions are based on EPA Guidance, available from EPA, "Guidance on the Development of Modeled Emission Rates for Precursors (MERPs) as a Tier 1 Demonstration Tool for Ozone and PM 2.5 under the PSD Permitting Program (EPA-454/R-16-006)," December 2016.

Moreover, in addition to the reduction in $CO_2$ equivalents noted in Tables 8 and 9, the fluidized bed system also reduces greenhouse gas emissions from upstream production. Conventional RTOs consume significant energy, both as fuel and electricity. For example, the RTO used as comparison is this Example consumes about 280,500 MMBtu/yr in natural gas and about 10,440,000 kWh in electricity (1800 kW @5800 hr/yr). Taking these into account, and along with the reduction in direct emissions, greenhouse gas emissions are reduced by more than 32,000 tpy by using the fluidized bed system.

HAPs Emissions

The fluidized bed system was observed to reduce HAPs emissions, as HAPs were adsorbed onto the activated carbon beads. For example, FIG. 10A shows the percentage reduction in the HAPs methanol and formaldehyde over a 2.5 hour run time, as measured by impingers located at the inlet and outlet of the fluidized bed. The emissions data from the impingers indicates that the beads adsorb formaldehyde and methanol, but that over 2-3 hours, their ability to adsorb HAPs decreases.

Thus, the fluidized bed reduced HAPs emissions most effectively upon startup when the beads had an apparent density of about 0.6 g/mL. Over time, as the apparent density of the beads increased, their capability for HAPs adsorption decreased. This result suggests that recirculation of beads or otherwise maintaining a low apparent density via techniques such as thermal desorption can enable continuous desorption of the beads while effectively controlling HAPs.

Particulate Control

It was observed that the amount of particulate matter was reduced at the outlet of the fluidized bed. To confirm that this was not due to a significant reduction during stream pre-treatment that is not representative of particulate reduction upstream from convention RTOs, FIG. 10B compares the particulate matter concentration at the inlet of the fluidized bed and a conventional RTO. It was found that the particulate matter entering the fluidized bed was indeed representative of the particulate entering the RTO, when calculated both on a pounds per hour (51.1 lb/hr versus 53.1 lb/hr) and a concentration (106.0 mg/dscm versus 110.7 mg/dscm) basis.

To further investigate, the particulate control of the fluidized bed was compared when used in conjunction with two different air pre-treatment boxes. The first box contained a perforated plate, 100 mesh screen, and a pleated filter. The second box contained a perforated plate and two baffles. The results are shown in FIG. 10C. Even without the 100 mesh screen and pleated filter, particulate matter was reduced, indicating that particulate matter is reduced by the fluidized bed system. This is true when calculated on both a pounds per hour (48% without screen and filter versus 21.7% with screen and filter) and concentration (50.7% versus 30.6%) basis. The particulate reduction was actually greater when using the perforated plate and two baffles as compared to with the 100 mesh screen and pleated filter. The specific reduction for each type of particulate studied (filterable, condensable, PM 2.5, and PM 10) can be found in Table 10, which extrapolates the average data to an air flow rate of 300,000 cfm. Overall, about 80 wt-% of the particles had a diameter of 1 μm or less.

TABLE 10

| Particulate | Inlet Avg. (lb/hr) | Outlet Avg. (lb/hr) | % Reduction |
|---|---|---|---|
| Method 5 (filterable only) | 107 | 70 | 35% |
| Method 202 (condensable) | 42 | 33 | 21% |
| Total filterable + condensable | 149 | 103 | 31% |
| PM 2.5 filterable + condensable | 49 | 35 | 29% |
| PM 10 filterable + condensable | 92 | 50 | 45% |

It was theorized that the fluidized beads acted as a dry scrubber to remove some of the particulate matter from the exhaust stream (which also formed the yellow/brown coating inside the air pre-treatment box). Thus, the desorption of this material was studied to determine whether it could be desorbed along with terpenes in the desorber at a desorption temperature of 572° F. As shown in FIG. 10D, the thermal gravimetric analysis on residue within a pre-treatment system indicated that the majority of the organic material could be desorbed within 20 minutes at 572° F., well within a desorber's design specifications for time and temperature of 55 minutes at 572° F. Thus, it is expected that if the beads adsorb this yellow/brown coating, it would be desorbed in the desorber and be combined with a condensed turpentine product. However, inorganic material is never thermally desorbed and it is theorized it can be recirculated with the beads back to the fluidized bed and exhausted out the top of the bed or circulated to a small particulate control device for collection and disposal. Indeed, analysis of the condensate showed that it contained fatty acids (hexadecanoic acid (C16:0) and octadecanoic acid (C18:0)) and rosins, which can be found in PM 2.5 (PM 2.5 includes both condensable and filterable particulate matter).

Additionally, the long term effects of particulates were studied over 2 weeks of run time using an air pre-treatment box with a perforated plate and two baffles. After 2 weeks, the plate, baffles, fluidized bed, and airflow adjusters were all coated with a thin layer of yellow/brown material. The elements in the pre-treatment box also had visible particles embedded in the layer of yellow/brown material.

Thus, this Example shows that the particulate going into the fluidized bed is representative of the particulate going into a conventional RTO, indicating that these pilot trials can be used to predict the impact on particulate matter. The fluidized bed was found to reduce particulate emissions by about 30% to about 50%.

Additionally, it was observed that the fluidized beads in the bed remove the yellow/brown condensable organic material that typically forms a yellow/brown coating from the dryer exhaust, and it was theorized that they acted as a dry scrubber to do so. This condensable organic material can be desorbed in the desorber within the normal desorber time/temperature design specification of 55 minutes at 572° F. and will become part of the resulting condensate. For PM 2.5, the condensable fraction is often the predominant fraction made up of rosin "smoke," fatty acids, and breakdown products from cellulose and lignin. The air-treatment box with a perforated plate and two baffles, which is a relatively simple design, more effectively reduced particulate emissions than the box with a perforated plate, 100 mesh screen, and pleated filter.

Example 7

Calculated Sorbent Reactivation Via Side Stream Reactivator

This Example calculates the effect of continuous side stream reactivation of carbon beads on sorbent apparent density over a 21-day period. Such a calculation helps to determine the amount of sorbent (i.e., carbon beads) that must be reactivated in order to maintain a particular, desired sorbent apparent density. The ability to maintain said sorbent apparent density is a primary predictor of emissions reduction efficiency.

To calculate the effect of a side stream reactivator that continuously adds reactivated sorbent to maintain apparent density, each calculation begins with spent carbon beads having an apparent density of 0.81 g/mL. It is assumed that each day, reactivated or fresh carbon beads increase when exposed to process air and subsequently desorbed by an apparent density of 0.01 g/mL. On this basis, five calculations are conducted to demonstrate the effect of 0.1%, 0.5%, 2%, 3%, and 6% reactivation per day based on a daily use of 10,000 lbs. of carbon beads. For example, a 6% reactivation means 6% of 10,000 lbs. per day, or 600 lbs. per day (which is 25 lbs/hr) reactivated.

Each of the five calculations begins with apparent density of 0.81 g/mL. For each day over a course of 21-days, the set percentage of reactivated carbon is mixed with existing sorbent. At the same time, all new and partially spent sorbent that is adsorbed in the adsorber increases by 0.01 g/mL per day to a maximum of 0.81 g/mL according to data collected in FIG. 11A. FIG. 11B displays the calculated change in the apparent density of the sorbent beads over 21 days, based on the percentage of reactivated carbon that is introduced.

It is desired to maintain sorbent apparent density at or approximately 0.78 g/mL. Based on the calculated effect of side stream reactivation, about 2% reactivation of sorbent based on a 10,000 lb daily consumption is sufficient to maintain this 0.78 g/mL apparent density. Lower apparent density provides for improved percent reduction efficiency with a higher percentage of reactivated sorbent (e.g., carbon), whereas higher apparent density provides for higher terpene yield, less use of energy, and less generated $CO_2$ by a lower percentage of reactivated sorbent (e.g., carbon).

Example 8

Emissions Control Via Side Stream Reactivation

This Example describes a pilot scale testing of the effect of continuous side stream reactivation of carbon beads in maintaining a certain sorbent apparent density, and accordingly, the ability to control emissions from a process exhaust stream via a fluidized bed adsorber, as contemplated by the presently disclosed methods and systems. This Example provided the introduction of fresh sorbent for a predetermined amount of time into systems of the present disclosure to test the effect of continuous side stream reactivation. Specifically, this pilot scale testing was conducted to determine the amount of new or reactivated sorbent needed to consistently achieve over 90% reduction efficiency of emissions, such as volatile organic compounds (VOCs) and/or total hydrocarbon content (THC). Additionally, the effect of other equipment operating parameters was studied. The overall process flow of the system in this Example is generally captured by FIG. 1, as described above.

Prior to and in preparation for this pilot scale testing, the adsorber was cleaned using trisodium phosphate solution in accordance to procedures or processes as presently disclosed and known to those of ordinary skill in the art. Heating was provided to the adsorber, hopper (i.e., adsorber hopper), and associated piping to minimize possible water condensation and coalescence of organics.

New carbon beads were added in various but predetermined amounts over set increments of time (e.g., every 1-5 minutes) to simulate a continuous side stream reactivation of the sorbent. The impacts of adding new carbon, and thus of determining the effect of continuous side stream reactivation as presently disclosed, were assessed based on the time needed to observe reduction of emissions at the adsorber (e.g., less than about 60 minutes) and a downstream desorber (e.g., between about 5-10 hours). Side stream reactivation amount was adjusted in order to maintain apparent densities ranging from about 0.78 g/mL to about 0.80 g/mL, and subsequently, to achieve the necessary reduction efficiency on emissions of at least 90% from the process exhaust stream.

Operating conditions of this pilot scale testing are summarized in Table 11 below. Sorbent beads from the adsorber spent about 60 minutes, with a range of between about 30-70 minutes, in the heated section of the desorber.

TABLE 11

| Condition | Target | Range |
| --- | --- | --- |
| Process Exhaust Air at Adsorber Inlet | 300 cfm | 250-325 cfm |
| Adsorber Differential Pressure | 3.2-3.3 inches of $H_2O$ | 2.5-4.5 inches of $H_2O$ |
| Hopper Temperature | 180° F. | 100-200° F. |
| Adsorber Middle and Upper Trays | 90-115° F. | 90-115° F. |
| Sorbent Carbon Bead Transfer Rate from Desorber to Adsorber | 48 lb/hr | 40-85 lb/hr |
| Desorber Average Temperature | 400° F. (or 390-420° F.) | 370-470° F. |
| Condenser Chiller Temperature | 45° F. | 40-50° F. |
| Condenser Chiller Pressure | 43 psi | 41-45 psi |
| Airlift Fan Pressure (Adsorber and Desorber) | 20 inches of $H_2O$ | 18-22 inches of $H_2O$ |
| Nitrogen Makeup Pressure | 35-45 inches of $H_2O$ | 30-50 inches of $H_2O$ |
| Nitrogen Recirculation Rate | 8.5-9.1 cfm | 8-10 cfm |
| Nitrogen Blower Outlet Pressure | 29-32 inches of $H_2O$ | 28-34 inches of $H_2O$ |
| Apparent Density of Spent Sorbent | 0.81 g/mL | 0.81 g/mL |
| Apparent Density of Mixed Spent/New Sorbent | (specific to test run) | 0.78-0.81 g/mL |

After a baseline run to startup and acclimate the overall system, four test runs were conducted with the parameters specified in the table below. For each run, an orifice was used at the inlet of the adsorber to maintain the bead transfer rate from the desorber at about 48 lb/hr (or about 21.8 kg/hr). The percentage of carbon beads as depicted in Table 12 was calculated based on the 48 lb/hr sorbent bead transfer rate.

TABLE 12

| Run # | Total Sorbent Added [g] | Sorbent Addition Rate [g/min] | Location Where New Sorbent Added | Apparent Density [g/mL] | Percent Sorbent Added |
| --- | --- | --- | --- | --- | --- |
| Baseline | 0 | n/a | n/a | 0.81 | 0% |
| A-1 | 1,473 | 49.1 | Adsorber Top Tray | 0.780 | 12% |
| A-2 | 1,473 | 44.6 | Desorber Eductor | 0.780 | 12% |

TABLE 12-continued

| Run # | Total Sorbent Added [g] | Sorbent Addition Rate [g/min] | Location Where New Sorbent Added | Apparent Density [g/mL] | Percent Sorbent Added |
| --- | --- | --- | --- | --- | --- |
| A-3 | 390 | 13.0 | Desorber Eductor | 0.803 | 3.5% |
| A-4 | 552 | 8.7 | Desorber Eductor | 0.805 | 2.5% |

In Run A-1, new sorbent was introduced to the adsorber top tray by adding carbon beads approximately once per minute to the top adsorber tray via a pipe with double block and bleed valves at the top of the adsorber. In Run A-2, Run A-3, and Run A-4, new sorbent was introduced to the desorber eductor by introducing into the airstream between the desorber educator and the desorber separator pot via a pipe and site glass with double block and bleed valves.

Emission measurements, particularly VOCs and THC, were continuously routed to flame ionization detection (FID) from the adsorber inlet and at the adsorber outlet. Analysis via flame ionization detection (FID) method was conducted by a certified third-party stack testing company to determine the effectiveness on emission control of the overall system. Moreover, these emissions results were compared to the amount of new carbon beads continuously added during this pilot scale testing (which demonstrated the function of a side stream reactivator) in order to determine an optimal apparent density range and the percentage of sorbent that would need to be reactivated to maintain at least 90% reduction efficiency.

FIG. 12A shows the percent reduction efficiency as it varied with each of four runs. In three of the four runs, a reduction efficiency of 100% was achieved, and in all instances, a reduction efficiency of 90% was achieved when the apparent density of sorbent was maintained at about 0.78 g/mL to about 0.805 g/mL. The average reduction efficiency achieved across all four runs was about 98%.

Correspondingly, FIG. 12B shows the measurement of total hydrocarbon content (THC) at the inlet of the adsorber compared to the outlet of the adsorber. As can be seen, as reduction efficiency increases due to the side stream reactivation of carbon beads in FIG. 12A, the THC at the adsorber outlet decreases nearly to zero, confirming the ability of the pilot system to attain about 100% reduction efficiency.

Based on the model in FIG. 11B, it is estimated that about 2% reactivation of sorbent per day is needed to maintain a consistent reduction efficiency of emissions at >90%. However, the full commercial system is designed to accommodate the capability to reactivate up to 6% sorbent per day on the basis of 10,000 lb. of sorbent (i.e., 600 lb/day or about 25 lb/hr).

In addition to determining the amount of side stream reactivation of sorbent to maintain a reduction efficiency of at least >90%, studies were conducted to determine the effectiveness of a condenser coupled to the desorber and the impact of adsorber differential pressure on emission control. FIG. 13 shows the total hydrocarbon content of the mixed nitrogen and emissions stream exiting the condenser going back to the desorber compared to the chiller temperature providing cooling to the condenser. The apparent density was 0.81 g/mL during testing. As can be noted in FIG. 13, when the chiller temperature is cooler, e.g., at about 40° F., the THC of the condenser outlet stream is correspondingly lower. By contrast, when the chiller temperature is closer to 50° F., there is an upward tick in THC of the condenser outlet stream. This Example demonstrates that operating the chiller, and therefore the condenser, at lower temperature improves condenser effectiveness by condensing more THC content. Additionally, by operating the chiller at lower temperatures, terpene yield from the desorber can be collected and maximized.

Adsorber differential pressure was also measured as compared to THC at the adsorber inlet versus outlet, as well as adsorber emissions control. The apparent density was 0.81 g/mL during testing. FIG. 14A depicts various adsorber differential pressures (from about 2.5 inches of water to about 3.8 inches of water) in comparison to the amount of THC in ppm at the adsorber inlet and outlet. As can be seen, where the adsorber operates with a larger differential pressure, such as at or above 3.4 inches of water, is the outlet THC content is higher than when the adsorber differential pressure is at or below 3.3 inches of water. FIG. 14B confirmed this finding, as between about 2.4 inches of water to about 3.2 inches of water shows an average reduction efficiency, without modeling side stream reactivation, of about 62% to about 70%. However, when adsorber differential pressure is increased to about 3.4 inches of water, reduction efficiency drops to about 55% to about 60%. Accordingly, in certain embodiments, the adsorber operates such that its differential pressure is maintained between about 2.5 inches of water to about 3.3 inches of water.

It was also noted that some subsequent terpene yield was collected from the desorber of the pilot testing system. The amount of terpene collected in this Example as scaled to anticipated commercial value is approximately 50,000 gallons per year.

Example 9

Emissions Control Via Side Stream Reactivation and Comprehensive Testing

This Example was conducted subsequent to Example 8 above to confirm the reduction efficiency results achieved via continuous side stream reactivation of sorbent. Additionally, comprehensive stack testing was conducted for environmental permitting regulations. In particular, the comprehensive stack testing also measured the amount of VOCs by FID, particulate matter, HAPs, $SO_2$, methane ($CH_4$), nitrogen oxides ($NO_x$), oxygen ($O_2$), and carbon monoxide (CO). An apparent density target was selected to achieve >90% reduction efficiency during comprehensive stack testing.

Prior to testing, the adsorber of the present Example was cleaned. During cleaning, the amount of pH of water rinses were monitored. The following table illustrates the adsorber cleaning process. Additionally, airlift systems of the pilot testing system, shown in FIG. 1, for instance, the adsorber eductor and desorber bead transfer line, were dried out to remove water and any organics coalescing.

TABLE 13

| Step | Cleaning Process | Average Solution pH |
|---|---|---|
| 1 | First rinse with approximately 4 gallons of water. | 7.23 |
| 2 | Apply cleaning solution, e.g., 4 liters (about 1 gallon) of 10% trisodium phosphate. | 11.95 |
| 3 | Drain cleaning solution and drain organics from adsorber. | 12.01 |
| 4 | Second rinse with approximately 5 gallons of water. | 10.34 |
| 5 | Third rinse with approximately 5 gallons of water. | 8.81 |
| 6 | Fourth rinse with approximately 5 gallons of water | 8.30 |

New carbon beads were added in various but predetermined amounts over set increments of time (e.g., every 1-5 minutes) to simulate a continuous side stream reactivation of the sorbent. The impacts of adding new carbon, and thus of determining the effect of continuous side stream reactivation as presently disclosed, were assessed based on the time needed to observe reduction of emissions at the adsorber (e.g., less than about 60 minutes) and a downstream desorber (e.g., between about 5-10 hours). Side stream reactivation was adjusted in order to maintain apparent densities ranging from about 0.760 g/mL to about 0.80 g/mL, and subsequently, to achieve the necessary reduction efficiency on emissions of at least 90% from the process exhaust stream.

The trial testing of this Example was conducted over the course of two days, i.e., in two parts. In the first part, this Example aimed to confirm the side stream reactivation conducted in Example 8 above. After a baseline run to startup and acclimate the overall system, two runs were conducted with the parameters specified in the table below. For each run, an orifice was used at the inlet of the adsorber to maintain a desired bead transfer rate to the desorber at about 38 lb/hr (or about 17.2 kg/hr) or at about 44 lb/hr (or about 20.0 kg/hr). The percentage of carbon beads as depicted in Table 14 was calculated based on the lb/hr sorbent bead transfer rate.

TABLE 14

| Run # | Total Sorbent Added [g] | Sorbent Addition Rate [g/min] | Bead Transfer Rate [lb/hr] | Location Where New Sorbent Added | Apparent Density [g/mL] | Percent Sorbent Added |
|---|---|---|---|---|---|---|
| Baseline | 0 | n/a | n/a | n/a | 0.81 | 0% |
| B-1 | 1,179.3 | 39.3 | 38 (17.2 kg/hr) | Desorber Eductor | 0.785 | 12% |
| B-2 | 2,116.8 | 106 | 44 (20.0 kg/hr) | Desorber Eductor | 0.760 | 24% |

In Run B-1, new carbon sorbent beads were added once per minute over 30 minutes. In Run B-2, new carbon was added once per minute over 20 minutes. In both Run B-1 and B-2, new sorbent was introduced after desorber eductor directly by introducing into the airstream between the desorber eductor and the desorber separator pot via a pipe and site glass with double block and bleed valves.

Emission measurements, particularly VOCs, were continuously routed to flame ionization detection (FID) from both at the adsorber inlet and at the adsorber outlet. Analysis via flame ionization detection (FID) method was conducted by a certified third-party stack testing company to determine the effectiveness on emission control of the overall system. Moreover, these emissions results were compared to the amount of new carbon beads continuously added during this pilot scale testing (which demonstrated the function of a side stream reactivator) in order to determine an optimal apparent density range and the percentage of sorbent that would need to be reactivated to maintain at least 90% reduction efficiency.

FIG. 15 shows the reduction efficiency as it varied with each of the two runs in this Example. Run B-2 achieved a reduction efficiency of 100%, and in both instances, a reduction efficiency of at least 90% was achieved when the apparent density of sorbent was maintained at about 0.760 g/mL to about 0.785 g/mL.

Further, as observed from FIG. 15, in the first pilot testing part of Example 9, the THC at the adsorber outlet was drastically lower than the amount of THC at the adsorber inlet. This confirms the side stream reactivation of Example 8, as well as this Example, can obtain >90% reduction efficiency of emissions from a process exhaust stream.

Operating conditions during the second part of pilot scale comprehensive testing of this Example are summarized in Table 15 below. Sorbent beads from the adsorber spent about 60 minutes, with a range of between about 30-70 minutes, in the heated section of the desorber.

TABLE 15

| Condition | Target | Range |
|---|---|---|
| Process Exhaust Air at Adsorber Inlet | 300 cfm | 250-325 cfm |
| Adsorber Differential Pressure | 3.2 inches of $H_2O$ | 2.5-4.5 inches of $H_2O$ |
| Hopper Temperature | 180° F. | 145-170° F. |
| Adsorber Middle and Upper Trays | 90-115° F. | 90-115° F. |
| Sorbent Carbon Bead Transfer Rate from Desorber to Adsorber | 34 lb/hr | 30-50 lb/hr |
| Desorber Average Temperature | 400° F. | 360-470° F. |
| Condenser Chiller Temperature | 45° F. | 40-50° F. |
| Condenser Chiller Pressure | 43 psi | 41-45 psi |
| Airlift Fan Pressure (Adsorber and Desorber) | 20 inches of $H_2O$ | 18-22 inches of $H_2O$ |
| Nitrogen Makeup Pressure | 37-43 inches of $H_2O$ | 30-50 inches of $H_2O$ |
| Nitrogen Recirculation Rate | 9 cfm | 7-11 cfm |
| Nitrogen Blower Outlet Pressure | 28-32 inches of $H_2O$ | 26-34 inches of $H_2O$ |

TABLE 15-continued

| Condition | Target | Range |
|---|---|---|
| Apparent Density of Spent Sorbent | 0.81-0.813 g/mL | 0.81-0.813 g/mL |
| Apparent Density of Mixed Spent/New Sorbent | (specific to test run) | 0.78-0.81 g/mL |

After a baseline run to startup and acclimate the overall system for comprehensive testing, two test runs were conducted with the parameters specified in the table below. For each run, the bead transfer rate going to and through the adsorber was about 34 lb/hr (or about 15.4 kg/hr). Addition of new sorbent in this second part comprehensive testing was about 43 grams per minute.

TABLE 16

| Run # | Total Sorbent Added [g] | Sorbent Addition Rate [g/min] | Bead Transfer Rate [lb/hr] | Location Where New Sorbent Added | Apparent Density [g/mL] | Percent Sorbent Added |
|---|---|---|---|---|---|---|
| Baseline | 0 | n/a | n/a | n/a | 0.81 | 0% |
| C-1 | 2,585.5 | 43.1 | 34 | Desorber Eductor | 0.780 | 14% |
| C-2 | 2,585.5 | 43.1 | 34 | Desorber Eductor | 0.780 | 14% |

In the baseline and startup run for comprehensive testing in FIG. 16A, side stream reactivation is first performed for the overall system. As can be seen, around a run time of about 12:35, the reduction efficiency begins to increase from about 60% toward >90% as new carbon beads were being added. Simultaneously, the adsorber outlet THC begins to decrease as adsorption of emissions begins to take place in the fluidized bed adsorber. Prior to the two comprehensive testing runs, the system was first brought up to environmental regulations of achieving >90% reduction efficiency.

Two comprehensive runs, C-1 and C-2 were conducted in the second part of this Example for environmental permit submission. For each comprehensive run, the sorbent apparent density was maintained at about 0.78 g/mL via side stream reactivation. Comprehensive run C-1 displayed in FIG. 16B achieved and maintained a target of >90% reduction efficiency over or throughout approximately 1 hour. Comprehensive run C-2 displayed in FIG. 16C also achieved and maintained a target of >90% reduction efficiency over or throughout approximately 1 hour.

Based on the model in FIG. 11B, it is estimated that about 2% reactivation of sorbent per day is needed to maintain a consistent reduction efficiency of emissions at >90%. However, the full commercial system is designed to accommodate the capability to reactivate up to 6% sorbent per day on the basis of 10,000 lb. of sorbent (i.e., 600 lb/day or about 25 lb/hr).

Some subsequent terpene yield was also collected from the desorber of the pilot testing system in Example 9.

For each comprehensive run, stack emissions were analyzed by a certified third-party stack testing company to determine the effectiveness on emission control of the overall system and show the destruction removal efficiency (DRE) of various components. The results are tabulated in Table 17 below.

TABLE 17

| Emission | Run C-1 | | | Run C-2 | | | Average | | |
|---|---|---|---|---|---|---|---|---|---|
| | In (lb/hr) | Out (lb/hr) | % DRE | In (lb/hr) | Out (lb/hr) | % DRE | In (lb/hr) | Out (lb/hr) | % DRE |
| PM [a] | 0.100 | 0.045 | 55% | 0.122 | 0.071 | 42% | 0.111 | 0.058 | 48.5% |
| CPM [b] | 0.0273 | 0.0082 | 70% | 0.0204 | 0.0084 | 59% | 0.02385 | 0.0083 | 64.5% |
| Total PM [c] | 0.127 | 0.053 | 58% | 0.142 | 0.079 | 44% | 0.1345 | 0.066 | 51% |
| $SO_2$ | 0.0069 | 0.000094 | 99% | 0.0007 | 0.0 | 100% | 0.0038 | 0.000047 | 99.5% |
| $NO_x$ | 0.0262 | 0.0114 | 56% | 0.0251 | 0.0117 | 54% | 0.02565 | 0.01155 | 55% |
| CO | 0.0850 | 0.0751 | 12% | 0.0847 | 0.0815 | 4% | 0.08485 | 0.0783 | 8% |
| THC [d] | 0.285 | 0.022 | 92% | 0.282 | 0.026 | 91% | 0.2835 | 0.024 | 91.5% |
| Methane | 0.00109 | 0.00147 | −35% | 0.00108 | 0.00140 | −31% | 0.001085 | 0.001435 | −33% |
| VOC [e] | 0.284 | 0.021 | 93% | 0.281 | 0.025 | 91% | 0.2825 | 0.023 | 92% |
| Formaldehyde | 0.00725 | 0.00083 | 89% | 0.00825 | 0.00178 | 78% | 0.00775 | 0.001305 | 83.5% |
| Methanol | 0.00195 | 0.00060 | 69% | 0.00243 | 0.00048 | 80% | 0.00219 | 0.001515 | 74.5% |

[a] Total filterable particulate matter.
[b] Condensable particulate matter.
[c] Total particulate matter = filterable + condensable.
[d] Including methane.
[e] Volatile organic carbon = total non-methane hydrocarbons THC − methane.

Across both comprehensive runs, there was a decrease in the amount of particulate matter, condensable particulate matter, $SO_2$, $NO_x$, CO, THC, and VOC. Individually, methane showed an average increase of about 33%. HAPs (including methanol and formaldehyde) reduced by an average of 79%, particulates reduced by an average of 51%, $SO_2$ reduced by an average of 99.5%, $NO_x$ reduced by an average of 55%, and CO reduced by an average of 8%. Overall, the comprehensive testing indicated the emissions control methods and systems as described in the present disclosure achieved emission control by reducing adsorbing emission materials from a process exhaust stream.

This Example also demonstrates a reduction efficiency of about 91% to about 94% consistently, and upwards of 100% reduction efficiency. Average reduction efficiency achieved is about 92% to about 99%, which is in compliance with environmental regulations.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

Various patents and patent applications are cited herein, the contents of which are hereby incorporated by reference herein in their entireties.

What is claimed is:

1. A system for controlling emissions from a wood drying process, comprising:
    an exhaust stream from a wood drying process, the exhaust stream comprising one or more of particulate wood matters, terpenes, formaldehyde, methanol, acetic acid, acetone, or fatty acids; and
    an adsorber, coupled to the exhaust stream, the adsorber configured to contain a sorbent for capturing the one or more of particulate wood matters terpenes, formaldehyde, methanol, acetic acid, acetone, or fatty acids from the exhaust stream to generate a purified air stream containing less than 10 wt % of the one or more of particulate wood matters terpenes, formaldehyde, methanol, acetic acid, acetone, or fatty acids in the exhaust stream;
    a desorber coupled to the adsorber and configured to desorb the one or more particulate wood matters, terpenes, formaldehyde, methanol, acetic acid, acetone, or fatty acids captured by the sorbent; and
    a side stream reactivator configured to reactivate a portion of spent sorbent within the system, the side stream reactivator coupled to the desorber, the adsorber or both the adsorber and the desorber.

2. The system of claim 1, further comprising a vent for releasing the purified air stream into the atmosphere.

3. The system of claim 1, wherein the adsorber is configured to house a fluidized bed comprising the sorbent and the exhaust stream.

4. The system of claim 1, wherein the adsorber is configured to house two or more fluidized beds arranged in series or in parallel.

5. The system of claim 1, wherein the sorbent comprises activated carbon.

6. The system of claim 5, wherein spent activated carbon is thermally reactivated within the side stream reactivator.

7. The system of claim 6, wherein the side stream reactivator is configured to reactivate between about 0.1% to about 10% of spent activated carbon per day.

8. The system of claim 5, wherein the sorbent apparent density is between about 0.6 g/mL to about 0.86 g/mL.

9. The system of claim 8, wherein the sorbent apparent density is between about 0.78 g/mL to about 0.80 g/mL.

10. The system of claim 1, further comprising a hopper, coupled to the adsorber, the hopper configured to provide the sorbent to the adsorber.

11. The system of claim 10, further comprising an air inlet stream, coupled to the hopper, the inlet stream configured to dry sorbent within the hopper.

12. The system of claim 1, further comprising a system for recycling all or a portion of the purified air stream to the adsorber to maintain a flow rate through the adsorber.

13. The system of claim 12, wherein the flow rate through the adsorber is maintained within a variation of about 20% or less.

14. The system of claim 13, wherein the flow rate through the adsorber is maintained within a variation of about 10% or less.

15. The system of claim 1, wherein the adsorber has an operating temperature of between about 130° F. to about 220° F.

16. The system of claim 1, wherein an amount of particulate matter in the exhaust stream is reduced by at least about 50% on a grains per dry standard cubic foot basis.

17. The system of claim 1, wherein an amount of methanol and/or formaldehyde in the exhaust stream is reduced by at least about 10%.

18. The system of claim 1, wherein the purified air stream comprises less than about 200 ppm volatile organic compounds as measured as total hydrocarbons on a propane calibration basis.

19. The system of claim 18, wherein the purified air stream comprises less than about 25 ppm volatile organic compounds as measured as total hydrocarbons on a propane calibration basis.

20. The system of claim 1, wherein the purified air stream comprises less than about 10 ppm formaldehyde, methanol, phenol, acrolein, acetaldehyde, and propionaldehyde as measured as total hydrocarbons on a propane calibration basis.

21. The system of claim 1, wherein the system does not include a regenerative thermal oxidizer.

22. The system of claim 1, wherein the purified air stream comprises less than about 150 mg/dscm of total particulate matter.

23. The system of claim 1, wherein the purified air stream meets regulatory requirements for release directly into the environment.

24. The system of claim 1, wherein the at least adsorber is directly coupled to the at least one desorber.

25. The system of claim 1, wherein the side stream reactivator is directly coupled to the at least adsorber and the at least one desorber.

26. The system of claim 1, wherein the at least one desorber is configured to thermally desorb the one or more particulate wood matters, terpenes, formaldehyde, methanol, acetic acid, acetone, or fatty acids from the sorbent.

* * * * *